(12) United States Patent
Fukuoka

(10) Patent No.: US 9,946,128 B2
(45) Date of Patent: Apr. 17, 2018

(54) IMAGE DISPLAY DEVICE

(71) Applicant: Sharp Kabushiki Kaisha, Sakai, Osaka (JP)

(72) Inventor: Kenta Fukuoka, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/328,916

(22) PCT Filed: Jul. 8, 2015

(86) PCT No.: PCT/JP2015/069632
§ 371 (c)(1),
(2) Date: Jan. 25, 2017

(87) PCT Pub. No.: WO2016/021360
PCT Pub. Date: Feb. 11, 2016

(65) Prior Publication Data
US 2017/0219861 A1 Aug. 3, 2017

(30) Foreign Application Priority Data

Aug. 4, 2014 (JP) ................................. 2014-159060

(51) Int. Cl.
*G02F 1/1335* (2006.01)
*G02F 1/1347* (2006.01)
(Continued)

(52) U.S. Cl.
CPC ......... *G02F 1/1347* (2013.01); *G02B 6/0056* (2013.01); *G02F 1/13363* (2013.01);
(Continued)

(58) Field of Classification Search
CPC ....................... G02F 1/133528; G02F 1/13363
See application file for complete search history.

(56) References Cited

U.S. PATENT DOCUMENTS

2006/0187380 A1 8/2006 Tsuda et al.
2007/0242186 A1* 10/2007 Ikeno ................ G02F 1/133514
349/74
2013/0106922 A1 5/2013 Chen et al.

FOREIGN PATENT DOCUMENTS

JP 2004-029693 A 1/2004
JP 2004-151186 A 5/2004
(Continued)

OTHER PUBLICATIONS

Official Communication issued in International Patent Application No. PCT/JP2015/069632, dated Sep. 15, 2015.

*Primary Examiner* — Phu Vu
(74) *Attorney, Agent, or Firm* — Keating & Bennett, LLP

(57) ABSTRACT

In an image display device including a first display panel and a second display panel, there are provided a first panel body, a first panel body emission-side polarizing plate disposed at a front-surface side with respect to the first panel body, a second panel body, a second panel body incidence-side polarizing plate disposed at a back-surface side with respect to the second panel body, at least one inter-panel polarizing plate disposed between the first panel body and the second panel body, and a back-surface irradiation light source configured to emit light toward the back-surface side. The back-surface irradiation light source is provided in one of regions between the first panel body emission-side polarizing plate and the second panel body incidence-side polarizing plate.

18 Claims, 50 Drawing Sheets

(51) Int. Cl.
*G02F 1/13363* (2006.01)
*F21V 8/00* (2006.01)

(52) U.S. Cl.
CPC .. *G02F 1/133536* (2013.01); *G02F 1/133528* (2013.01); *G02F 2001/133638* (2013.01); *G02F 2413/02* (2013.01); *G02F 2413/06* (2013.01); *G02F 2413/08* (2013.01)

(56) References Cited

FOREIGN PATENT DOCUMENTS

| | | |
|---|---|---|
| JP | 2005-017747 A | 1/2005 |
| JP | 2010-091609 A | 4/2010 |
| WO | 2005/008322 A1 | 1/2005 |

* cited by examiner

Fig.32
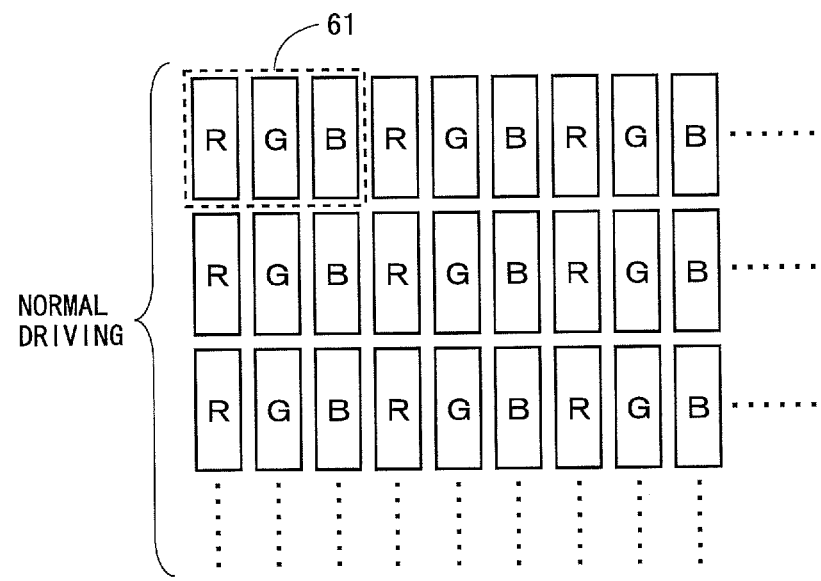
NORMAL DRIVING
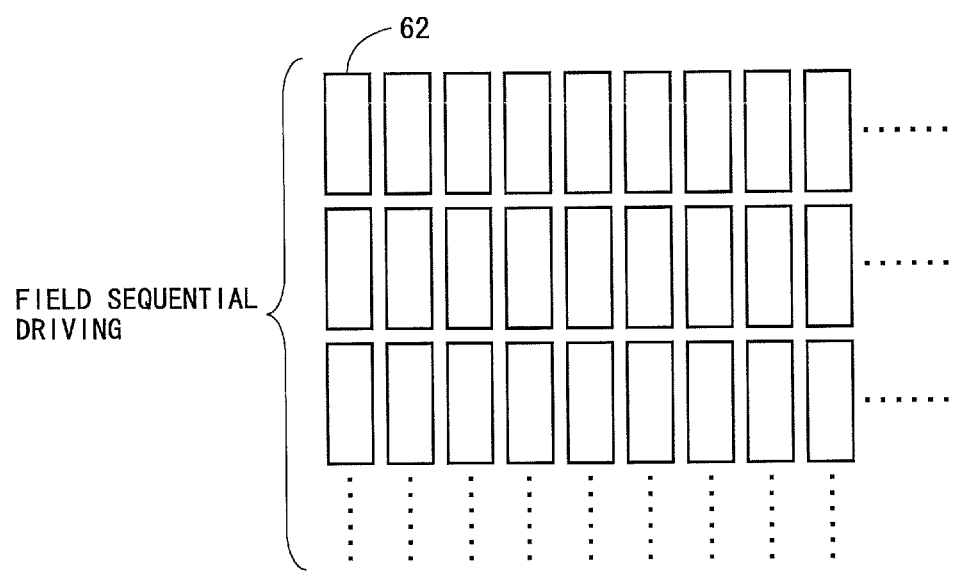
FIELD SEQUENTIAL DRIVING

IMAGE DISPLAY DEVICE

TECHNICAL FIELD

The present invention relates to an image display device, and particularly relates to an image display device having a function of a transparent display that enables a background to be transparently visible.

BACKGROUND ART

In recent years, there have been progressed development of image display devices having a function of a transparent display which not only displays an image but also enables the background to be transparently visible. For example, in Japanese Patent Application Laid-Open No. 2010-91609, there is disclosed a configuration of a transparent display that enables a display image to be easily visible by making the background opaque when displaying the image. FIG. 53 is a diagram showing a configuration of a liquid crystal display device 800 having the function of the transparent display disclosed in Japanese Patent Application Laid-Open No. 2010-91609. As shown in FIG. 53, the liquid crystal display device 800 includes a liquid-crystal panel 810, a shutter film 820 provided at the back surface of the liquid-crystal panel 810, and a control unit 830 that controls the drive of the liquid-crystal panel 810 and the shutter film 820. The shutter film 820 switches between a state of directly passing the incident light therethrough to radiate the liquid-crystal panel 810 and making the rear side of the shutter film 820 distinguishably transparent and a state of indirectly passing the incident light therethrough to radiate the liquid-crystal panel 810 and blocking the rear side of the shutter film 820 in an indistinguishable manner. Accordingly, the liquid crystal display device 800 can visibly display the image displayed in the liquid-crystal panel 810 and can enable the rear side to be transparently visible through the liquid-crystal panel 810.

Regarding liquid crystal display devices having a function of a transparent display as described above, conventionally, liquid crystal display devices with one-screen display have been mainly developed. However, in the case of the one-screen display, there is a limit to the improvement in expressive power. Therefore, there is considered enhancing expressive power by displaying two superposed images using two liquid-crystal panels to enable display of images with a sense of depth and three-dimensional appearance. Hereinafter, a display device having such a configuration of two-ply display surface will be referred to as a "dual display". It should be noted that, in Japanese Patent Application Laid-Open No. 2004-151186, an invention of such a dual display is disclosed.

PRIOR ART DOCUMENTS

Patent Documents

[Patent Document 1] Japanese Patent Application Laid-Open No. 2010-91609
[Patent Document 2] Japanese Patent Application Laid-Open No. 2004-151186

SUMMARY OF THE INVENTION

Problems to be Solved by the Invention

When intending to realize a dual display by using a liquid-crystal panel, the following factors are considered: a light source to be used and disposition of the light source, a method of simultaneously displaying images on two liquid-crystal panels, and how to make polarization directions coincide with each other. However, in Japanese Patent Publication No. 2004-151186, although a positional relationship between configuration elements is illustrated in the drawings, a detailed description is not made.

Accordingly, an object of the present invention is to realize a dual display provided with sufficient practicability and having high expressive power such as the ability to display an image with a sense of depth and three-dimensional appearance.

Means for Solving the Problems

A first aspect of the present invention is directed to an image display device including a first display panel disposed at a front-surface side and a second display panel disposed at a back-surface side,
the image display device including:
a first panel body as a body of the first display panel;
a frontmost polarizing plate disposed at a front-surface side with respect to the first panel body;
a second panel body as a body of the second display panel;
a rearmost polarizing plate disposed at a back-surface side with respect to the second panel body;
at least one inter-panel polarizing plate disposed between the first panel body and the second panel body; and
a back-surface irradiation light source configured to emit light from an installation position toward the back-surface side,
wherein the back-surface irradiation light source is provided in one of regions between the frontmost polarizing plate and the rearmost polarizing plate, and
at least one of the rearmost polarizing plate and the inter-panel polarizing plate is a reflection type polarizing plate configured to reflect a component vibrating in a direction perpendicular to a direction of a transmission axis out of light emitted from the back-surface irradiation light source.

According to a second aspect of the present invention, in the first aspect of the present invention,
a polarization direction of light incident to the second display panel from a back-surface side and emitted from a front-surface side of the second display panel and a polarization direction of light incident to the first panel body when desired image display is performed by the first display panel coincide with each other, and
only one inter-panel polarizing plate is provided between the first panel body and the second panel body as the at least one inter-panel polarizing plate.

According to a third aspect of the present invention, in the first aspect of the present invention,
the back-surface irradiation light source is provided in a region between the second panel body and the rearmost polarizing plate, and
the rearmost polarizing plate is a reflection type polarizing plate.

According to a fourth aspect of the present invention, in the third aspect of the present invention,
the image display device further includes a backlight source provided in a region between the first panel body and the second panel body and configured to emit light from an installation position toward at least a front-surface side,
wherein one of the at least one inter-panel polarizing plate is provided near a back surface of the first panel body, and the backlight source is provided at a back-surface side with respect to the inter-panel polarizing plate provided near the back surface of the first panel body.

According to a fifth aspect of the present invention, in the first aspect of the present invention, the back-surface irradiation light source is provided in a region between the first panel body and the inter-panel polarizing plate, the rearmost polarizing plate is a reflection type polarizing plate, and one of the at least one inter-panel polarizing plate is a reflection type polarizing plate.

According to a sixth aspect of the present invention, in the fifth aspect of the present invention, only one inter-panel polarizing plate is provided between the first panel body and the second panel body as the at least one inter-panel polarizing plate, and the inter-panel polarizing plate is provided near a front surface of the second panel body.

According to a seventh aspect of the present invention, in the fifth aspect of the present invention, the back-surface irradiation light source and one of the at least one inter-panel polarizing plate are provided near the back surface of the first panel body.

According to an eighth aspect of the present invention, in the first aspect of the present invention, the image display device further includes a backlight source provided at a back-surface side with respect to the rearmost polarizing plate and configured to emit light from an installation position toward a front-surface side, wherein the back-surface irradiation light source is provided in a region between the first panel body and the inter-panel polarizing plate, the inter-panel polarizing plate is a reflection type polarizing plate, and the rearmost polarizing plate is an absorption type polarizing plate configured to absorb a component vibrating in a direction perpendicular to a polarization direction of a component passing through the inter-panel polarizing plate and the second panel body out of light emitted from the back-surface irradiation light source.

According to a ninth aspect of the present invention, in the eighth aspect of the present invention, both the back-surface irradiation light source and the backlight source include a plurality of single-color light sources, and the first display panel and the second display panel are display panels without a color filter, and are driven by a field sequential driving system configured to bring the plurality of single-color light sources sequentially into an on state.

According to a tenth aspect of the present invention, in the eighth aspect of the present invention, both the back-surface irradiation light source and the backlight source include single-color light sources of K colors (where K is an integer equal to or larger than three), one of the first display panel and the second display panel is a display panel without a color filter, and is driven by a field sequential driving system configured to bring the single-color light sources of K colors included in the back-surface irradiation light source sequentially into an on state, and the other of the first display panel and the second display panel is a display panel having a color filter, and is driven at a drive frequency of one-Kth or less of a drive frequency of the first display panel.

According to an eleventh aspect of the present invention, in the first aspect of the present invention, the rearmost polarizing plate is a reflection type polarizing plate, the back-surface irradiation light source includes a plurality of single-color light sources, and the first display panel and the second display panel are display panels without a color filter, and are driven by a field sequential driving system configured to bring the plurality of single-color light sources sequentially into an on state.

According to a twelfth aspect of the present invention, in the first aspect of the present invention, the rearmost polarizing plate is a reflection type polarizing plate, the back-surface irradiation light source includes single-color light sources of K colors (where K is an integer equal to or larger than three), one of the first display panel and the second display panel is a display panel without a color filter, and is driven by a field sequential driving system configured to bring the single-color light sources of K colors sequentially into an on state, and the other of the first display panel and the second display panel is a display panel having a color filter, and is driven at a drive frequency of one-Kth or less of a drive frequency of the first display panel.

According to a thirteenth aspect of the present invention, in the first aspect of the present invention, the image display device further includes two $\lambda/4$ wave plates disposed with a predetermined interval in a region between the first display panel and the second display panel.

According to a fourteenth aspect of the present invention, in the thirteenth aspect of the present invention, when a polarization direction of light incident to the second display panel from a back-surface side and emitted from a front-surface side of the second display panel is defined as a first direction, and a polarization direction of light incident to the first panel body when desired image display is performed by the first display panel is defined as a second direction, the first direction and the second direction form an angle of 90 degrees, and directions of slow axes of both of the two $\lambda/4$ wave plates form angles of 45 degrees with both of the first direction and the second direction.

According to a fifteenth aspect of the present invention, in the thirteenth aspect of the present invention, when a polarization direction of light incident to the second display panel from a back-surface side and emitted from a front-surface side of the second display panel is defined as a first direction, and a polarization direction of light incident to the first panel body when desired image display is performed by the first display panel is defined as a second direction, the first direction and the second direction coincide with each other, a direction of a slow axis of one of the two $\lambda/4$ wave plates forms an angle of 45 degrees with both of the first direction and the second direction, and a direction of a slow axis of the other of the two $\lambda/4$ wave plates forms an angle of 45 degrees with both of the first direction and the second direction and forms an angle of 90 degrees with the direction of the slow axis of one of the two $\lambda/4$ wave plates.

According to a sixteenth aspect of the present invention, in the first aspect of the present invention, the image display device further includes a $\lambda/2$ wave plate provided in a region between the first display panel and the second display panel, and when a polarization direction of light incident to the second display panel from a back-surface side and emitted from a front-surface side of the second display panel is defined as a first direction, and a polarization direction of light incident to the first panel body when desired image display is performed by the first display panel is defined as a second direction, an angle formed by a direction of a slow axis of the λ/2 wave plate and the first direction and an angle formed by the direction of the slow axis of the λ/2 wave plate and the second direction coincide with each other.

According to a seventeenth aspect of the present invention, in the first aspect of the present invention, the image display device further includes a birefringent film provided in a region between the first display panel and the second display panel.

According to an eighteenth aspect of the present invention, in the first aspect of the present invention, the image display device further includes a display color correction section configured to correct a value of an input image signal that shows a display color in the second display panel, wherein the display color correction section is configured to correct a value of the input image signal so as to contain a component having at least a predetermined size for all primary colors.

According to a nineteenth aspect of the present invention, in the first aspect of the present invention, a space in which an object is disposed is provided at a back-surface side with respect to the rearmost polarizing plate.

Effects of the Invention

According to a first aspect of the present invention, in the first display panel, image display is performed based on light emitted from the back-surface irradiation light source and reflected by the rearmost polarizing plate. In the second display panel, image display is performed based on the light emitted from the back-surface irradiation light source and reflected by the rearmost polarizing plate or the light emitted from the light source separately provided at the back-surface side of the second display panel. Accordingly, a viewer is enabled to view display images on both the first display panel and the second display panel. In this case, by providing some space between the first display panel and the second display panel, it is possible to display an image with a sense of depth and three-dimensional appearance.

According to a second aspect of the present invention, only one polarizing plate is provided between the first panel body and the second panel body. Accordingly, a light component absorbed or reflected by the polarizing plate is reduced, and the light emitted from the light source is more effectively utilized than in the conventional art. Further, because the number of required polarizing plates is smaller than that in the conventional art, the effect of reducing the manufacturing cost can be obtained.

According to a third aspect of the present invention, the back-surface irradiation light source that emits light toward the back-surface side of the image display device is provided in the region between the second panel body and the rearmost polarizing plate. A predetermined polarization component of light emitted from the back-surface irradiation light source is reflected by the rearmost polarizing plate as a reflection type polarizing plate. The polarization component reflected by the rearmost polarizing plate passes through the second panel body and the first panel body, depending on the states of respective display elements (for example, liquid crystal) in the second panel body and the first panel body. Accordingly, the viewer is enabled to view display images on both the first display panel and the second display panel. In this case, by providing some space between the first display panel and the second display panel, it is possible to display an image with a sense of depth and three-dimensional appearance. From the above, it is possible to realize a dual display having high expressive power by using one light source (back-surface irradiation light source). Further, in comparison with a configuration in which the back-surface irradiation light source is provided in the region between the frontmost polarizing plate and the second panel body, unnecessary reflection of light is reduced and high contrast can be obtained.

According to a fourth aspect of the present invention, a backlight source that emits light toward the front-surface side is provided at the back surface of the first display panel. Therefore, even when display of black or display of a color near a single color is performed by the second display panel, light components of each color are given to the first display panel. In this way, because the light component of each color is given to the first display panel regardless of the state of display by the second display panel, the degree of freedom of display by the first display panel can be enhanced. Further, by independently controlling the light amount of the back-surface irradiation light source and the light amount of the backlight source, it is possible to individually adjust brightness of the first display panel and brightness of the second display panel.

According to a fifth aspect of the present invention, a back-surface irradiation light source that emits light toward the back-surface side of the image display device is provided in the region between the first panel body and the inter-panel polarizing plate. A predetermined polarization component of light emitted from the back-surface irradiation light source is reflected by the rearmost polarizing plate as a reflection type polarizing plate. Accordingly, the viewer is enabled to view display images on both the first display panel and the second display panel in a similar manner to that of the third aspect of the present invention. In this case, by providing some space between the first display panel and the second display panel, it is possible to display an image with a sense of depth and three-dimensional appearance. From the above, it is possible to realize a dual display having high expressive power by using one light source (back-surface irradiation light source). Further, when most of the polarization component reflected by the rearmost polarizing plate passes through the first panel body, only a little of the polarization component reflected by the inter-panel polarizing plate passes through the first panel body. When only a little of the polarization component reflected by the rearmost polarizing plate passes through the first panel body, most of the polarization component reflected by the inter-panel polarizing plate passes through the first panel body. In this case, the distance from the position of the viewer to the inter-panel polarizing plate is shorter than the distance from the position of the viewer to the rearmost polarizing plate. From the above, when a display image by the first display panel is bright, the display image becomes opaque, and therefore, the display image by the second display panel become less visible. On the other hand, when a display image by the first display panel is dark, the display image becomes transparent, and therefore, the display image by the second display panel becomes easily visible. Such a unique display is possible.

According to a sixth aspect of the present invention, only one polarizing plate is provided between the first panel body and the second panel body. Accordingly, a light component absorbed or reflected by the polarizing plate is reduced, and the light emitted from the light source is more effectively utilized than in the conventional art. Further, because the number of required polarizing plates is smaller than that in the conventional art, the effect of reducing the manufacturing cost can be obtained.

According to a seventh aspect of the present invention, a similar effect to that of the fifth aspect of the present invention can be obtained.

According to an eighth aspect of the present invention, a backlight source is provided at the back surface of the second display panel. Accordingly, concerning a display image on the second display panel, sufficient brightness and sufficient contrast can be obtained. In this way, expressive power by the second display panel is improved. Further, by independently controlling the light amount of the back-surface irradiation light source and the light amount of the backlight source, it is possible to individually adjust brightness of the first display panel and brightness of the second display panel.

According to a ninth aspect of the present invention, a color filter is not provided in the first display panel and the second display panel. Therefore, utilization efficiency of light is improved and a high aperture ratio is obtained, and concerning the space between the first display panel and the second display panel, the viewer is enabled to visually recognize a more transmitted state. Accordingly, the display image by the second display panel disposed at the back-surface side becomes easily visible for the viewer. Further, it is possible to achieve high brightness because the utilization efficiency of light is improved. Furthermore, a color reproduction range can be improved by sequentially turning on a plurality of single-color light sources.

According to a tenth aspect of the present invention, only one color-filterless display panel is used. Because a color-filterless display panel is expensive, increase in cost can be suppressed as compared with a configuration using two color-filterless display panels. From the above, it is possible to achieve a similar effect to that of the ninth aspect of the present invention while suppressing the increase in cost.

According to an eleventh aspect of the present invention, a similar effect to that of the ninth aspect of the present invention can be obtained, in the image display device that performs image display by the second display panel and the first display panel based on the light emitted from the back-surface irradiation light source and reflected by the rearmost polarizing plate.

According to a twelfth aspect of the present invention, a similar effect to that of the tenth aspect of the present invention can be obtained, in the image display device that performs image display by the second display panel and the first display panel based on the light emitted from the back-surface irradiation light source and reflected by the rearmost polarizing plate.

According to a thirteenth aspect of the present invention, two $\lambda/4$ wave plates are provided between the first display panel and the second display panel. In this case, by disposing one of the $\lambda/4$ wave plates near the first display panel and by disposing the other of the $\lambda/4$ wave plates near the second display panel, influence to the display by the surface reflection generated in the space between the first display panel and the second display panel can be reduced. In this way, influence to the display by the surface reflection of light can be reduced while enhancing the utilization efficiency of light emitted from the back-surface irradiation light source.

According to a fourteenth aspect of the present invention, when the emission polarization direction of the second display panel (the polarization direction of light emitted from the second display panel) and the incident polarization direction of the first display panel (the polarization direction of light incident to the first panel body when desired image display is performed by the first display panel) are orthogonal to each other, the polarization direction after the light emitted from the second display panel passes through the two $\lambda/4$ wave plates can be made to coincide with the incident polarization direction of the first display panel. Accordingly, even when the emission polarization direction of the second display panel is orthogonal to the incident polarization direction of the first display panel, the image display device that achieves a similar effect to that of the first aspect of the present invention can be realized.

According to a fifteenth aspect of the present invention, a similar effect to that of the thirteenth aspect of the present invention can be obtained.

According to a sixteenth aspect of the present invention, even when the emission polarization direction of the second display panel and the incident polarization direction of the first display panel have any relationship, when respective polarization directions (the emission polarization direction and the incident polarization direction) are known in advance, the polarization direction after the light emitted from the second display panel passes through the $\lambda/2$ wave plate can be made to coincide with the incident polarization direction of the first display panel by installing the $\lambda/2$ wave plate in the proper orientation. Accordingly, even when the emission polarization direction of the second display panel and the incident polarization direction of the first display panel have any relationship, the image display device that achieves a similar effect to that of the first aspect of the present invention can be realized.

According to a seventeenth aspect of the present invention, a birefringent film is provided between the second display panel and the first display panel. Therefore, the light given from the second display panel to the first display panel always contains a component that vibrates in the same direction as the incident polarization direction of the first display panel. Therefore, even when the emission polarization direction of the second display panel and the incident polarization direction of the first display panel have any relationship, it is possible to perform image display by the first display panel by using the light that has passed through the second display panel (display by the second display panel) as backlight. Further, even when the relationship between the emission polarization direction of the second display panel and the incident polarization direction of the first display panel is not determined at the time of design, it is possible to perform image display by the first display panel by using the light that has passed through the second display panel (display by the second display panel) as backlight. From the above, it is possible to realize the image display device that achieves a similar effect to that of the first aspect of the present invention without considering the relationship between the emission polarization direction of the second display panel and the incident polarization direction of the first display panel.

According to an eighteenth aspect of the present invention, so-called whitening (displaying a color whiter than the original color) is performed to the display image on the second display panel. Therefore, even when display of black or a color near a single color is to be performed by the second display panel, for example, display of a color containing components of at least a prescribed size or more for all primary colors is actually performed by the second display panel. Therefore, the light given from the second display panel to the first display panel contains components of at least a prescribed size or more for all primary colors. Accordingly, the degree of freedom of display by the first display panel is improved. As a result, display quality of the first display panel can be enhanced.

According to a nineteenth aspect of the present invention, because an exhibition object, for example, can be installed at the back surface of the second display panel, expressive power can be enhanced.

BRIEF DESCRIPTION OF THE DRAWINGS

FIG. 32 is a diagram for describing a difference between a configuration of pixels in normal driving and a configuration of pixels in field sequential driving.

MODES FOR CARRYING OUT THE INVENTION

<0. Basic Matters>

Prior to describing embodiments of the present invention, a polarizing plate as one of configuration elements of a dual display and a configuration common to all embodiments will be described.

<0.1 About Polarizing Plate>

Figure 2:
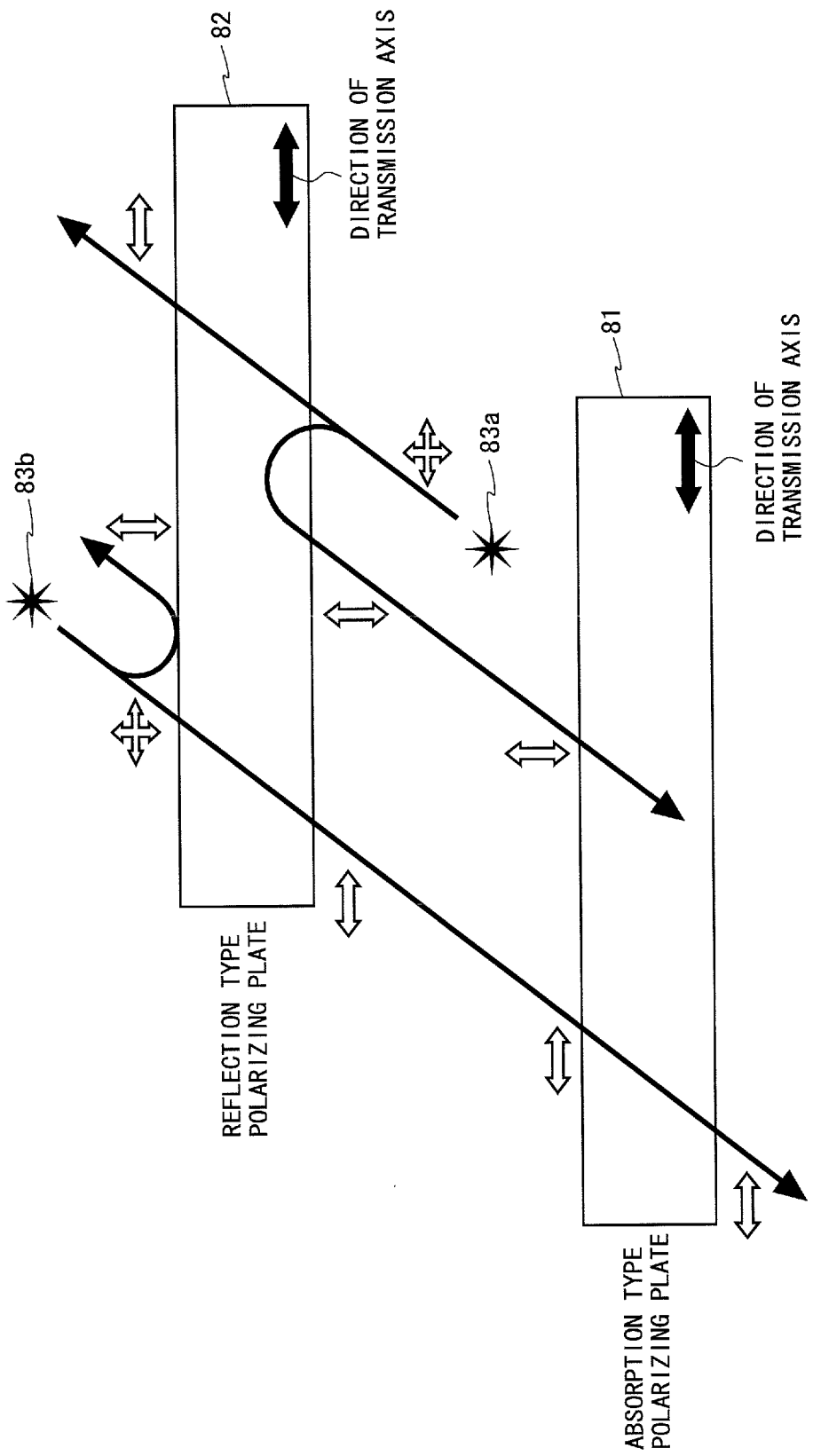
FIG. 2 is a diagram showing how linearly polarized light advances when an absorption type polarizing plate and a reflection type polarizing plate having the same transmission axis directions are disposed in parallel to each other.
Figure 3:
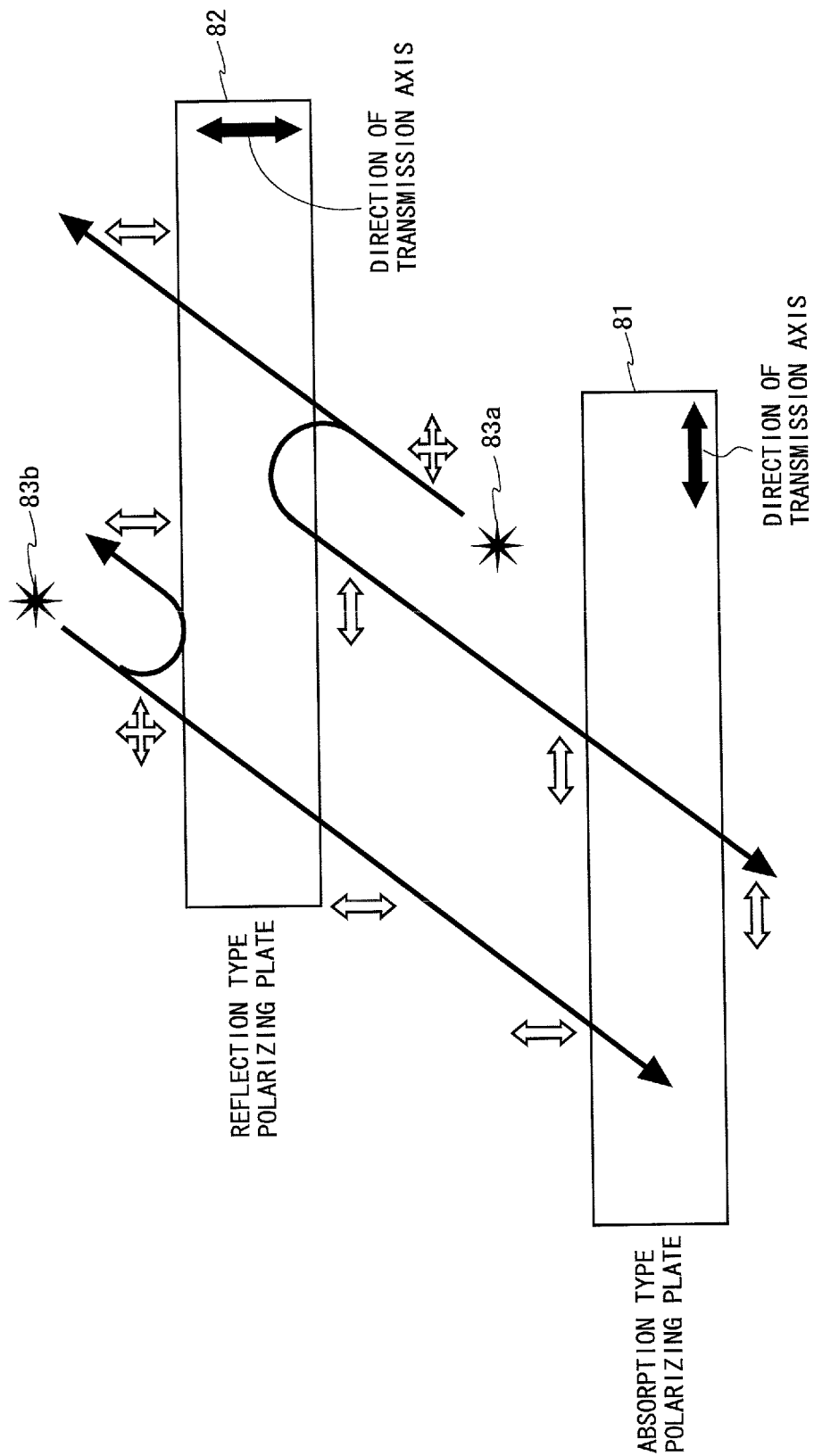
FIG. 3 is a diagram showing how linearly polarized light advances when an absorption type polarizing plate and a reflection type polarizing plate having mutually orthogonal transmission axis directions are disposed in parallel to each other.

In the following embodiments, a polarizing plate will be used in order to extract only a component which vibrates in a specific direction, out of the incident light. Kinds of the polarizing plate include an absorption type polarizing plate and a reflection type polarizing plate. Here, transmission, absorption, and reflection of light in the absorption type polarizing plate and the reflection type polarizing plate will be described. FIG. 2 is a diagram showing how linearly polarized light advances when an absorption type polarizing plate 81 and a reflection type polarizing plate 82 having the same transmission axis directions are disposed in parallel to each other. FIG. 3 is a diagram showing how linearly polarized light advances when the absorption type polarizing plate 81 and the reflection type polarizing plate 82 having mutually orthogonal transmission axis directions are disposed in parallel to each other.

The absorption type polarizing plate 81 has a characteristic of passing a polarization component having the same polarization direction as the direction of a transmission axis out of the linearly polarized light, and absorbing a polarization component having the same polarization direction as the direction of an absorption axis (a direction orthogonal to the transmission axis) out of the linearly polarized light. The reflection type polarizing plate 82 has a characteristic of passing a polarization component having the same polarization direction as the direction of a transmission axis out of the linearly polarized light, and reflecting a polarization component having the same polarization direction as the direction of a reflection axis (a direction orthogonal to the transmission axis) out of the linearly polarized light. In FIG. 2 and FIG. 3, directions of the transmission axes of the absorption type polarizing plate 81 and the reflection type polarizing plate 82 are indicated by black bold arrows. It is assumed that the light incident to these polarizing plates 81 and 82 is linearly polarized light that has polarization components of polarization directions orthogonal to each other. Furthermore, it is assumed that the light incident to these polarizing plates 81 and 82 is light emitted from a first light source 83a provided between the absorption type polarizing plate 81 and the reflection type polarizing plate 82, or light emitted from a second light source 83b provided outside the reflection type polarizing plate 82.

First, a case shown in FIG. 2 will be described. When linearly polarized light emitted from the first light source 83a is incident to the reflection type polarizing plate 82, a polarization component having the same polarization direction as the direction of the transmission axis of the reflection type polarizing plate 82 passes through the reflection type polarizing plate 82 and exits to the outside. On the other hand, a polarization component having the same polarization direction as the direction of the reflection axis is reflected by the reflection type polarizing plate 82 and its advance direction is inverted. Then, the polarization component is incident to the absorption type polarizing plate 81. Because the polarization direction of the polarization component incident to the absorption type polarizing plate 81 is the same as the direction of the absorption axis of the absorption type polarizing plate 81, the polarization component is absorbed by the absorption type polarizing plate 81. Therefore, the linearly polarized light emitted from the first light source 83a cannot be passed to the front side of the absorption type polarizing plate 81.

When the linearly polarized light emitted from the second light source 83b is incident to the reflection type polarizing plate 82, the polarization component having the same polarization direction as the direction of the transmission axis of the reflection type polarizing plate 82 passes through the reflection type polarizing plate 82, and the polarization component having the same polarization direction as the direction of the reflection axis is reflected. The polarization component having passed through the reflection type polarizing plate 82 is incident to the absorption type polarizing plate 81. Because the polarization direction of the polarization component incident to the absorption type polarizing plate 81 is the same as the direction of the transmission axis of the absorption type polarizing plate 81, the polarization component is passed to the front side without being absorbed by the absorption type polarizing plate 81.

Next, a case shown in FIG. 3 will be described. When linearly polarized light emitted from the first light source 83a is incident to the reflection type polarizing plate 82, a polarization component having the same polarization direction as the direction of the transmission axis of the reflection type polarizing plate 82 passes through the reflection type polarizing plate 82 and exits to the outside. On the other hand, a polarization component having the same polarization direction as the direction of the reflection axis is reflected by the reflection type polarizing plate 82 and its advance direction is inverted. Then, the polarization component is incident to the absorption type polarizing plate 81. Because the polarization direction of the polarization component incident to the absorption type polarizing plate 81 is the same as the direction of the transmission axis of the absorption type polarizing plate 81, the polarization component is passed to the front side of the absorption type polarizing plate 81.

When the linearly polarized light emitted from the second light source 83b is incident to the reflection type polarizing plate 82, the polarization component having the same polarization direction as the direction of the transmission axis of the reflection type polarizing plate 82 passes through the reflection type polarizing plate 82, and the polarization component having the same polarization direction as the direction of the reflection axis is reflected. The polarization component having passed through the reflection type polarizing plate 82 is incident to the absorption type polarizing plate 81. Because the polarization direction of the polarization component incident to the absorption type polarizing plate 81 is the same as the direction of the absorption axis of the absorption type polarizing plate 81, the polarization component is absorbed by the absorption type polarizing plate 81. Therefore, the linearly polarized light emitted from the second light source 83b cannot be passed to the front side of the absorption type polarizing plate 81.

In this way, by rotating a direction of the transmission axis of the reflection type polarizing plate 82 by 90°, either the light from the first light source 83a or the light from the second light source 83b can be selectively passed to the front side of the absorption type polarizing plate 81. Further, by using a liquid-crystal panel, it is possible to rotate the polarization direction for each pixel. Based on the above, a configuration of an image display device according to the present invention will be described.

<0.2 Common Configuration of all Embodiments>

Figure 1:
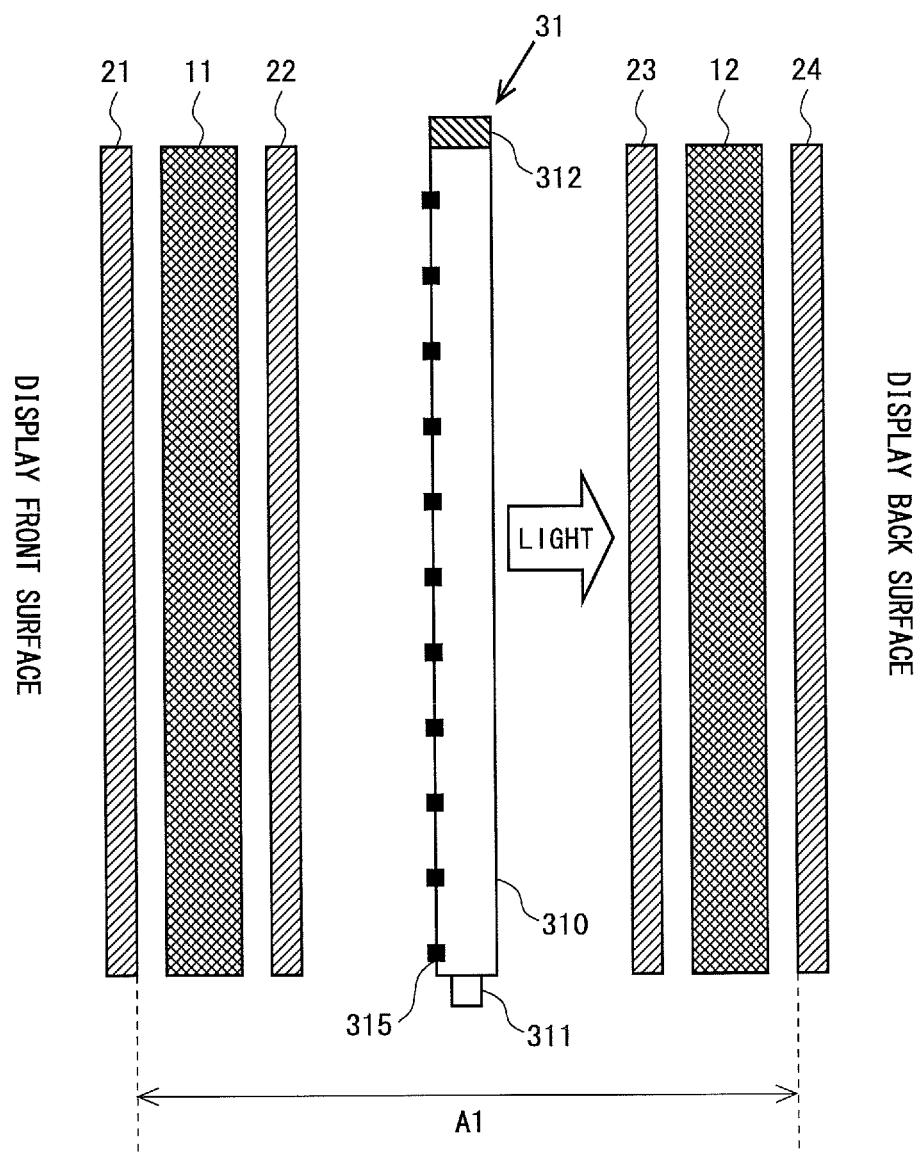
FIG. 1 is a diagram for describing a configuration common to all embodiments of the present invention concerning the configuration of an image display device.

FIG. 1 is a diagram for describing a configuration common to all embodiments of the present invention concerning the configuration of an image display device. The image display device according to the present invention is configured by two liquid-crystal panels. In the present specification, a substrate with a polarizing plate attached thereto is referred to as a "liquid-crystal panel", and a substrate without a polarizing plate attached thereto is referred to as a "panel body". As shown in FIG. 1, in the image display device according to the present invention, except for the light source indicated by reference numeral 31, a polarizing plate 21, a panel body 11, a polarizing plate 22, a polarizing plate 23, a panel body 12, and a polarizing plate 24 are provided from a display front-surface side (a side from which the viewer views the screen) toward a display back-surface side. However, one of the polarizing plate 22 and the polarizing plate 23 is not necessarily required to be provided. In the following, the panel body 11 is referred to as a "first panel body", and the panel body 12 is referred to as a "second panel body". Further, the polarizing plate 21 is referred to as a "first panel body emission-side polarizing plate", the polarizing plate 22 is referred to as a "first panel body incidence-side polarizing plate", the polarizing plate 23 is referred to as a "second panel body emission-side polarizing plate", and the polarizing plate 24 is referred to as a "second panel body incidence-side polarizing plate".

In the above configuration, the light source 31 is provided in one of regions in the range of the arrow indicated by reference numeral A1. That is, the light source 31 may be provided between the first panel body emission-side polarizing plate 21 and the first panel body 11, between the first panel body 11 and the first panel body incidence-side polarizing plate 22, between the first panel body incidence-side polarizing plate 22 and the second panel body emission-side polarizing plate 23, between the second panel body emission-side polarizing plate 23 and the second panel body 12, or between the second panel body 12 and the second panel body incidence-side polarizing plate 24. Further, because one of the first panel body incidence-side polarizing plate 22 and the second panel body emission-side polarizing plate 23 is not necessarily required to be provided, the light source 31 may be provided between the first panel body 11 and the second panel body emission-side polarizing plate 23 without providing the first panel body incidence-side polarizing plate 22, or the light source 31 may be provided between the first panel body incidence-side polarizing plate 22 and the second panel body 12 without providing the second panel body emission-side polarizing plate 23. The light source 31 radiates light toward the display back-surface side from the installed position. Accordingly, the light source 31 is hereinafter referred to as a "back-surface irradiation light source".

Next, a configuration of the back-surface irradiation light source 31 will be described. The back-surface irradiation light source 31 is configured by a light guide plate 310, an LED 311, a reflection sheet 312, and scatterers 315. The LED 311 is attached to one side surface of the light guide plate 310, and the reflection sheet 312 is adhered to an opposite side surface. Further, the scatterers 315 are formed on the surface of the display front-surface side of the light guide plate 310. While the light emitted from the LED 311 advances forward by being totally reflected within the light guide plate 310 or advances in the opposite direction by being reflected by the reflection sheet 312, the light proceeds to the display back-surface side by being scattered by the scatterers 315 on the surface. By using the light guide plate 310 with the scatterers 315 formed on the surface, uniform light is emitted from the back-surface irradiation light source 31 toward the display back-surface side.

Figure 4:
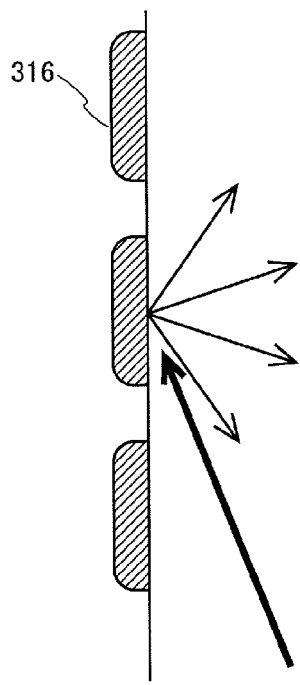
FIG. 4 is a diagram showing a configuration of dots formed on the surface of a light guide plate.

FIG. 4 is a diagram showing a configuration of dots 316 formed on the surface of the light guide plate 310. The dots 316 are required to be opaque in order to scatter the light in a surface direction opposite to the surface of the light guide plate 310 on which the dots 316 are formed. Therefore, the dots 316 are formed by white opaque ink (organic UV-curable ink or the like), or metallic ink (aluminum, gold, or the like), for example. Because these inks are opaque or easily reflect light, when the light in the light guide plate 310 is incident to the dots 316, the light is easily scattered to the display back-surface side. The dots 316 are formed using a printing technique. In order to ensure a transparent state of the light reflected by the second panel body emission-side polarizing plate 23 or the second panel body incidence-side polarizing plate 24, when the shape of the dots 316 is circular, for example, a diameter of each dot 316 is preferably within a range from 1 µm to equal to or less than 100 µm, and more preferably within a range from 1 µm to equal to or less than 10 µm. In addition, taking into account the ease of forming the dots 316 and ease of adjusting a light scattering rate, when the shape of each dot 316 is circular, the occupancy rate on the surface of the light guide plate 310 is preferably 0.1% to 70% per unit area.

Figure 5:
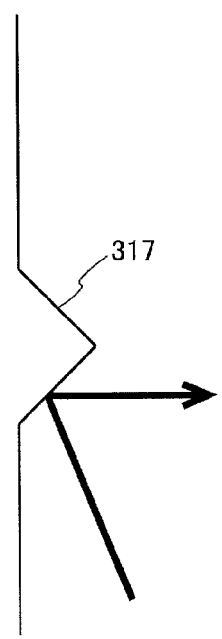
FIG. 5 is a diagram showing a configuration of a shaping dot formed on the surface of a light guide plate.

FIG. 5 is a diagram showing a configuration of a shaping dot 317 formed on the surface of a light guide plate 310. The shaping dots 317 are formed by using a mold press, for example, and have a function of scattering light in a surface direction opposite to a surface of the light guide plate 310 on which the shaping dots 317 are formed. In order to secure a transparent state of the light reflected by the second panel body emission-side polarizing plate 23 or the second panel body incidence-side polarizing plate 24, when the shape of each shaping dot 317 is a quadrangular pyramid, for example, one side of the base is preferably 1 µm to equal to or less than 100 µm, and more preferably, 1 µm to 10 µm. In addition, taking into account the ease of forming the shaping dots 317 and ease of adjusting a light scattering rate, when the shape of each dot 317 is a quadrangular pyramid, the occupancy rate on the surface of the light guide plate 310 is preferably 0.1% to 70% per unit area. The shape of each shaping dot 317 is not limited to a quadrangular pyramid, and may be a pyramid such as a triangular pyramid or a cone. Light incident to a side surface of each shaping dot 317 is reflected at a reflection angle smaller than the incident angle by being scattered by a side surface of the pyramid or the cone, and is incident to the second panel body emission-side polarizing plate 23 or the second panel body incidence-side polarizing plate 24 at an angle close to 90°. Further, it is preferable to perform treatment such as pasting a reflection film or a metal film on the inner surface of the shaping dots 317 so that the light incident to the side surfaces of the shaping dots 317 does not exit to the display front-surface side without being reflected.

Moreover, it is preferable to provide antireflection treatment on the surface of the light guide plate 310 so that the light scattered by the scatterers 315 provided on the surface of the light guide plate 310 does not return again to the inside of the light guide plate 310 by being reflected by the surface of the light guide plate 310 opposite to the surface on which the scatterers 315 are formed.

Further, concerning the back-surface irradiation light source 31, a back-surface irradiation light source that radiates light to only the display back-surface side from the installation position may be adopted, other than the configuration described above.

<1. First Embodiment>
<1.1 Configuration>

Figure 6:
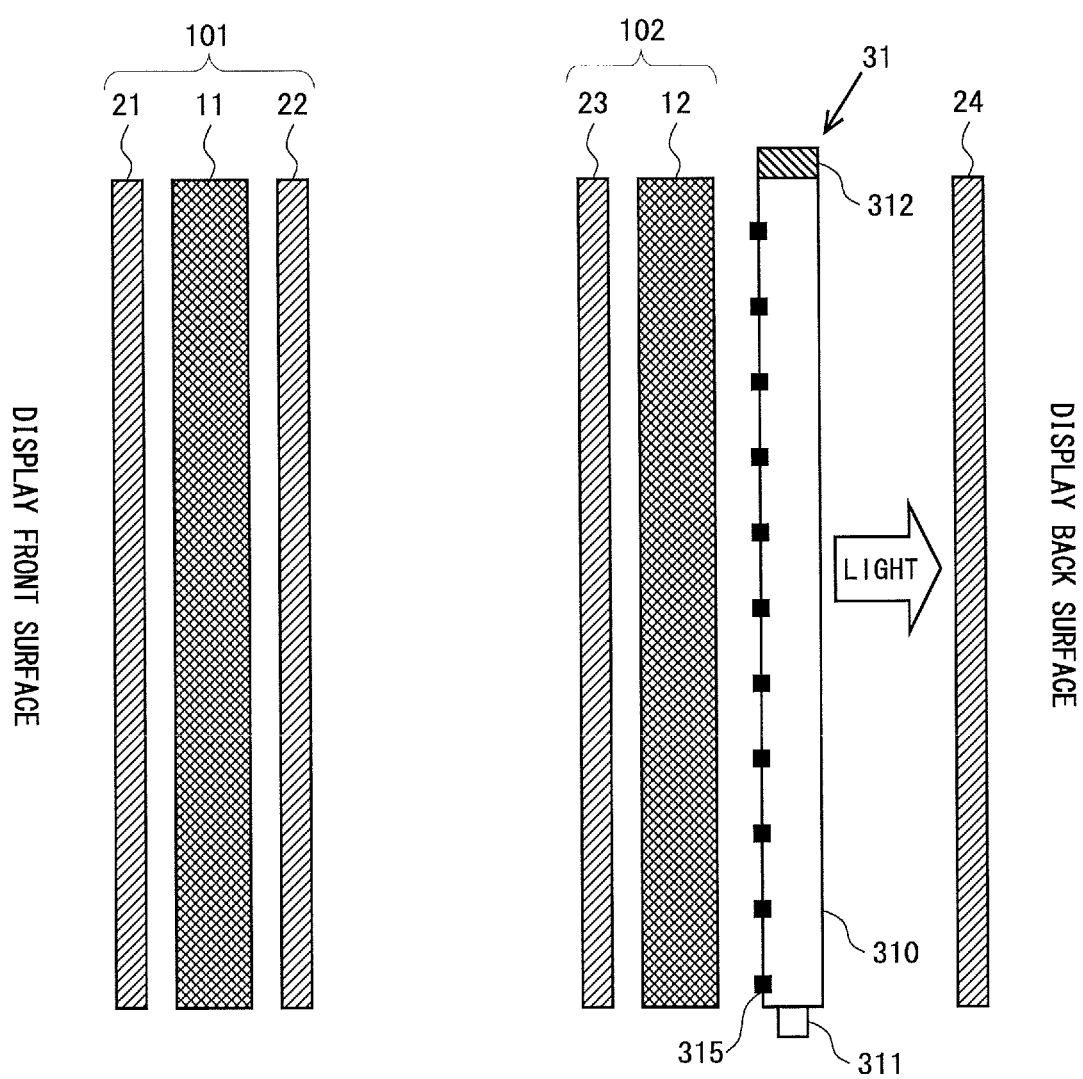
FIG. 6 is a diagram showing a configuration of an image display device according to a first embodiment of the present invention.

FIG. 6 is a diagram showing a configuration of an image display device according to a first embodiment of the present invention. As shown in FIG. 6, in the present embodiment, the first panel body emission-side polarizing plate 21, the first panel body 11, the first panel body incidence-side polarizing plate 22, the second panel body emission-side polarizing plate 23, the second panel body 12, the back-surface irradiation light source 31, and the second panel body incidence-side polarizing plate 24 are provided from the display front-surface side toward the display back-surface side. That is, the back-surface irradiation light source 31 is provided between the second panel body 12 and the second panel body incidence-side polarizing plate 24. In the present embodiment, the first panel body emission-side polarizing plate 21, the first panel body 11, and the first panel body incidence-side polarizing plate 22 constitute a first liquid-crystal panel 101, and the second panel body emission-side polarizing plate 23 and the second panel body 12 constitute a second liquid-crystal panel 102. However, it is also possible to adopt a configuration in which one of the first panel body incidence-side polarizing plate 22 and the second panel body emission-side polarizing plate 23 is not provided. The emission polarization direction of the second liquid-crystal panel 102 (the direction of the transmission axis of the second panel body emission-side polarizing plate 23) is set to be the same as the incident polarization direction of the first liquid-crystal panel 101 (the direction of the transmission axis of the first panel body incidence-side polarizing plate 22) (the polarization direction of light incident to the first panel body 11 when desired image display is performed by the first liquid-crystal panel 101). Further, it is assumed that, in all embodiments including the present embodiment, the TN mode is adopted as the operation mode of the liquid crystal. That is, it is assumed that inside the first panel body 11 and the second panel body 12, liquid crystal molecules are arranged in a 90-degree twisted state. However, the present invention is not limited thereto, and a mode other than the TN mode may be adopted as the operation mode of the liquid crystal.

Further, the frontmost polarizing plate is realized by the first panel body emission-side polarizing plate 21, the rearmost polarizing plate is realized by the second panel body incidence-side polarizing plate 24, and the inter-panel polarizing plate is realized by the first panel body incidence-side polarizing plate 22 or the second panel body emission-side polarizing plate 23.

<1.2 Detailed Configuration of Second Liquid-Crystal Panel Side>

Figure 7:
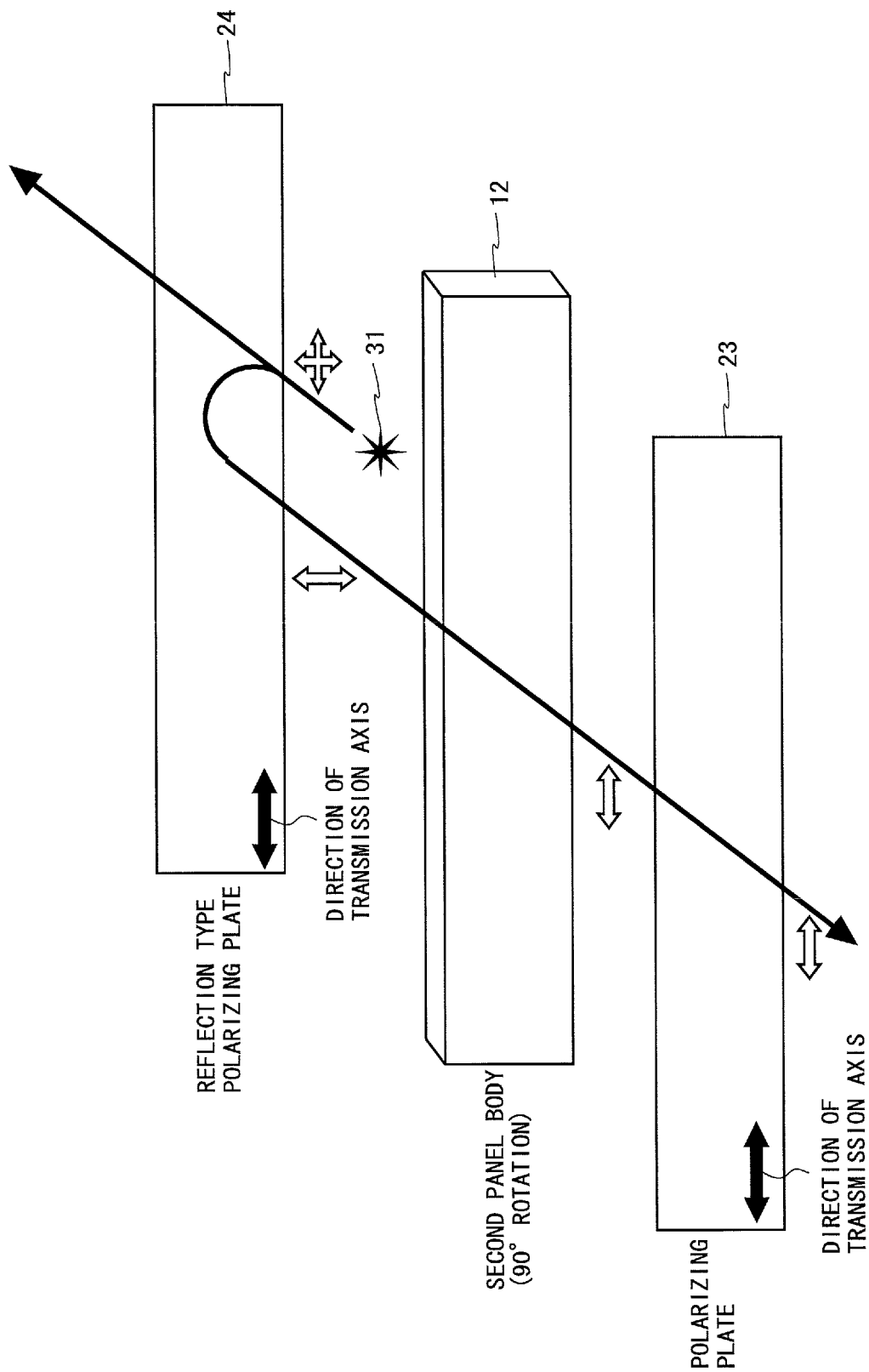
FIG. 7 is a diagram for describing a detailed configuration of a second liquid-crystal panel side in the first embodiment.
Figure 8:
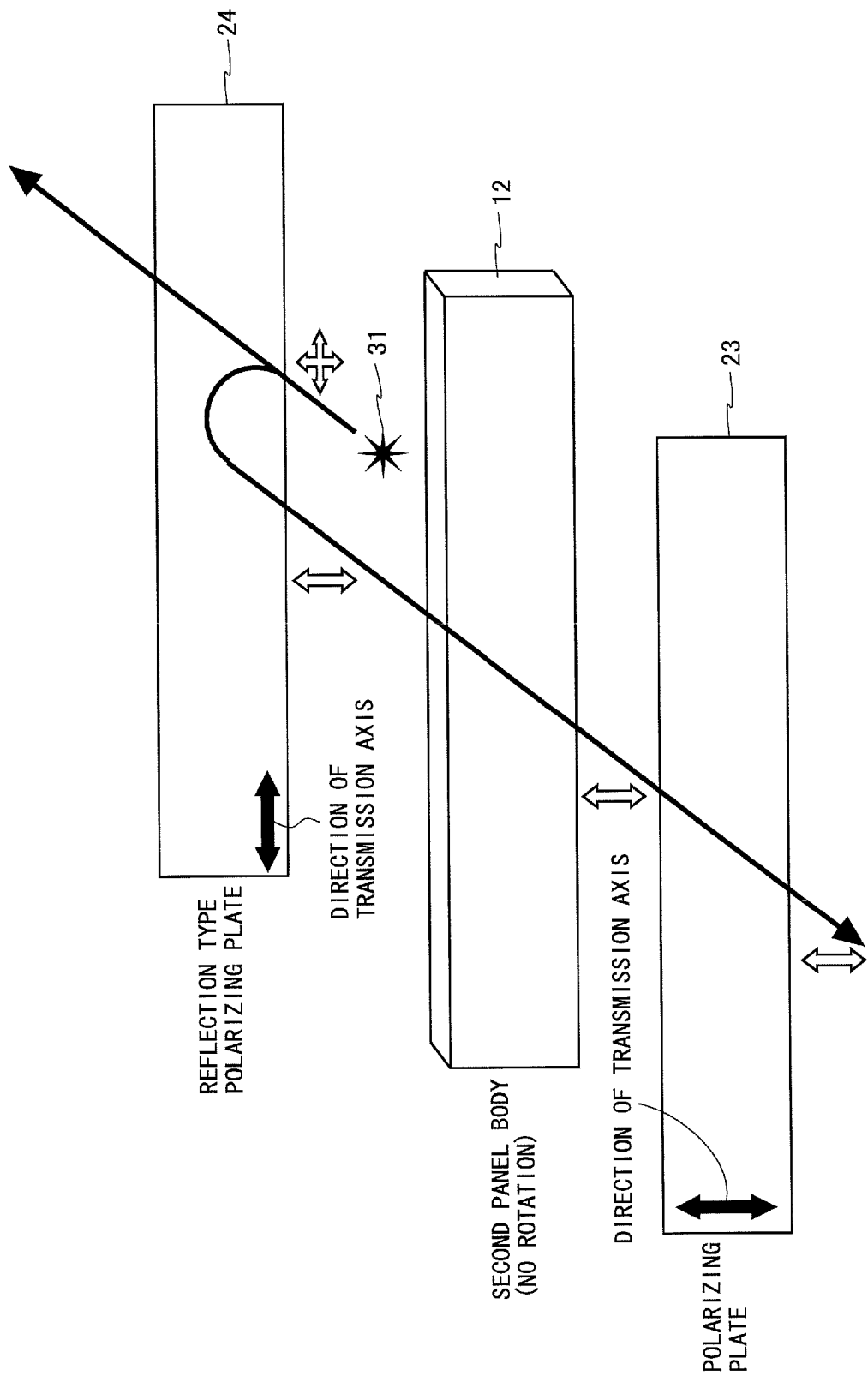
FIG. 8 is a diagram for describing a detailed configuration of the second liquid-crystal panel side in the first embodiment.

With reference to FIG. 7 and FIG. 8, a detailed configuration of the second liquid-crystal panel 102 side will be described. A reflection type polarizing plate is adopted for the second panel body incidence-side polarizing plate 24. Any of the reflection type polarizing plate and the absorption type polarizing plate can be adopted for the second panel body emission-side polarizing plate 23.

First, with reference to FIG. 7, there will be described how light advances when the transmission axis of the second panel body incidence-side polarizing plate 24 and the transmission axis of the second panel body emission-side polarizing plate 23 are parallel to each other. When linearly polarized light emitted from the back-surface irradiation light source 31 is incident to the second panel body incidence-side polarizing plate 24, a polarization component having the same polarization direction as the direction of the transmission axis of the second panel body incidence-side polarizing plate 24 passes through the second panel body incidence-side polarizing plate 24 and exits to the outside. On the other hand, a polarization component having the same polarization direction as the direction of the reflection axis of the second panel body incidence-side polarizing plate 24 is reflected by the second panel body incidence-side polarizing plate 24 and its advance direction is inverted. Then, the polarization component is incident to the second panel body 12. In this case, when no voltage is applied to the liquid crystal in the second panel body 12, the polarization component incident to the second panel body 12 passes through the second panel body 12 while rotating the polarization direction by 90 degrees, and is incident to the second panel body emission-side polarizing plate 23. Because the polarization direction of the polarization component incident to the second panel body emission-side polarizing plate 23 is the same as the direction of the transmission axis of the second panel body emission-side polarizing plate 23, the polarization component passes through the second panel body emission-side polarizing plate 23 and exits to the front side. When a predetermined voltage is applied to the liquid crystal in the second panel body 12, the polarization component incident to the second panel body 12 passes through the second panel body 12 without rotating the polarization direction. Therefore, the polarization component does not pass through the second panel body emission-side polarizing plate 23.

Next, with reference to FIG. 8, there will be described how light advances when the transmission axis of the second panel body incidence-side polarizing plate 24 and the transmission axis of the second panel body emission-side polarizing plate 23 are orthogonal to each other. When linearly polarized light emitted from the back-surface irradiation light source 31 is incident to the second panel body incidence-side polarizing plate 24, a polarization component having the same polarization direction as the direction of the transmission axis of the second panel body incidence-side polarizing plate passes through the second panel body incidence-side polarizing plate 24 and exits to the outside. On the other hand, a polarization component having the same polarization direction as the direction of the reflection axis of the second panel body incidence-side polarizing plate 24 is reflected by the second panel body incidence-side polarizing plate 24 and its advance direction is inverted. Then, the polarization component is incident to the second panel body 12. In this case, when a predetermined voltage is applied to the liquid crystal in the second panel body 12, the polarization component incident to the second panel body 12 passes through the second panel body 12 without rotating the polarization direction, and is incident to the second panel body emission-side polarizing plate 23. Because the polarization direction of the polarization component incident to the second panel body emission-side polarizing plate 23 is the same as the direction of the transmission axis of the second panel body emission-side polarizing plate 23, the polarization component passes through the second panel body emission-side polarizing plate 23 and exits to the front side. When no voltage is applied to the liquid crystal in the second panel body 12, the polarization component incident to the second panel body 12 passes through the second panel body 12 while rotating the polarization direction by 90 degrees. Therefore, the polarization component does not pass through the second panel body emission-side polarizing plate 23.

As described above, concerning the relationship between the second panel body incidence-side polarizing plate 24 and the second panel body emission-side polarizing plate 23, the transmission axes of both polarizing plates may be parallel to each other or the transmission axes of both polarizing plates may be orthogonal to each other.

<1.3 Detailed Configuration of First Liquid-Crystal Panel Side>

Figure 9:
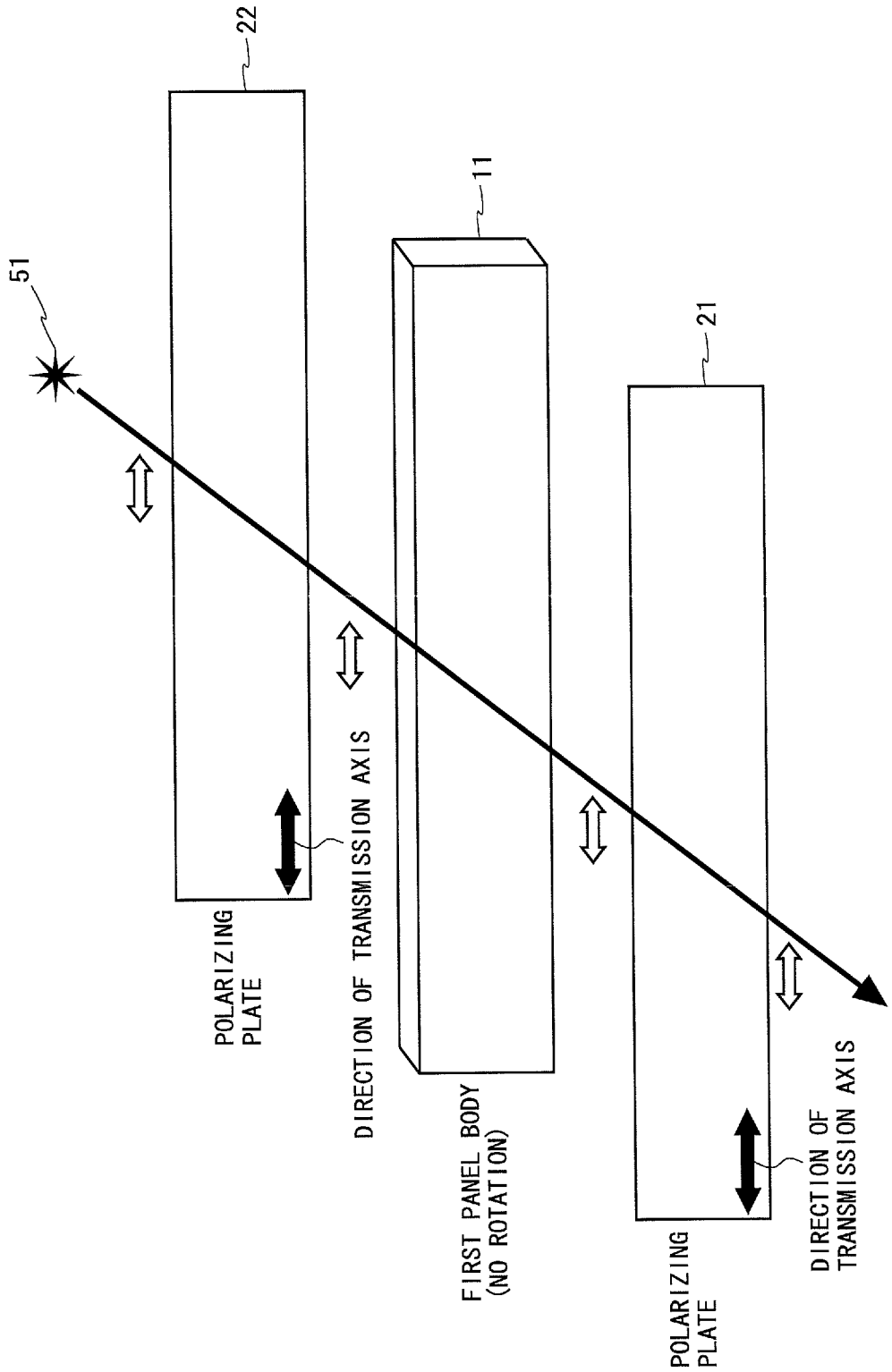
FIG. 9 is a diagram for describing a detailed configuration of a first liquid-crystal panel side in the first embodiment.
Figure 10:
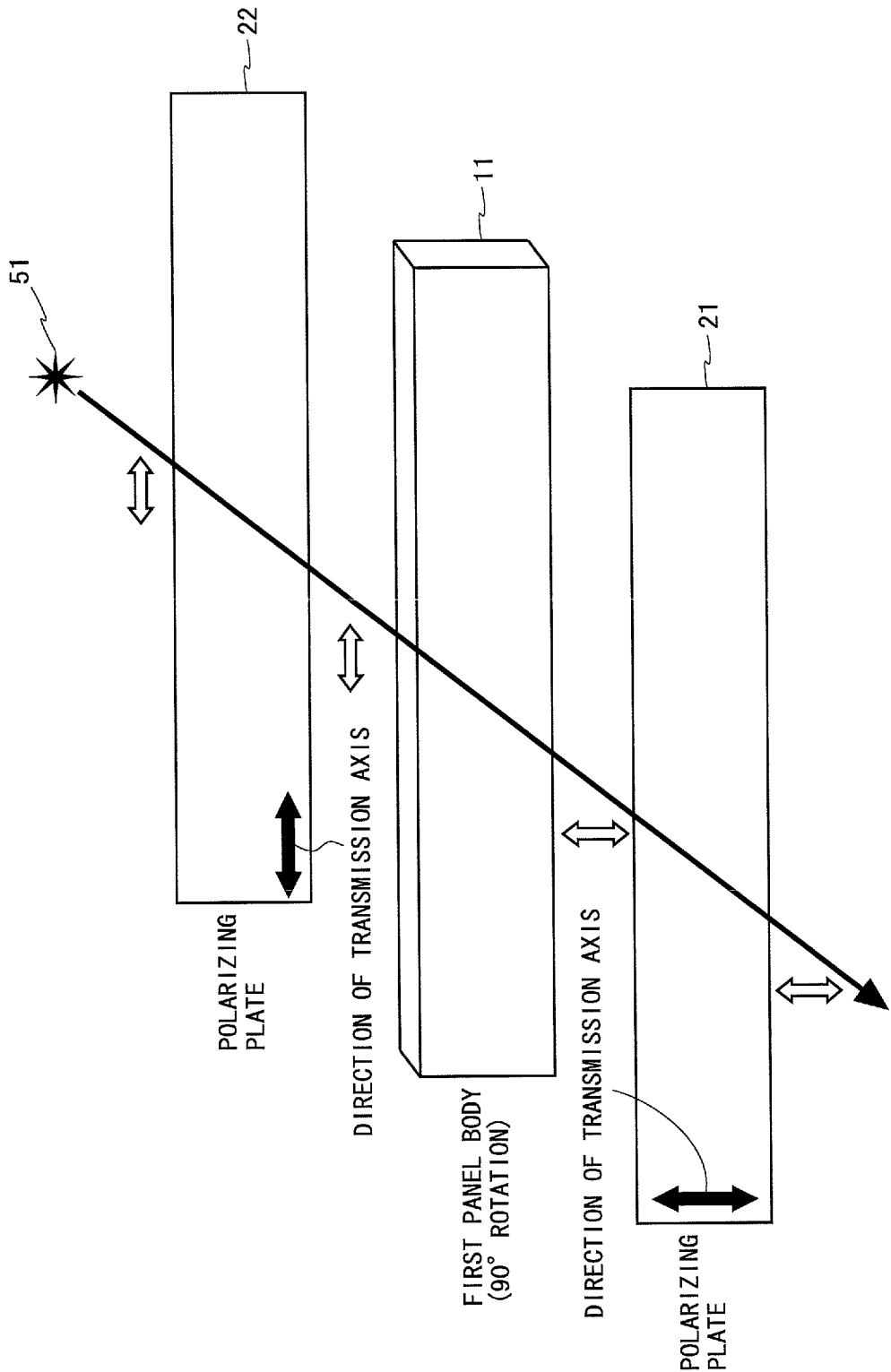
FIG. 10 is a diagram for describing a detailed configuration of the first liquid-crystal panel side in the first embodiment.

With reference to FIG. 9 and FIG. 10, a detailed configuration of the first liquid-crystal panel 101 side will be described. In FIG. 9 and FIG. 10, a mark indicated by reference numeral 51 represents linearly polarized light that has passed through the second panel body emission-side polarizing plate 23. Any of the reflection type polarizing plate and the absorption type polarizing plate can be adopted for the first panel body incidence-side polarizing plate 22 and the first panel body emission-side polarizing plate 21. It is assumed that the transmission axis of the first panel body incidence-side polarizing plate 22 and the transmission axis of the second panel body emission-side polarizing plate 23 are parallel to each other. A configuration shown in FIG. 9 is adopted when the first liquid-crystal panel 101 is operated in the normally black mode, and a configuration shown in FIG. 10 is adopted when the first liquid-crystal panel 101 is operated in the normally white mode.

First, with reference to FIG. 9, there will be described how light advances when the transmission axis of the first panel body incidence-side polarizing plate 22 and the transmission axis of the first panel body emission-side polarizing plate 21 are parallel to each other. Because the transmission axis of the first panel body incidence-side polarizing plate 22 and the transmission axis of the second panel body emission-side polarizing plate 23 are parallel to each other, the linearly polarized light 51 that has passed through the second panel body emission-side polarizing plate 23 passes through the first panel body incidence-side polarizing plate 22, and is incident to the first panel body 11. In this case, when a predetermined voltage is applied to the liquid crystal in the first panel body 11, the polarization component incident to the first panel body 11 passes through the first panel body 11 without rotating the polarization direction, and is incident to the first panel body emission-side polarizing plate 21. Because the polarization direction of the polarization component incident to the first panel body emission-side polarizing plate 21 is the same as the direction of the transmission axis of the first panel body emission-side polarizing plate 21, the polarization component passes through the first panel body emission-side polarizing plate 21 and exits to the front side. When no voltage is applied to the liquid crystal in the first panel body 11, the polarization component incident to the first panel body 11 passes through the first panel body 11 while rotating the polarization direction by 90 degrees. Therefore, the polarization component does not pass through the first panel body emission-side polarizing plate 21.

Next, with reference to FIG. 10, there will be described how light advances when the transmission axis of the first panel body incidence-side polarizing plate 22 and the transmission axis of the first panel body emission-side polarizing plate 21 are orthogonal to each other. Because the transmission axis of the first panel body incidence-side polarizing plate 22 and the transmission axis of the second panel body emission-side polarizing plate 23 are parallel to each other, the linearly polarized light 51 that has passed through the second panel body emission-side polarizing plate 23 passes through the first panel body incidence-side polarizing plate 22, and is incident to the first panel body 11. In this case, when no voltage is applied to the liquid crystal in the first panel body 11, the polarization component incident to the first panel body 11 passes through the first panel body 11 while rotating the polarization direction by 90 degrees, and is incident to the first panel body emission-side polarizing plate 21. Because the polarization direction of the polarization component incident to the first panel body emission-side polarizing plate 21 is the same as the direction of the transmission axis of the first panel body emission-side polarizing plate 21, the polarization component passes through the first panel body emission-side polarizing plate 21 and exits to the front side. When a predetermined voltage is applied to the liquid crystal in the first panel body 11, the polarization component incident to the first panel body 11 passes through the first panel body 11 without rotating the polarization direction. Therefore, the polarization component does not pass through the first panel body emission-side polarizing plate 21.

As described above, concerning the relationship between the first panel body incidence-side polarizing plate 22 and the first panel body emission-side polarizing plate 21, the transmission axes of both polarizing plates may be parallel to each other or the transmission axes of both polarizing plates may be orthogonal to each other.

<1.4 Effects>

According to the present embodiment, the back-surface irradiation light source 31 that emits light toward the display back-surface side is provided in the region between the second panel body 12 and the second panel body incidence-side polarizing plate 24. A predetermined polarization component of light emitted from the back-surface irradiation light source 31 is reflected by the second panel body incidence-side polarizing plate 24 as a reflection type polarizing plate. The polarization component reflected by the second panel body incidence-side polarizing plate 24 passes through the second panel body 12 and the first panel body 11 depending on respective states of liquid crystals (transmittances based on magnitudes of liquid crystal application voltages) in the second panel body 12 and the first panel body 11. Accordingly, the viewer is enabled to view display images on both the first liquid-crystal panel 101 and the second liquid-crystal panel 102. In this case, by providing some space between the first liquid-crystal panel 101 and the second liquid-crystal panel 102, it is possible to display an image with a sense of depth and three-dimensional appearance. From the above, it is possible to realize a dual display having high expressive power by using one light source (the back-surface irradiation light source 31).

Further, according to the present embodiment, it is also possible to adopt a configuration not including one of the second panel body emission-side polarizing plate 23 and the first panel body incidence-side polarizing plate 22. Accordingly, a light component absorbed or reflected by the polarizing plate is reduced, and the light emitted from the light source is more effectively utilized than in the conventional art. Further, because the number of required polarizing plates is smaller than that in the conventional art, the effect of reducing the manufacturing cost can be obtained.

<1.5 Modification>

In the above description, a configuration of the display back-surface side of the second panel body incidence-side polarizing plate 24 is not mentioned. However, in order to make the background of the second liquid-crystal panel 102 black, a light absorbing material may be provided at the back side of the second panel body incidence-side polarizing plate 24. Further, in order to enhance expressive power, a space (for example, a space in which an exhibition object can be installed) may be provided at a back side of the second panel body incidence-side polarizing plate 24.

In the first embodiment, the back-surface irradiation light source 31 is provided between the second panel body 12 and the second panel body incidence-side polarizing plate 24. However, the present invention is not limited thereto. That is, the back-surface irradiation light source 31 may be provided between the first panel body emission-side polarizing plate 21 and the first panel body 11, between the first panel body 11 and the first panel body incidence-side polarizing plate 22, between the first panel body incidence-side polarizing plate 22 and the second panel body emission-side polarizing plate 23, or between the second panel body emission-side polarizing plate 23 and the second panel body 12. In these cases, it is also possible to adopt a configuration in which one of the first panel body incidence-side polarizing plate 22 and the second panel body emission-side polarizing plate 23 is not provided. Considering smallness of unnecessary reflection of light and high contrast, it is preferable to provide the back-surface irradiation light source 31 between the second panel body 12 and the second panel body incidence-side polarizing plate 24 in a similar manner to that of the first embodiment.

<2. Second Embodiment>
<2.1 Configuration>

Figure 11:
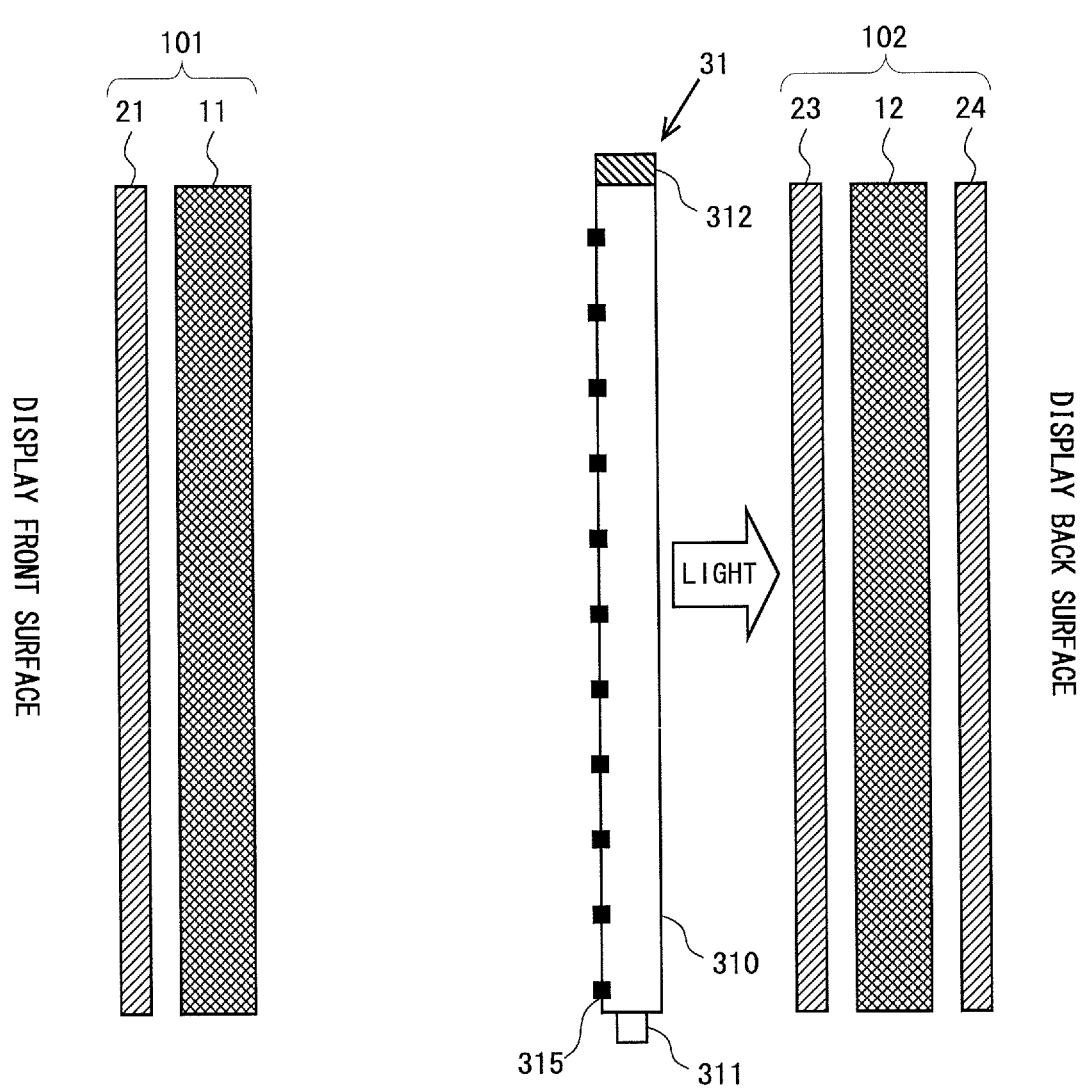
FIG. 11 is a diagram showing a configuration of an image display device according to a second embodiment of the present invention.

FIG. 11 is a diagram showing a configuration of an image display device according to a second embodiment of the present invention. As shown in FIG. 11, in the present embodiment, the first panel body emission-side polarizing plate 21, the first panel body 11, the back-surface irradiation light source 31, the second panel body emission-side polarizing plate 23, the second panel body 12, and the second panel body incidence-side polarizing plate 24 are provided from the display front-surface side toward the display back-surface side. That is, the back-surface irradiation light source 31 is provided between the first panel body 11 and the second panel body emission-side polarizing plate 23. In the present embodiment, the first panel body emission-side polarizing plate 21 and the first panel body 11 constitute the first liquid-crystal panel 101, and the second panel body emission-side polarizing plate 23, the second panel body 12, and the second panel body incidence-side polarizing plate 24 constitute the second liquid-crystal panel 102. The emission polarization direction of the second liquid-crystal panel 102 (the direction of the transmission axis of the second panel body emission-side polarizing plate 23) is set to be the same as the incident polarization direction of the first liquid-crystal panel 101 (for example, in the case of the TN mode, a long axis direction of liquid crystal molecules at the incidence side of the first panel body 11).

<2.2 Detailed Configuration of Second Liquid-Crystal Panel Side>

Figure 12:
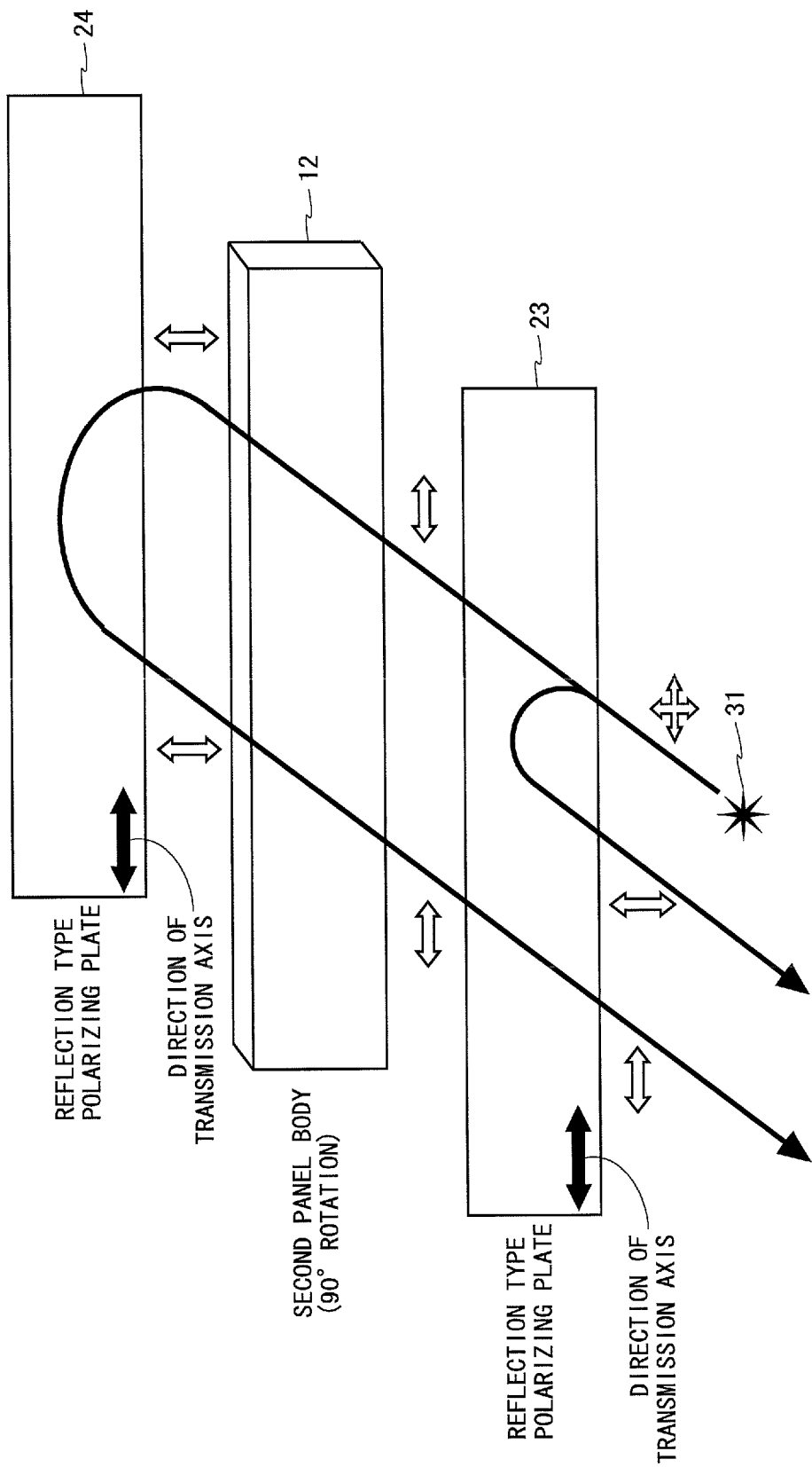
FIG. 12 is a diagram for describing a detailed configuration of a second liquid-crystal panel side in the second embodiment.
Figure 13:
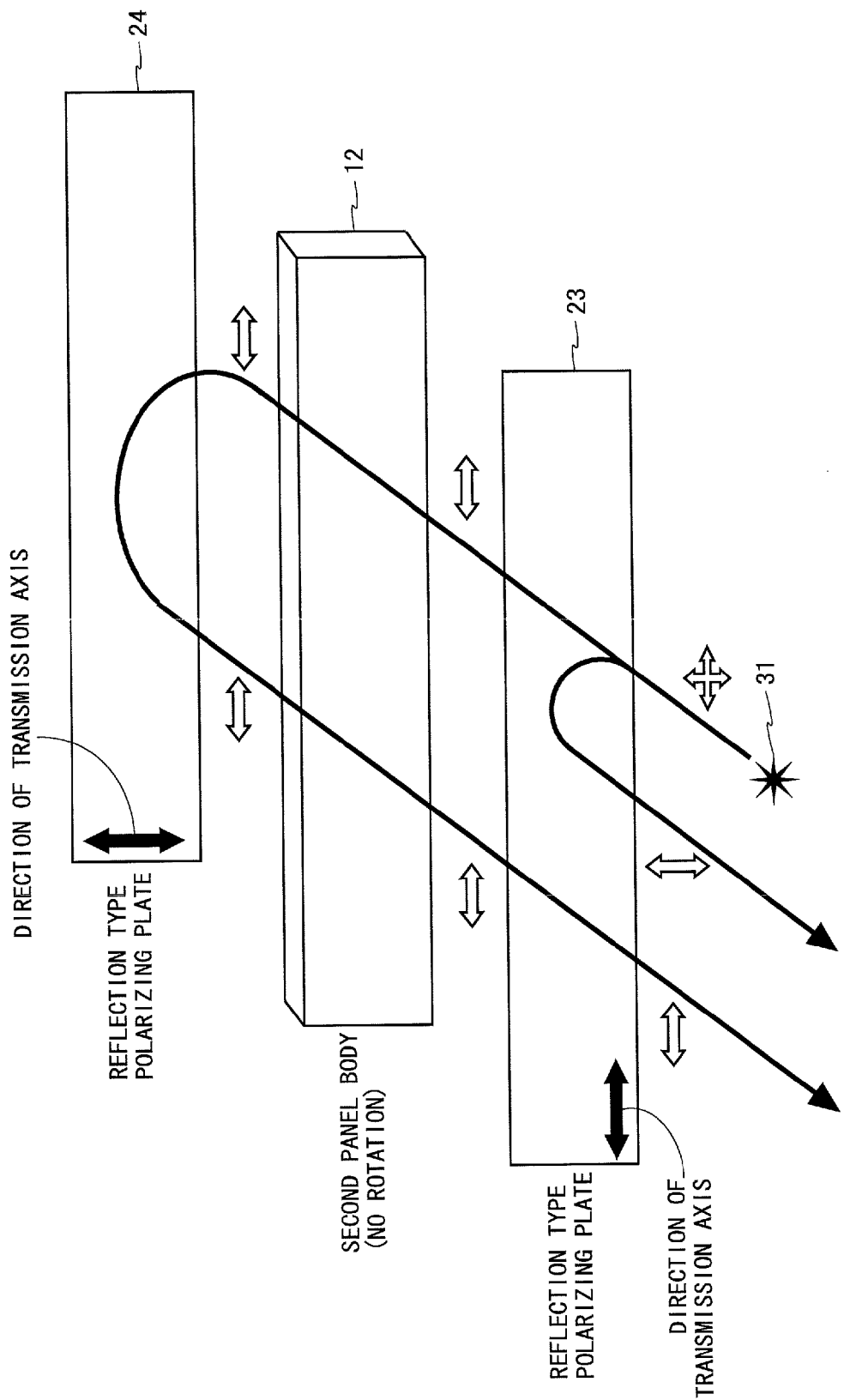
FIG. 13 is a diagram for describing a detailed configuration of the second liquid-crystal panel side in the second embodiment.

With reference to FIG. 12 and FIG. 13, a detailed configuration of the second liquid-crystal panel 102 side will be described. A reflection type polarizing plate is adopted for both the second panel body incidence-side polarizing plate 24 and the second panel body emission-side polarizing plate 23. A configuration shown in FIG. 12 is adopted when the second liquid-crystal panel 102 is operated in the normally black mode, and a configuration shown in FIG. 13 is adopted when the second liquid-crystal panel 102 is operated in the normally white mode.

First, with reference to FIG. 12, there will be described how light advances when the transmission axis of the second panel body incidence-side polarizing plate 24 and the transmission axis of the second panel body emission-side polarizing plate 23 are parallel to each other. When linearly polarized light emitted from the back-surface irradiation light source 31 is incident to the second panel body emission-side polarizing plate 23, a polarization component having the same polarization direction as the direction of the transmission axis of the second panel body emission-side polarizing plate passes through the second panel body emission-side polarizing plate 23, and is incident to the second panel body 12. On the other hand, a polarization component having the same polarization direction as the direction of the reflection axis of the second panel body emission-side polarizing plate 23 is reflected by the second panel body emission-side polarizing plate 23 and its advance direction is inverted. In this case, when no voltage is applied to the liquid crystal in the second panel body 12, the polarization component incident to the second panel body 12 passes through the second panel body 12 while rotating the polarization direction by 90 degrees, and is incident to the second panel body incidence-side polarizing plate 24. Because the polarization direction of the polarization component incident to the second panel body incidence-side polarizing plate 24 is orthogonal to the direction of the transmission axis of the second panel body incidence-side polarizing plate 24, the polarization component is reflected by the second panel body incidence-side polarizing plate 24. The polarization component reflected by the second panel body incidence-side polarizing plate 24 is incident to the second panel body 12. The polarization component incident to the second panel body 12 passes through the second panel body 12 while rotating the polarization direction by 90 degrees, and is incident to the second panel body emission-side polarizing plate 23. Because the polarization direction of the polarization component incident to the second panel body emission-side polarizing plate 23 is the same as the direction of the transmission axis of the second panel body emission-side polarizing plate 23, the polarization component passes through the second panel body emission-side polarizing plate 23 and exits to the front side. When a predetermined voltage is applied to the liquid crystal in the second panel body 12, the polarization component incident from the second panel body emission-side polarizing plate 23 to the second panel body 12 passes through the second panel body 12 without rotating the polarization direction. Therefore, the polarization component passes through the second panel body incidence-side polarizing plate 24 and exits to the outside.

Next, with reference to FIG. 13, there will be described how light advances when the transmission axis of the second panel body incidence-side polarizing plate 24 and the transmission axis of the second panel body emission-side polarizing plate 23 are orthogonal to each other. When linearly polarized light emitted from the back-surface irradiation light source 31 is incident to the second panel body emission-side polarizing plate 23, a polarization component having the same polarization direction as the direction of the transmission axis of the second panel body emission-side polarizing plate 23 passes through the second panel body emission-side polarizing plate 23, and is incident to the second panel body 12. On the other hand, a polarization component having the same polarization direction as the direction of the reflection axis of the second panel body emission-side polarizing plate 23 is reflected by the second panel body emission-side polarizing plate 23 and its advance direction is inverted. In this case, when a predetermined voltage is applied to the liquid crystal in the second panel body 12, the polarization component incident to the second panel body 12 passes through the second panel body 12 without rotating the polarization direction, and is incident to the second panel body incidence-side polarizing plate 24. Because the polarization direction of the polarization component incident to the second panel body incidence-side polarizing plate 24 is orthogonal to the direction of the transmission axis of the second panel body incidence-side polarizing plate 24, the polarization component is reflected by the second panel body incidence-side polarizing plate 24. The polarization component reflected by the second panel body incidence-side polarizing plate 24 is incident to the second panel body 12. The polarization component incident to the second panel body 12 passes through the second panel body 12 without rotating the polarization direction, and is incident to the second panel body emission-side polarizing plate 23. Because the polarization direction of the polarization component incident to the second panel body emission-side polarizing plate 23 is the same as the direction of the transmission axis of the second panel body emission-side polarizing plate 23, the polarization component passes through the second panel body emission-side polarizing plate 23 and exits to the front side. When no voltage is applied to the liquid crystal in the second panel body 12, the polarization component incident to the second panel body 12 from the second panel body emission-side polarizing plate 23 passes through the second panel body 12 while rotating the polarization direction by 90 degrees. Therefore, the polarization component passes through the second panel body incidence-side polarizing plate 24 and exits to the outside.

As described above, concerning the relationship between the second panel body incidence-side polarizing plate 24 and the second panel body emission-side polarizing plate 23, the transmission axes of both polarizing plates may be parallel to each other or the transmission axes of both polarizing plates may be orthogonal to each other.

<2.3 Detailed Configuration of First Liquid-Crystal Panel Side>

Figure 14:
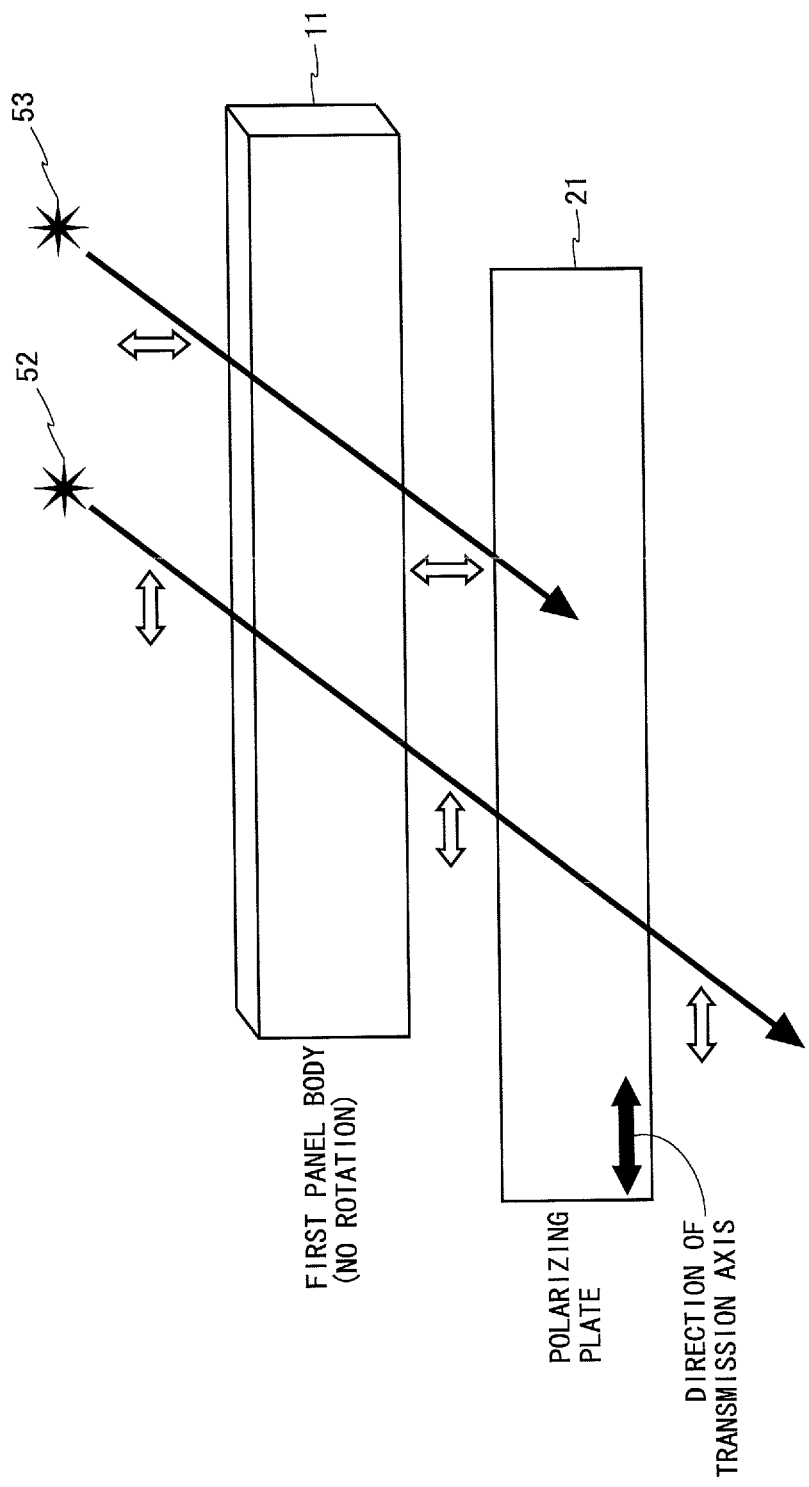
FIG. 14 is a diagram for describing a detailed configuration of a first liquid-crystal panel side in the second embodiment.
Figure 15:
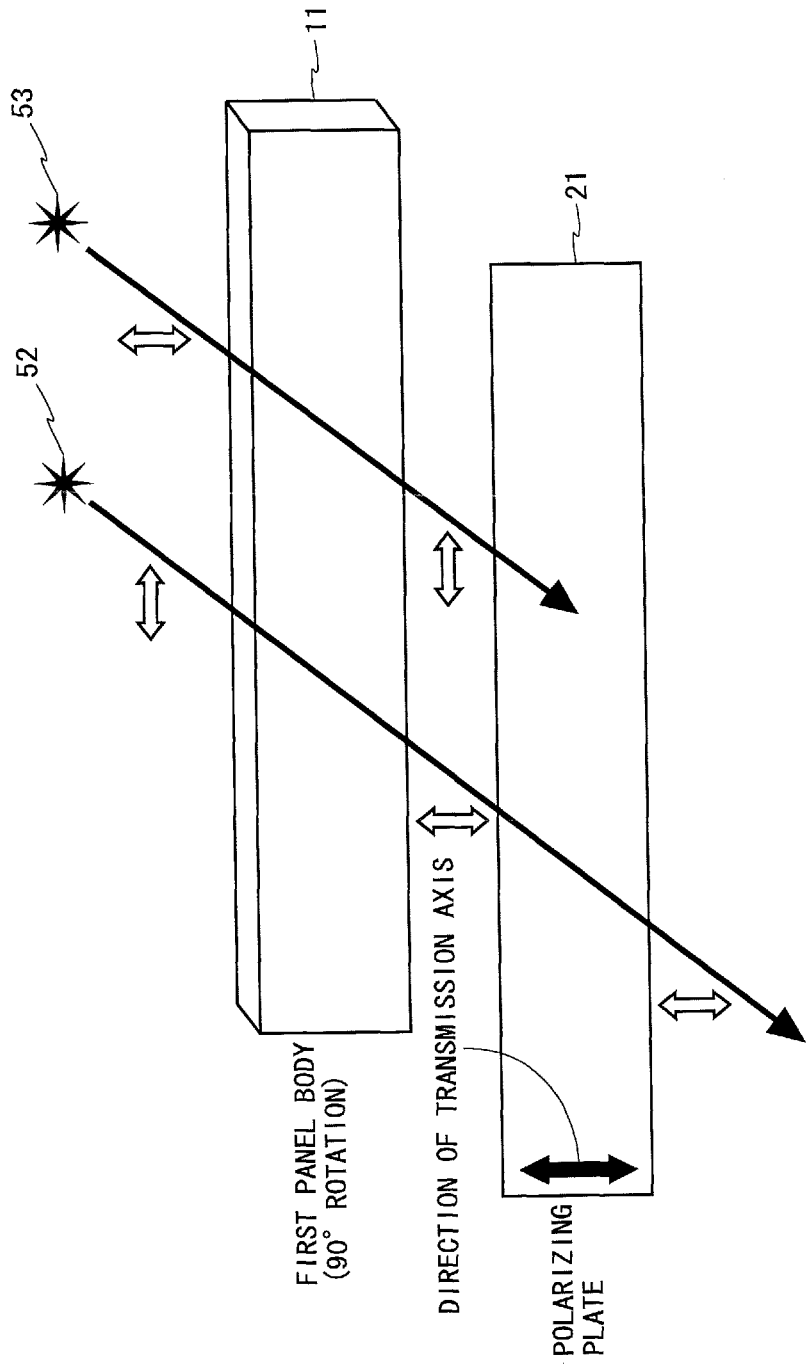
FIG. 15 is a diagram for describing a detailed configuration of the first liquid-crystal panel side in the second embodiment.

With reference to FIG. 14 and FIG. 15, a detailed configuration of the first liquid-crystal panel 101 side will be described. In FIG. 14 and FIG. 15, a mark indicated by reference numeral 52 represents linearly polarized light having passed through the second panel body emission-side polarizing plate 23, and a mark indicated by reference numeral 53 represents linearly polarized light reflected by the second panel body emission-side polarizing plate 23. Any of the reflection type polarizing plate and the absorption type polarizing plate can be adopted for the first panel body emission-side polarizing plate 21.

First, with reference to FIG. 14, there will be described how light advances when the transmission axis of the second panel body emission-side polarizing plate 23 and the transmission axis of the first panel body emission-side polarizing plate 21 are parallel to each other. The linearly polarized light 52 having passed through the second panel body emission-side polarizing plate 23 is incident to the first panel body 11. In this case, when a predetermined voltage is applied to the liquid crystal in the first panel body 11, the polarization component incident to the first panel body 11 passes through the first panel body 11 without rotating the polarization direction, and is incident to the first panel body emission-side polarizing plate 21. Because the polarization direction of the polarization component incident to the first panel body emission-side polarizing plate 21 is the same as the direction of the transmission axis of the first panel body emission-side polarizing plate 21, the polarization component passes through the first panel body emission-side polarizing plate 21 and exits to the front side. When no voltage is applied to the liquid crystal in the first panel body 11, the polarization component incident to the first panel body 11 passes through the first panel body 11 while rotating the polarization direction by 90 degrees. Therefore, the polarization component does not pass through the first panel body emission-side polarizing plate 21.

The linearly polarized light 53 reflected by the second panel body emission-side polarizing plate 23 is incident to the first panel body 11. In this case, when a predetermined voltage is applied to the liquid crystal in the first panel body 11, the polarization component incident to the first panel body 11 passes through the first panel body 11 without rotating the polarization direction, and is incident to the first panel body emission-side polarizing plate 21. Because the polarization direction of the polarization component incident to the first panel body emission-side polarizing plate 21 is orthogonal to the direction of the transmission axis of the first panel body emission-side polarizing plate 21, the polarization component does not pass through the first panel body emission-side polarizing plate 21. When no voltage is applied to the liquid crystal in the first panel body 11, the polarization component incident to the first panel body 11 passes through the first panel body 11 while rotating the polarization direction by 90 degrees. Therefore, the polarization component passes through the first panel body emission-side polarizing plate 21 and exits to the front side.

Next, with reference to FIG. 15, there will be described how light advances when the transmission axis of the second panel body emission-side polarizing plate 23 and the transmission axis of the first panel body emission-side polarizing plate 21 are orthogonal to each other. The linearly polarized light 52 having passed through the second panel body emission-side polarizing plate 23 is incident to the first panel body 11. In this case, when no voltage is applied to the liquid crystal in the first panel body 11, the polarization component incident to the first panel body 11 passes through the first panel body 11 while rotating the polarization direction by 90 degrees, and is incident to the first panel body emission-side polarizing plate 21. Because the polarization direction of the polarization component incident to the first panel body emission-side polarizing plate 21 is the same as the direction of the transmission axis of the first panel body emission-side polarizing plate 21, the polarization component passes through the first panel body emission-side polarizing plate 21 and exits to the front side. When a predetermined voltage is applied to the liquid crystal in the first panel body 11, the polarization component incident to the first panel body 11 passes through the first panel body 11 without rotating the polarization direction. Therefore, the polarization component does not pass through the first panel body emission-side polarizing plate 21.

The linearly polarized light 53 reflected by the second panel body emission-side polarizing plate 23 is incident to the first panel body 11. In this case, when no voltage is applied to the liquid crystal in the first panel body 11, the polarization component incident to the first panel body 11 passes through the first panel body 11 while rotating the polarization direction by 90 degrees, and is incident to the first panel body emission-side polarizing plate 21. Because the polarization direction of the polarization component incident to the first panel body emission-side polarizing plate 21 is orthogonal to the direction of the transmission axis of the first panel body emission-side polarizing plate 21, the polarization component does not pass through the first panel body emission-side polarizing plate 21. When a predetermined voltage is applied to the liquid crystal in the first panel body 11, the polarization component incident to the first panel body 11 passes through the first panel body 11 without rotating the polarization direction. Therefore, the polarization component passes through the first panel body emission-side polarizing plate 21 and exits to the front side.

As described above, concerning the relationship between the first panel body incidence-side polarizing plate 22 and the first panel body emission-side polarizing plate 21, the transmission axes of both polarizing plates may be parallel to each other or the transmission axes of both polarizing plates may be orthogonal to each other.

<2.4 Effects>

According to the present embodiment, the back-surface irradiation light source 31 that emits light toward the display back-surface side is provided in the region between the first panel body 11 and the second panel body emission-side polarizing plate 23. A predetermined polarization component of light emitted from the back-surface irradiation light source 31 is reflected by the second panel body incidence-side polarizing plate 24 as a reflection type polarizing plate. The polarization component reflected by the second panel body incidence-side polarizing plate 24 passes through the second panel body 12 and the first panel body 11, depending on the states of respective liquid crystals in the second panel body 12 and the first panel body 11. Another predetermined polarization component of light emitted from the back-surface irradiation light source 31 is reflected by the second panel body emission-side polarizing plate 23 as a reflection type polarizing plate. The polarization component reflected by the second panel body emission-side polarizing plate 23 passes through the first panel body 11, depending on the state of the liquid crystal in the first panel body 11. Accordingly, the viewer is enabled to view display images on both the first liquid-crystal panel 101 and the second liquid-crystal panel 102. In this case, by providing some space between the first liquid-crystal panel 101 and the second liquid-crystal panel 102, it is possible to display an image with a sense of depth and three-dimensional appearance. From the above, it is possible to realize a dual display having high expressive power by using one light source (the back-surface irradiation light source 31).

Further, when most of the polarization component reflected by the second panel body incidence-side polarizing plate 24 passes through the first panel body 11, only a little of the polarization component reflected by the second panel body emission-side polarizing plate 23 passes through the first panel body 11. When only a little of the polarization component reflected by the second panel body incidence-side polarizing plate 24 passes through the first panel body 11, most of the polarization component reflected by the second panel body emission-side polarizing plate 23 passes through the first panel body 11. In this case, the distance from the position of the viewer to the second panel body emission-side polarizing plate 23 is shorter than the distance from the position of the viewer to the second panel body incidence-side polarizing plate 24. From the above, when a display image by the first liquid-crystal panel 101 is bright, the display image becomes opaque, and therefore, the display image by the second liquid-crystal panel 102 become less visible. On the other hand, when a display image by the first liquid-crystal panel 101 is dark, the display image becomes transparent, and therefore, the display image by the second liquid-crystal panel 102 becomes easily visible. According to the present embodiment, such a unique display is possible.

<2.5 Modification>

In the second embodiment, the back-surface irradiation light source 31 is provided between the first panel body 11 and the second panel body emission-side polarizing plate 23. However, the present invention is not limited thereto. The back-surface irradiation light source 31 may be provided between the first panel body emission-side polarizing plate 21 and the first panel body 11. However, considering smallness of unnecessary reflection of light and high contrast, it is preferable to provide the back-surface irradiation light source 31 between the first panel body 11 and the second panel body emission-side polarizing plate 23.

Further, in a similar manner to that of the modification of the first embodiment, in order to make the background of the second liquid-crystal panel 102 black, a light absorbing material may be provided at the back side of the second panel body incidence-side polarizing plate 24. Alternatively, in order to enhance expressive power, a space (for example, a space in which an exhibition object can be installed) may be provided at a back side of the second panel body incidence-side polarizing plate 24.

<3. Third Embodiment>

<3.1 Configuration>

Figure 16:
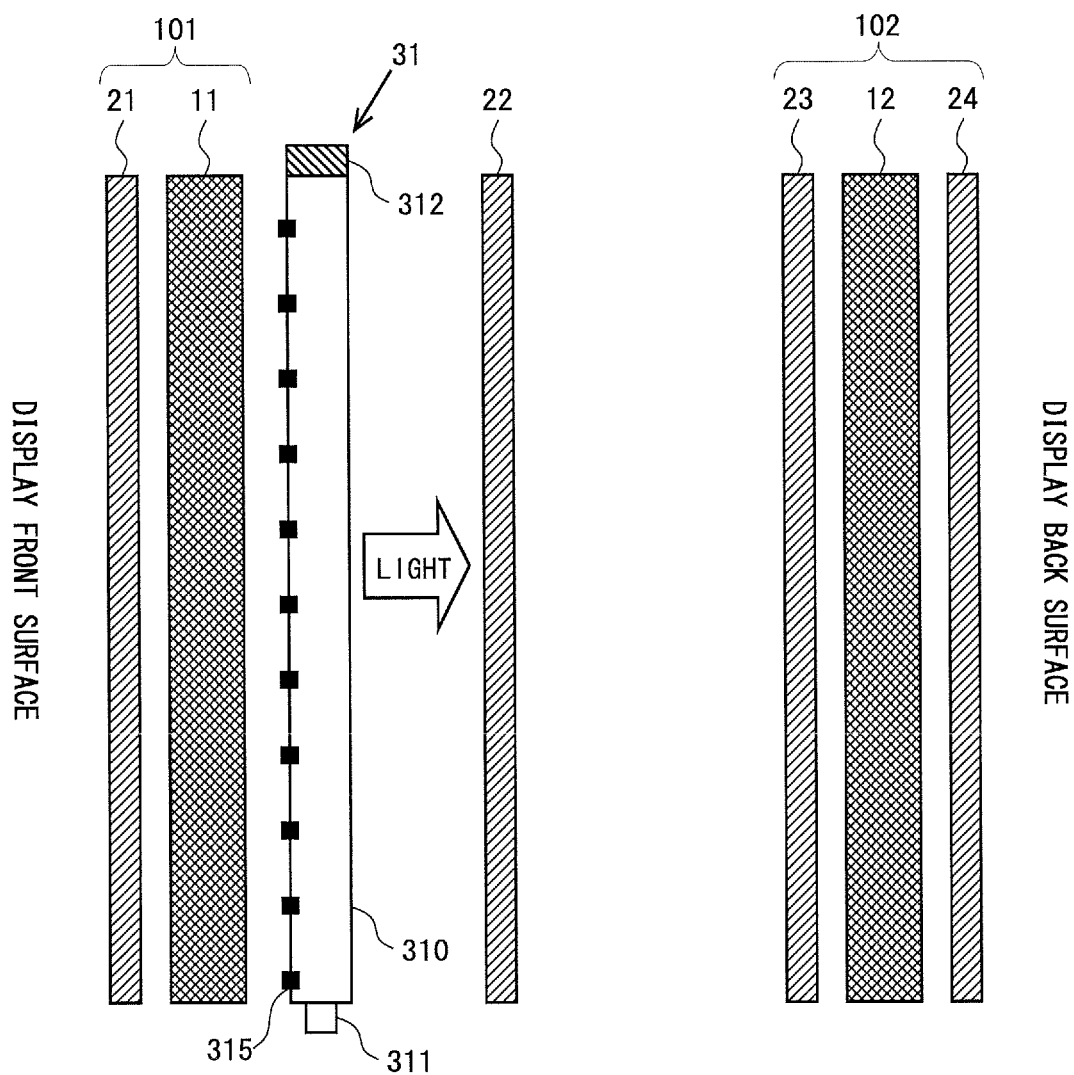
FIG. 16 is a diagram showing a configuration of an image display device according to a third embodiment of the present invention.

FIG. 16 is a diagram showing a configuration of an image display device according to a third embodiment of the present invention. As shown in FIG. 16, in the present embodiment, the first panel body emission-side polarizing plate 21, the first panel body 11, the back-surface irradiation light source 31, the first panel body incidence-side polarizing plate 22, the second panel body emission-side polarizing plate 23, the second panel body 12, and the second panel body incidence-side polarizing plate 24 are provided from the display front-surface side toward the display back-surface side. That is, the back-surface irradiation light source 31 is provided between the first panel body 11 and the first panel body incidence-side polarizing plate 22. In the present embodiment, the first panel body emission-side polarizing plate 21 and the first panel body 11 constitute the first liquid-crystal panel 101, and the second panel body emission-side polarizing plate 23, the second panel body 12, and the second panel body incidence-side polarizing plate 24 constitute the second liquid-crystal panel 102. The emission polarization direction of the second liquid-crystal panel 102

(the direction of the transmission axis of the second panel body emission-side polarizing plate 23) is set to be the same as the incident polarization direction of the first liquid-crystal panel 101 (for example, in the case of the TN mode, a long axis direction of liquid crystal molecules at the incidence side of the first panel body 11).

A reflection type polarizing plate is adopted for the first panel body incidence-side polarizing plate 22 and the second panel body incidence-side polarizing plate 24. Any of the reflection type polarizing plate and the absorption type polarizing plate can be adopted for the first panel body emission-side polarizing plate 21 and the second panel body emission-side polarizing plate 23. Further, it is also possible to adopt a configuration in which the second panel body emission-side polarizing plate 23 is not provided.

Light advances in a similar manner to that of the second embodiment. Therefore, concerning the relationship between the second panel body incidence-side polarizing plate 24 and the second panel body emission-side polarizing plate 23, the transmission axes of both polarizing plates may be parallel to each other or the transmission axes of both polarizing plates may be orthogonal to each other. Further, concerning the relationship between the first panel body incidence-side polarizing plate 22 and the first panel body emission-side polarizing plate 21, the transmission axes of both polarizing plates may be parallel to each other or the transmission axes of both polarizing plates may be orthogonal to each other.

<3.2 Effects>

According to the present embodiment, it is possible to realize a dual display having high expressive power by using one light source (the back-surface irradiation light source 31), in a similar manner to that of the second embodiment. Further, in a similar manner to that of the second embodiment, when a display image by the first liquid-crystal panel 101 is bright, the display image becomes opaque, and therefore, the display image by the second liquid-crystal panel 102 becomes less visible. When a display image by the first liquid-crystal panel 101 is dark, the display image becomes transparent, and therefore, the display image by the second liquid-crystal panel 102 becomes easily visible. Such a unique display is possible.

<4. Fourth Embodiment>
<4.1 Configuration>

Figure 17:
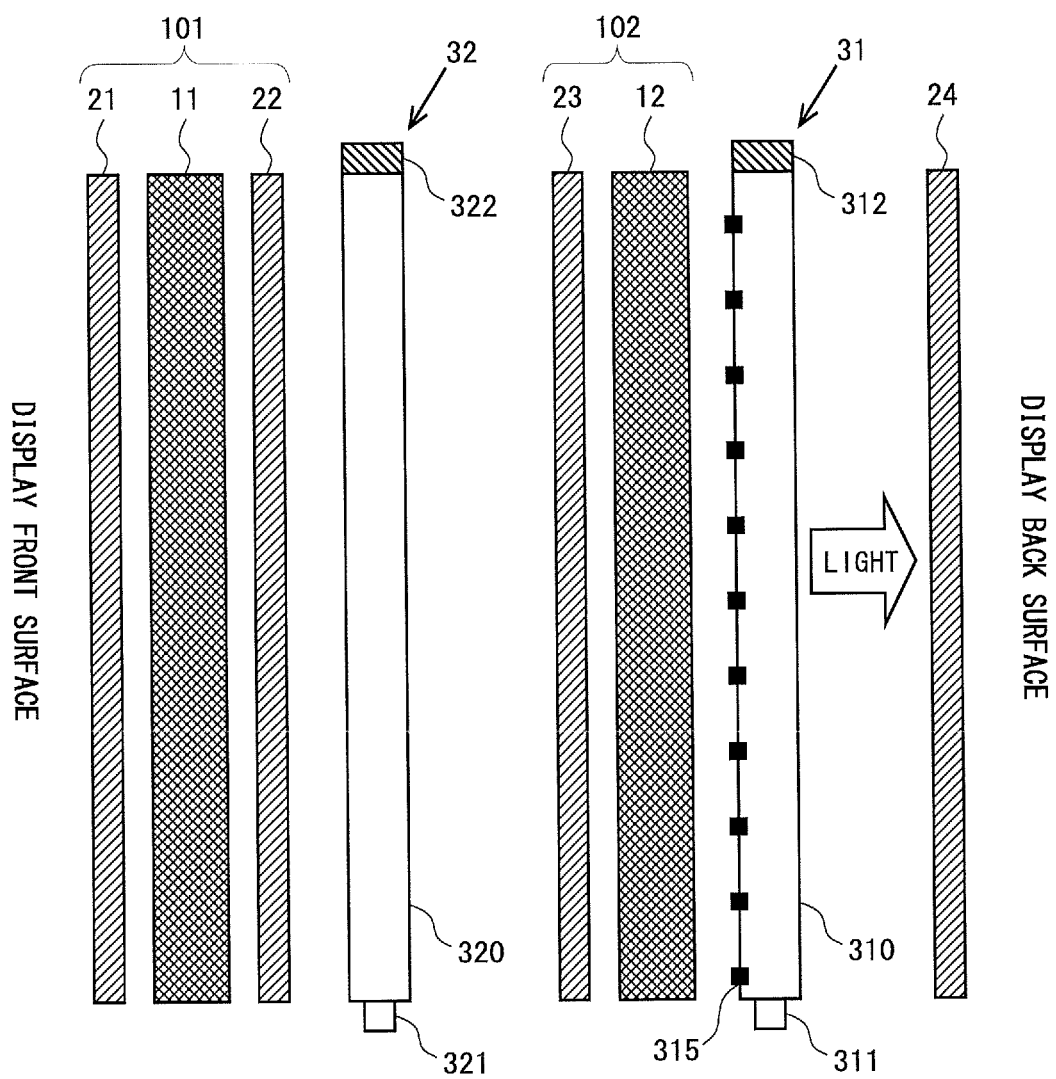
FIG. 17 is a diagram showing a configuration of an image display device according to a fourth embodiment of the present invention.

FIG. 17 is a diagram showing a configuration of an image display device according to a fourth embodiment of the present invention. As shown in FIG. 17, in the present embodiment, the first panel body emission-side polarizing plate 21, the first panel body 11, the first panel body incidence-side polarizing plate 22, a backlight source 32, the second panel body emission-side polarizing plate 23, the second panel body 12, the back-surface irradiation light source 31, and the second panel body incidence-side polarizing plate 24 are provided from the display front-surface side toward the display back-surface side. That is, on the basis of the configuration of the first embodiment (see FIG. 6), the backlight source 32 is additionally provided between the first panel body incidence-side polarizing plate 22 and the second panel body emission-side polarizing plate 23. In the present embodiment, the first panel body emission-side polarizing plate 21, the first panel body 11, and the first panel body incidence-side polarizing plate 22 constitute the first liquid-crystal panel 101, and the second panel body emission-side polarizing plate 23 and the second panel body 12 constitute the second liquid-crystal panel 102. According to the present embodiment, it is also possible to adopt a configuration not including the second panel body emission-side polarizing plate 23.

The backlight source 32 includes a light guide plate 320, an LED 321, and a reflection sheet 322. Unlike the back-surface irradiation light source 31, the backlight source 32 radiates light from the installation position to both the display front-surface side and the display back-surface side. It is necessary that the display image by the second liquid-crystal panel 102 is visible from the display front-surface side. For this purpose, the backlight source 32 is produced by using a light guide plate that is usually in the transparent state and that emits light only when light is incident to the light guide plate. Specifically, a light guide plate that is formed by mixing a scattering material into a transparent resin, or a light guide plate that is formed by dot-printing a transparent ink into a flat plate-like transparent resin is adopted.

<4.2 Effects>

In the first embodiment, image display is performed by the first liquid-crystal panel 101 by using the light that has passed through the second panel body 12 (display by the second liquid-crystal panel 102) as backlight. Therefore, the first liquid-crystal panel 101 can only display colors based on colors included in the display image on the second liquid-crystal panel 102. Therefore, when display of black or display of a color near a single color is performed by the second liquid-crystal panel 102, the degree of freedom of display by the first liquid-crystal panel 101 becomes extremely low. In this respect, according to the present embodiment, the backlight source 32 is provided at the immediate back surface of the first liquid-crystal panel 101. Therefore, irrespective of the state of display by the second liquid-crystal panel 102, the light component of each color is given to the first liquid-crystal panel 101, and the degree of freedom of display by the first liquid-crystal panel 101 can be enhanced. Further, by independently controlling the light amount of the back-surface irradiation light source 31 and the light amount of the backlight source 32, it is possible to individually adjust brightness of the first liquid-crystal panel 101 and brightness of the second liquid-crystal panel 102.

<4.3 Modification>

Figure 18:
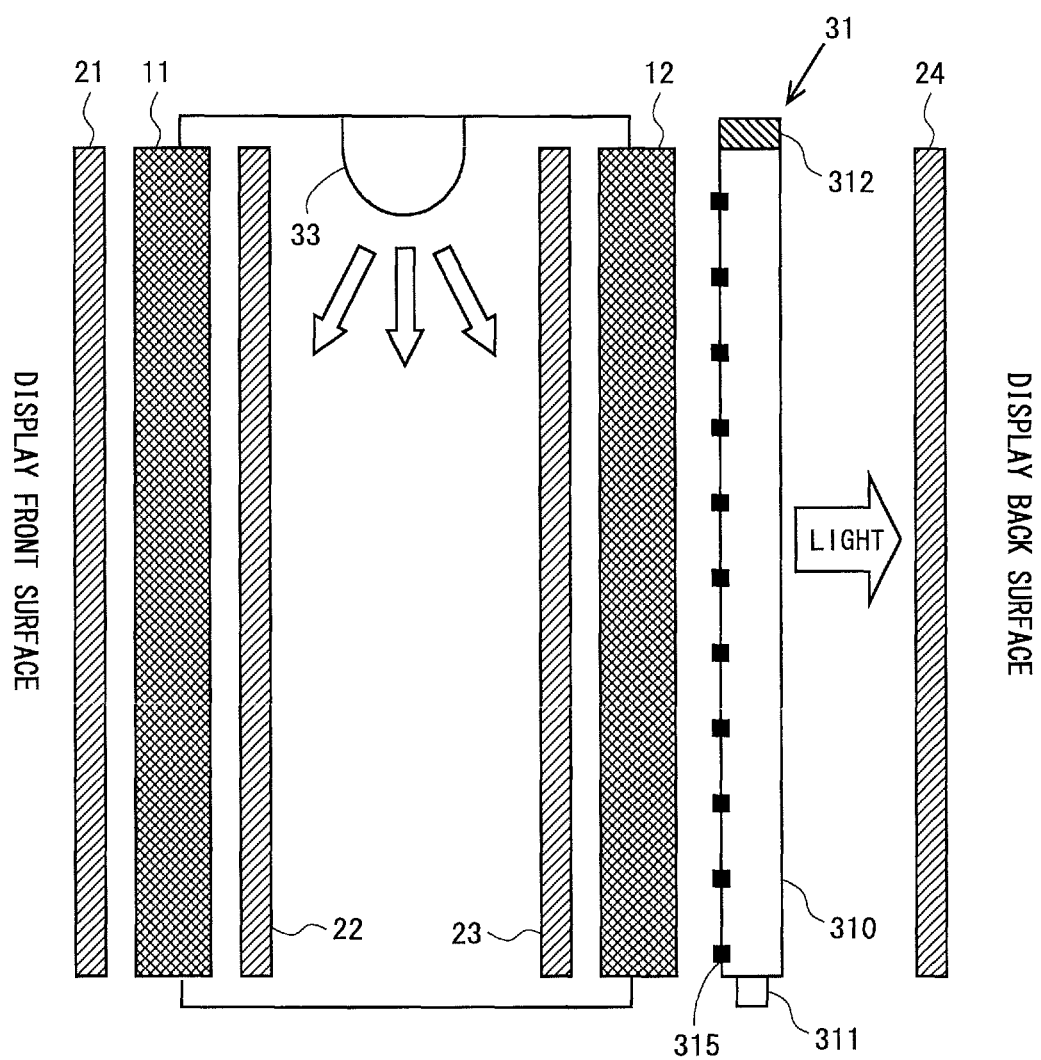
FIG. 18 is a diagram showing a configuration of an image display device according to a modification of the fourth embodiment.

FIG. 18 is a diagram showing a configuration of an image display device according to a modification of the fourth embodiment. In the fourth embodiment, the backlight source 32 using the light guide plate 320 is provided between the first panel body incidence-side polarizing plate 22 and the second panel body emission-side polarizing plate 23. However, the present invention is not limited thereto. As shown in FIG. 18, the space between the first liquid-crystal panel 101 and the second liquid-crystal panel 102 may be filled with light by an LED 33 or the like, for example.

<5. Fifth Embodiment>
<5.1 Configuration>

Figure 19:
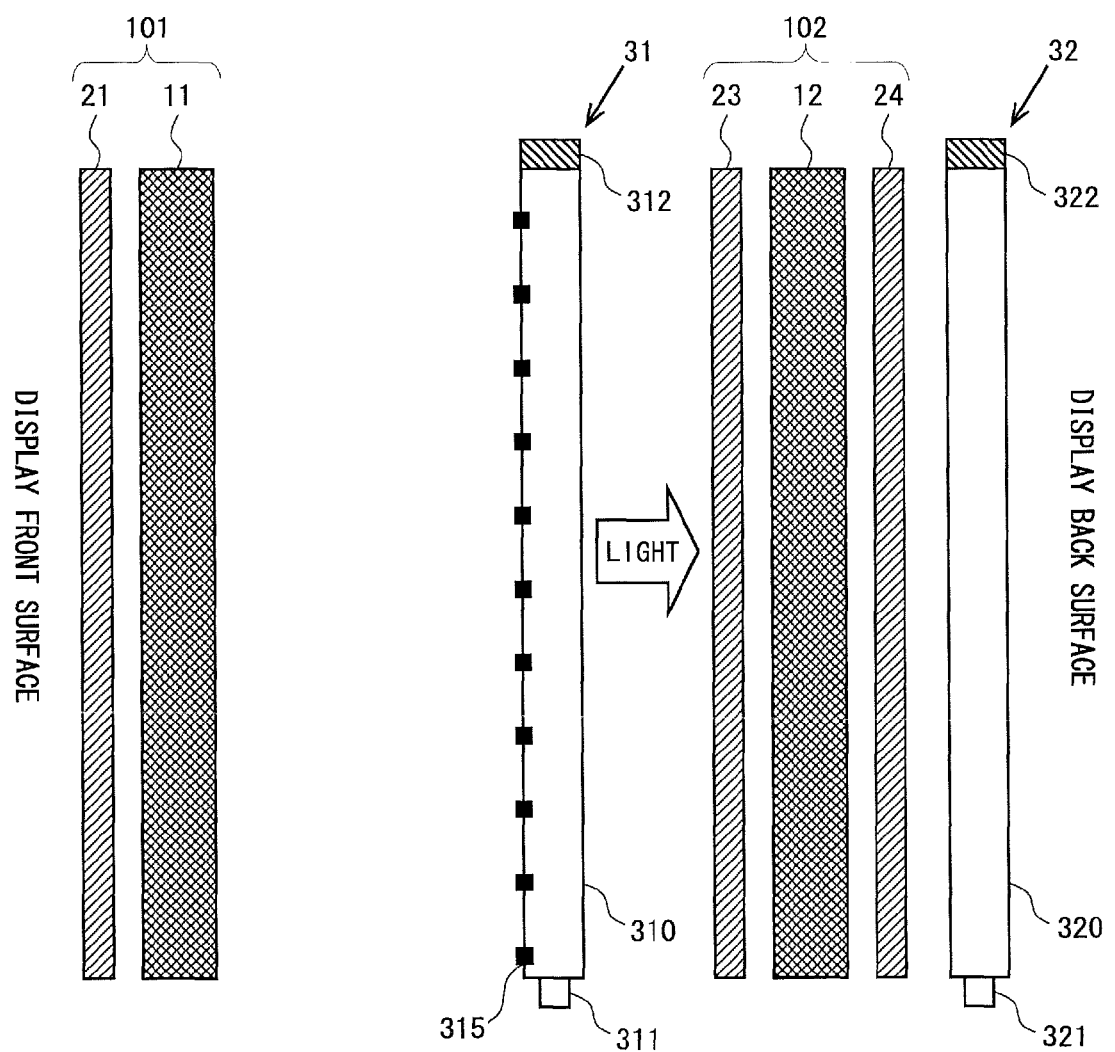
FIG. 19 is a diagram showing a configuration of an image display device according to a fifth embodiment of the present invention.

FIG. 19 is a diagram showing a configuration of an image display device according to a fifth embodiment of the present invention. As shown in FIG. 19, in the present embodiment, the first panel body emission-side polarizing plate 21, the first panel body 11, the back-surface irradiation light source 31, the second panel body emission-side polarizing plate 23, the second panel body 12, the second panel body incidence-side polarizing plate 24, and the backlight source 32 are provided from the display front-surface side toward the display back-surface side. That is, on the basis of the configuration of the second embodiment (see FIG. 11), the backlight source 32 is provided at the back-surface side of the second panel body incidence-side polarizing plate 24. However, for the second panel body incidence-side polarizing plate 24, although a reflection type polarizing plate is adopted in the second embodiment, an absorption type polarizing plate is adopted in the present embodiment. In the present embodiment, the first panel body emission-side polarizing plate 21 and the first panel body 11 constitute the first liquid-crystal panel 101, and the second panel body emission-side polarizing plate 23, the second panel body 12, and the second panel body incidence-side polarizing plate 24 constitute the second liquid-crystal panel 102.

<5.2 Detailed Configuration of Second Liquid-Crystal Panel Side>

Figure 20:
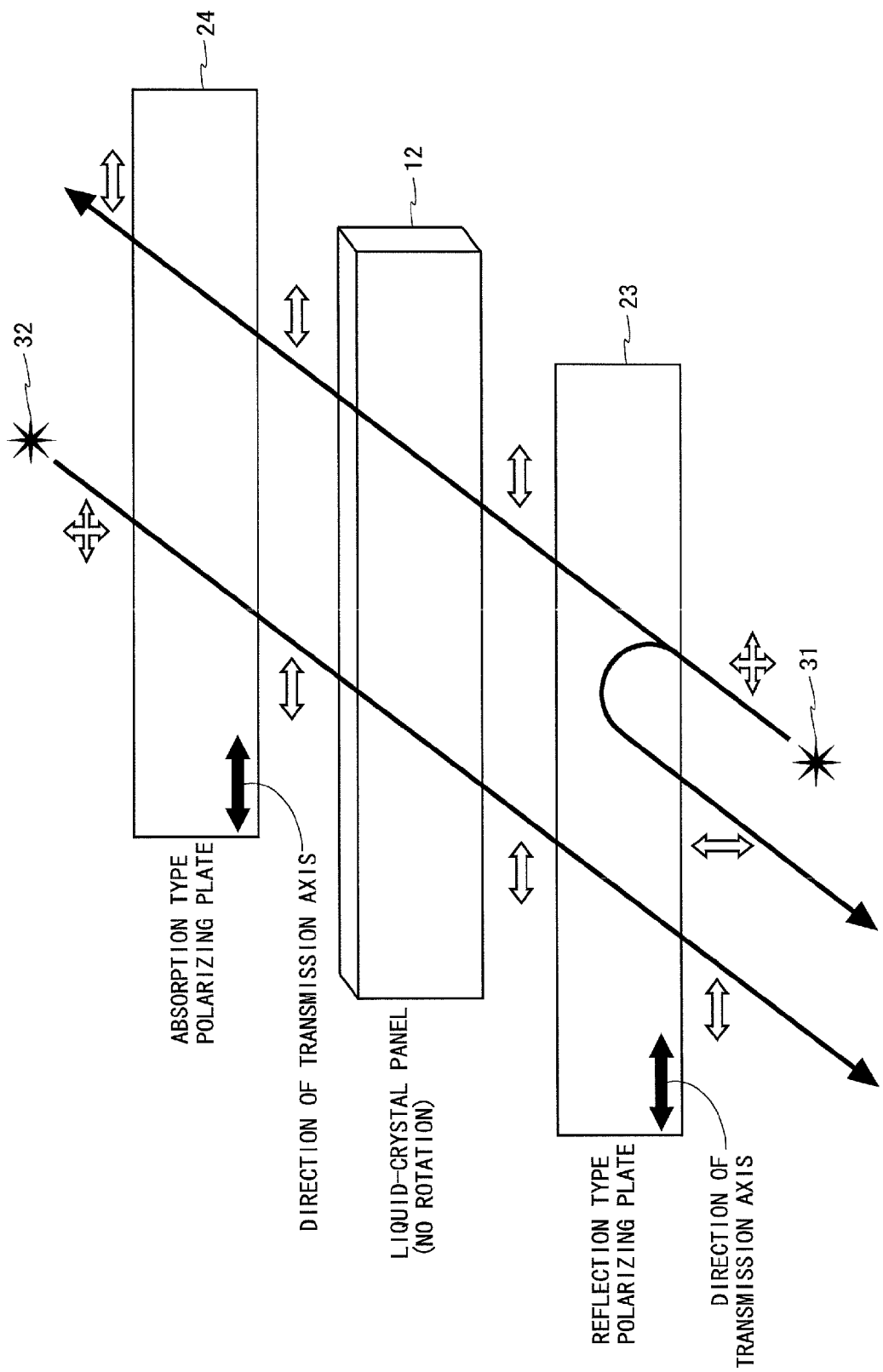
FIG. 20 is a diagram for describing a detailed configuration of a second liquid-crystal panel side in the fifth embodiment.
Figure 21:
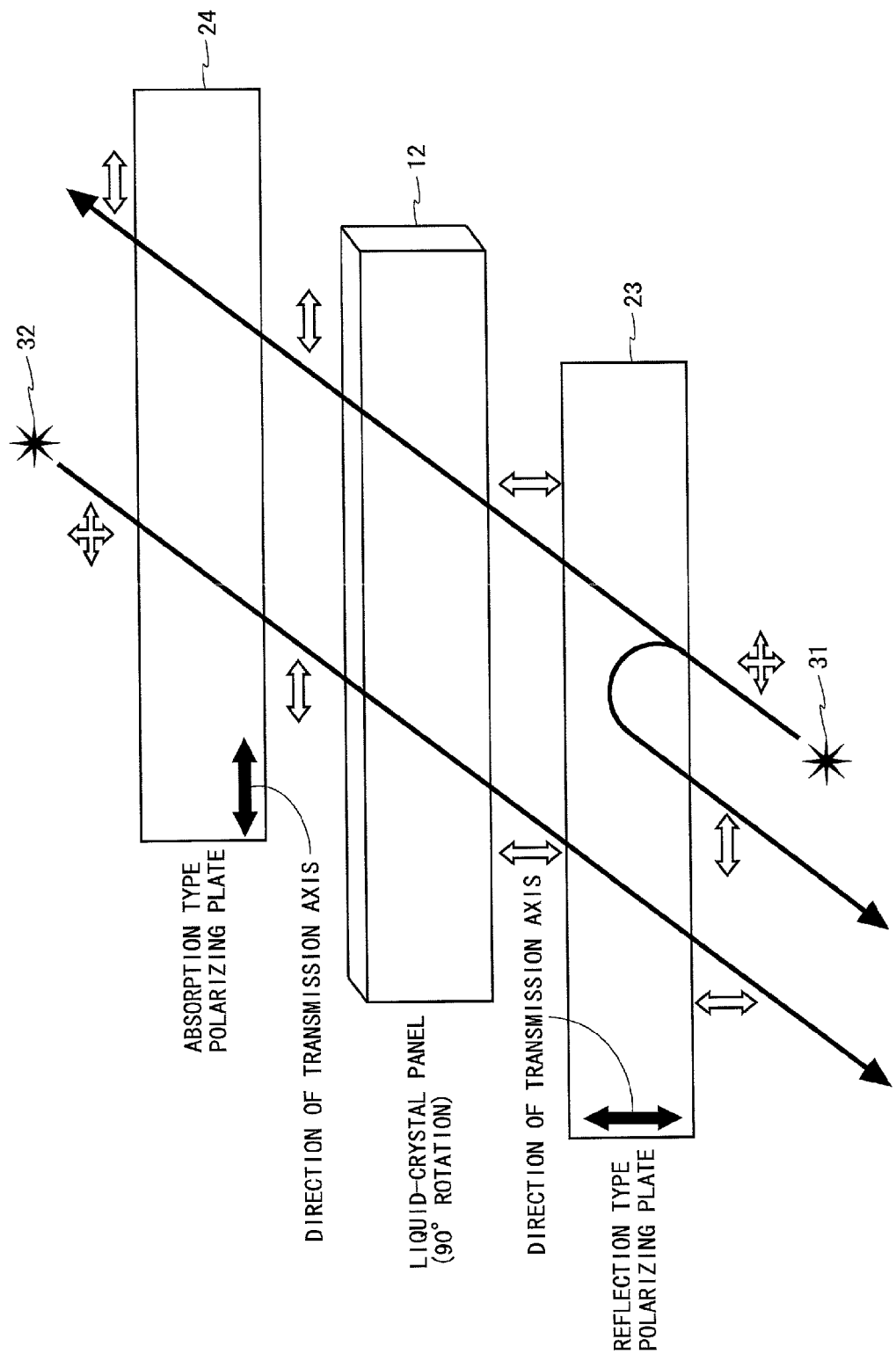
FIG. 21 is a diagram for describing a detailed configuration of the second liquid-crystal panel side in the fifth embodiment.

With reference to FIG. 20 and FIG. 21, a detailed configuration of the second liquid-crystal panel 102 side will be described. An absorption type polarizing plate is adopted for the second panel body incidence-side polarizing plate 24, as described above. A reflection type polarizing plate is adopted for the second panel body emission-side polarizing plate 23. An absorption type polarizing plate is adopted for the second panel body incidence-side polarizing plate 24 so that the image display by the second liquid-crystal panel 102 uses the light emitted from the backlight source 32 without using the light emitted from the back-surface irradiation light source 31. A configuration shown in FIG. 20 is adopted when the second liquid-crystal panel 102 is operated in the normally black mode, and a configuration shown in FIG. 21 is adopted when the second liquid-crystal panel 102 is operated in the normally white mode.

First, with reference to FIG. 20, there will be described how light advances when the transmission axis of the second panel body incidence-side polarizing plate 24 and the transmission axis of the second panel body emission-side polarizing plate 23 are parallel to each other. When linearly polarized light emitted from the back-surface irradiation light source 31 is incident to the second panel body emission-side polarizing plate 23, a polarization component having the same polarization direction as the direction of the transmission axis of the second panel body emission-side polarizing plate passes through the second panel body emission-side polarizing plate 23, and is incident to the second panel body 12. On the other hand, a polarization component having the same polarization direction as the direction of the reflection axis of the second panel body emission-side polarizing plate 23 is reflected by the second panel body emission-side polarizing plate 23 and its advance direction is inverted. In this case, when a predetermined voltage is applied to the liquid crystal in the second panel body 12, the polarization component incident to the second panel body 12 passes through the second panel body 12 without rotating the polarization direction, and is incident to the second panel body incidence-side polarizing plate 24. Because the polarization direction of the polarization component incident to the second panel body incidence-side polarizing plate 24 is the same as the direction of the transmission axis of the second panel body incidence-side polarizing plate 24, the polarization component passes through the second panel body incidence-side polarizing plate 24 and exits to the outside.

When linearly polarized light emitted from the backlight source 32 is incident to the second panel body incidence-side polarizing plate 24, a polarization component having the same polarization direction as the direction of the transmission axis of the second panel body incidence-side polarizing plate passes through the second panel body incidence-side polarizing plate 24, and a polarization component having the same polarization direction as the direction of the absorption axis is absorbed by the second panel body incidence-side polarizing plate 24. The polarization component having passed through the second panel body incidence-side polarizing plate 24 is incident to the second panel body 12. In this case, when a predetermined voltage is applied to the liquid crystal in the second panel body 12, the polarization component incident to the second panel body 12 passes through the second panel body 12 without rotating the polarization direction, and is incident to the second panel body emission-side polarizing plate 23. Because the polarization direction of the polarization component incident to the second panel body emission-side polarizing plate 23 is the same as the direction of the transmission axis of the second panel body emission-side polarizing plate 23, the polarization component passes through the second panel body emission-side polarizing plate 23 and exits to the front side.

Next, with reference to FIG. 21, there will be described how light advances when the transmission axis of the second panel body incidence-side polarizing plate 24 and the transmission axis of the second panel body emission-side polarizing plate 23 are orthogonal to each other. When linearly polarized light emitted from the back-surface irradiation light source 31 is incident to the second panel body emission-side polarizing plate 23, a polarization component having the same polarization direction as the direction of the transmission axis of the second panel body emission-side polarizing plate 23 passes through the second panel body emission-side polarizing plate 23, and is incident to the second panel body 12. On the other hand, a polarization component having the same polarization direction as the direction of the reflection axis of the second panel body emission-side polarizing plate 23 is reflected by the second panel body emission-side polarizing plate 23 and its advance direction is inverted. In this case, when no voltage is applied to the liquid crystal in the second panel body 12, the polarization component incident to the second panel body 12 passes through the second panel body 12 while rotating the polarization direction by 90 degrees, and is incident to the second panel body incidence-side polarizing plate 24. Because the polarization direction of the polarization component incident to the second panel body incidence-side polarizing plate 24 is the same as the direction of the transmission axis of the second panel body incidence-side polarizing plate 24, the polarization component passes through the second panel body incidence-side polarizing plate 24 and exits to the outside.

When linearly polarized light emitted from the backlight source 32 is incident to the second panel body incidence-side polarizing plate 24, a polarization component having the same polarization direction as the direction of the transmission axis of the second panel body incidence-side polarizing plate passes through the second panel body incidence-side polarizing plate 24, and a polarization component having the same polarization direction as the direction of the absorption axis is absorbed by the second panel body incidence-side polarizing plate 24. The polarization component having passed through the second panel body incidence-side polarizing plate 24 is incident to the second panel body 12. In this case, when no voltage is applied to the liquid crystal in the second panel body 12, the polarization component incident to the second panel body 12 passes through the second panel body 12 while rotating the polarization direction by 90 degrees, and is incident to the second panel body emission-side polarizing plate 23. Because the polarization direction of the polarization component incident to the second panel body emission-side polarizing plate 23 is the same as the direction of the transmission axis of the second panel body emission-side polarizing plate 23, the polarization component passes through the second panel body emission-side polarizing plate 23 and exits to the front side.

As described above, in the present embodiment, the second liquid-crystal panel 102 performs image display by using the light emitted from the backlight source 32 instead of the light emitted from the back-surface irradiation light source 31.

<5.3 Effects>

In the second embodiment and the third embodiment, the second liquid-crystal panel 102 performs image display based on the light reflected by the second panel body incidence-side polarizing plate 24 after the light emitted from the back-surface irradiation light source 31 passes through various optical elements (such as the second panel body 12). Therefore, concerning the display image on the second liquid-crystal panel 102, there is a concern that brightness and contrast become insufficient. In this respect, according to the present embodiment, the backlight source 32 is provided at the back surface of the second liquid-crystal panel 102. Accordingly, concerning a display image on the second liquid-crystal panel 102, sufficient brightness and sufficient contrast can be obtained. In this way, expressive power by the second liquid-crystal panel 102 is improved. Further, by independently controlling the light amount of the back-surface irradiation light source 31 and the light amount of the backlight source 32, it is possible to individually adjust brightness of the first liquid-crystal panel 101 and brightness of the second liquid-crystal panel 102.

<5.4 Modification>

The configuration of the fifth embodiment (see FIG. 19) is based on the configuration of the second embodiment (see FIG. 11). However, the present invention is not limited thereto. On the basis of the configuration of the third embodiment (see FIG. 16), the backlight source 32 may be provided at the back-surface side of the second panel body incidence-side polarizing plate 24.

Further, in a similar manner to that of the modification of the fourth embodiment, the configuration may be such that a space is provided at the back surface of the second liquid-crystal panel 102 and a backlight source capable of filling the space with light is adopted. In this case, not only dynamic display having a sense of depth by the first liquid-crystal panel 101 and the second liquid-crystal panel 102, but also static presentation utilizing a space between the first liquid-crystal panel 101 and the second liquid-crystal panel 102 and a space on the back surface of the second liquid-crystal panel 102 (for example, presentation by installing an exhibition object in the space) can be performed.

<6. Sixth Embodiment>

<6.1 Configuration>

Figure 22:
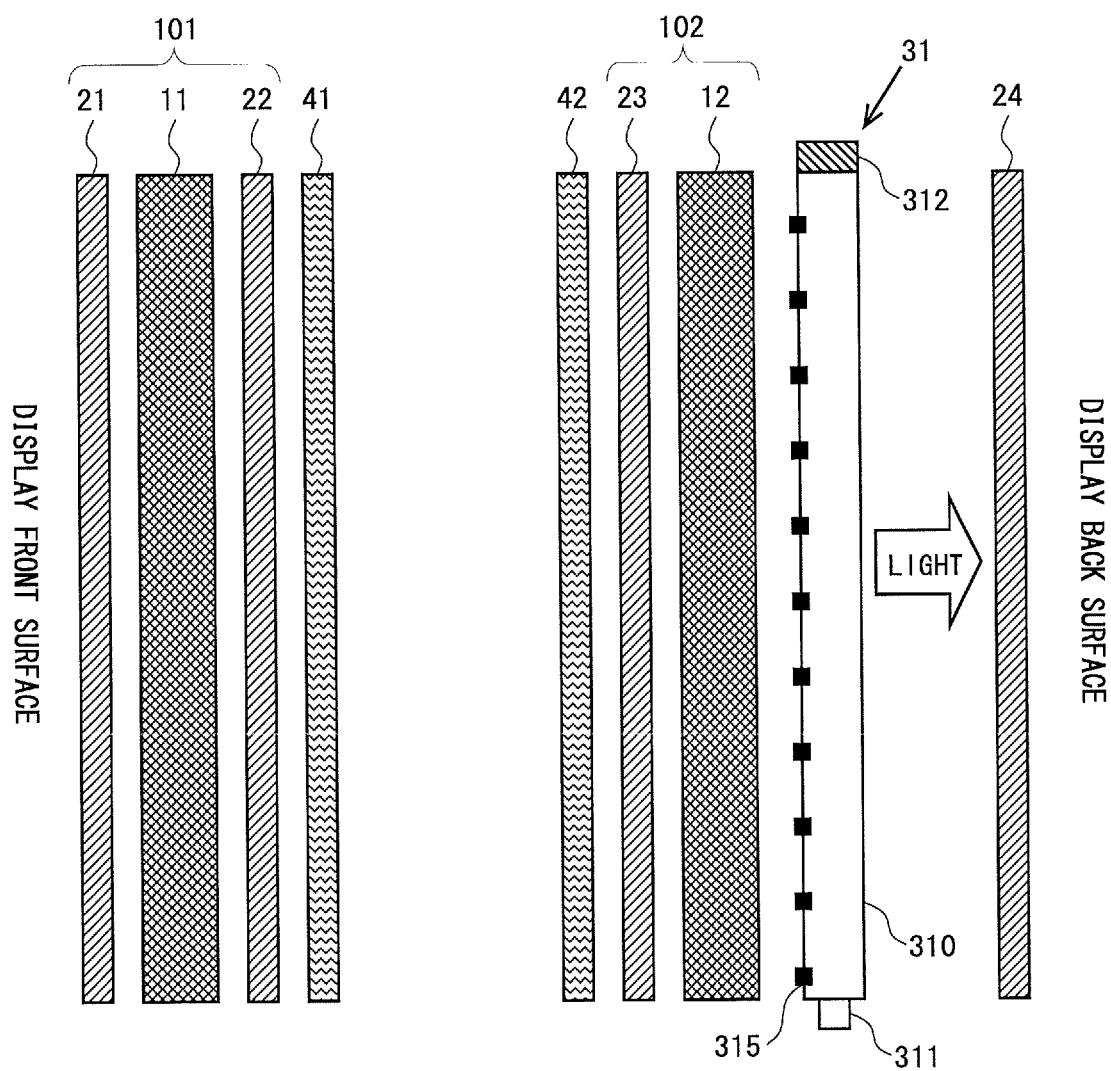
FIG. 22 is a diagram showing a configuration of an image display device according to a sixth embodiment of the present invention.

FIG. 22 is a diagram showing a configuration of an image display device according to a sixth embodiment of the present invention. As shown in FIG. 22, in the present embodiment, the first panel body emission-side polarizing plate 21, the first panel body 11, the first panel body incidence-side polarizing plate 22, a first λ/4 wave plate 41, a second λ/4 wave plate 42, the second panel body emission-side polarizing plate 23, the second panel body 12, the back-surface irradiation light source 31, and the second panel body incidence-side polarizing plate 24 are provided from the display front-surface side toward the display back-surface side. That is, on the basis of the configuration of the first embodiment (see FIG. 6), two λ/4 wave plates (the first λ/4 wave plate 41 and the second λ/4 wave plate 42) are additionally provided between the first liquid-crystal panel 101 and the second liquid-crystal panel 102. In the present embodiment, the first panel body emission-side polarizing plate 21, the first panel body 11, and the first panel body incidence-side polarizing plate 22 constitute the first liquid-crystal panel 101, and the second panel body emission-side polarizing plate 23 and the second panel body 12 constitute the second liquid-crystal panel 102.

<6.2 Wave Plate>

Here, a wave plate will be described. A wave plate causes linearly polarized light vibrating in mutually perpendicular directions to pass, and gives a predetermined phase difference between them. There are various kinds of wave plates. Generally, a λ/4 wave plate and a λ/2 wave plate are often used. In the present embodiment, the two λ/4 wave plates are provided between the first liquid-crystal panel 101 and the second liquid-crystal panel 102 as described above. Inside the λ/4 wave plate, light is divided into two mutually orthogonal polarization components, and the light advances as divided polarization components. The wave plate is produced by using a member (for example, an organic material) in which refractive indexes of the two polarization components are mutually different. Therefore, after the two polarization components pass through the λ/4 wave plate, a phase difference is generated between the two polarization components. In the λ/4 wave plate, a phase difference between the two polarization components becomes λ/4 (90 degrees).

In the present embodiment, depending on the relationship between the emission polarization direction of the second liquid-crystal panel 102 and the incident polarization direction of the first liquid-crystal panel 101, how to install the two λ/4 wave plates (the first λ/4 wave plate 41 and the second λ/4 wave plate 42) is different. This will be described below.

<6.2.1 When Emission Polarization Direction Coincides with Incident Polarization Direction>

Figure 23:
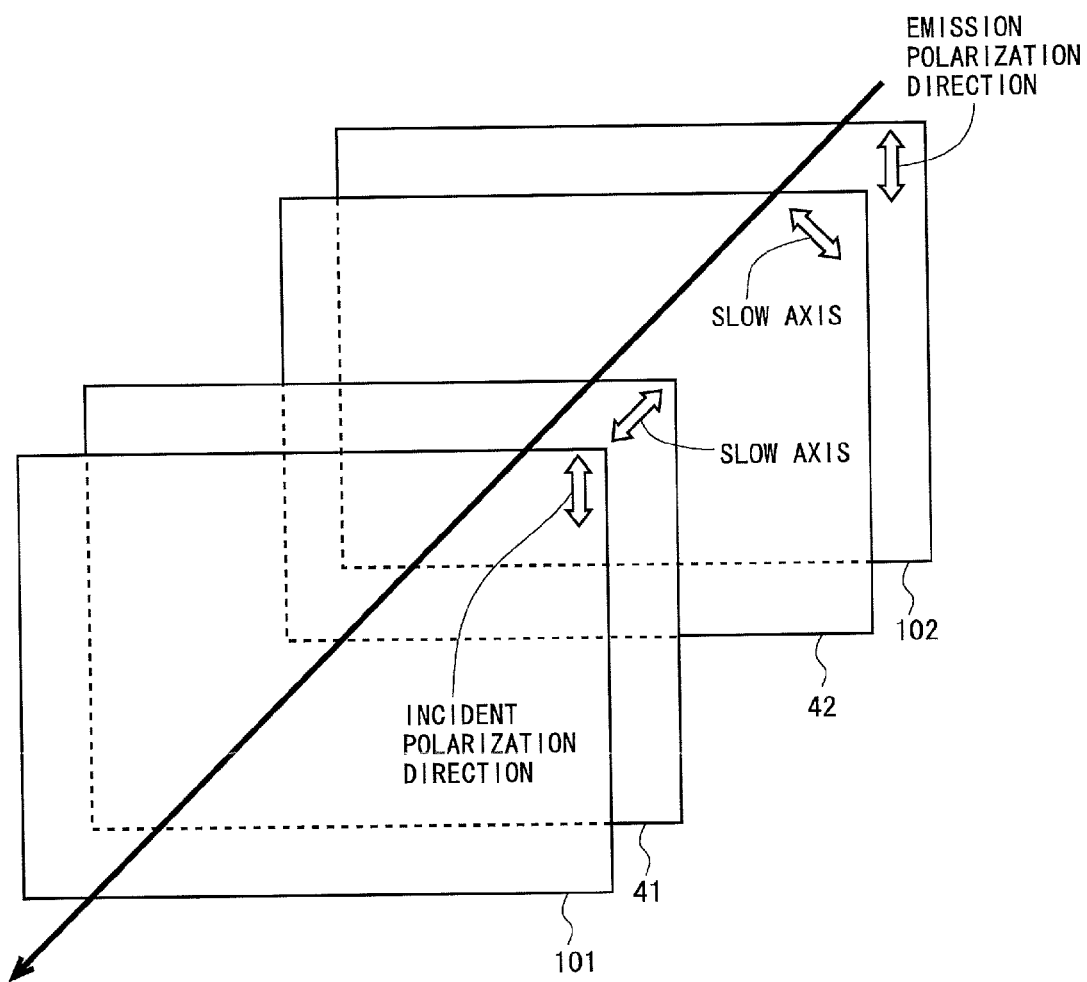
FIG. 23 is a diagram for describing how to install $\lambda/4$ wave plates when an emission polarization direction of the second liquid-crystal panel coincides with an incident polarization direction of the first liquid-crystal panel in the sixth embodiment.

FIG. 23 is a diagram for describing how to install λ/4 wave plates when the emission polarization direction of the second liquid-crystal panel 102 coincides with the incident polarization direction of the first liquid-crystal panel 101. As is understood from FIG. 23, a direction of a slow axis of one of the two λ/4 wave plates (for example, the first λ/4 wave plate 41) corresponds to a direction in which the emission polarization direction/incident polarization direction are rotated to the right by 45 degrees, and a direction of a slow axis of the other of the two λ/4 wave plates (for example, the second λ/4 wave plate 42) corresponds to a direction in which the emission polarization direction/incident polarization direction are rotated to the left by 45 degrees. The two λ/4 wave plates (the first λ/4 wave plate 41 and the second λ/4 wave plate 42) are installed so that directions of respective slow axes become as described above.

<6.2.2 when Emission Polarization Direction and Incident Polarization Direction are Orthogonal to Each Other>

Figure 24:
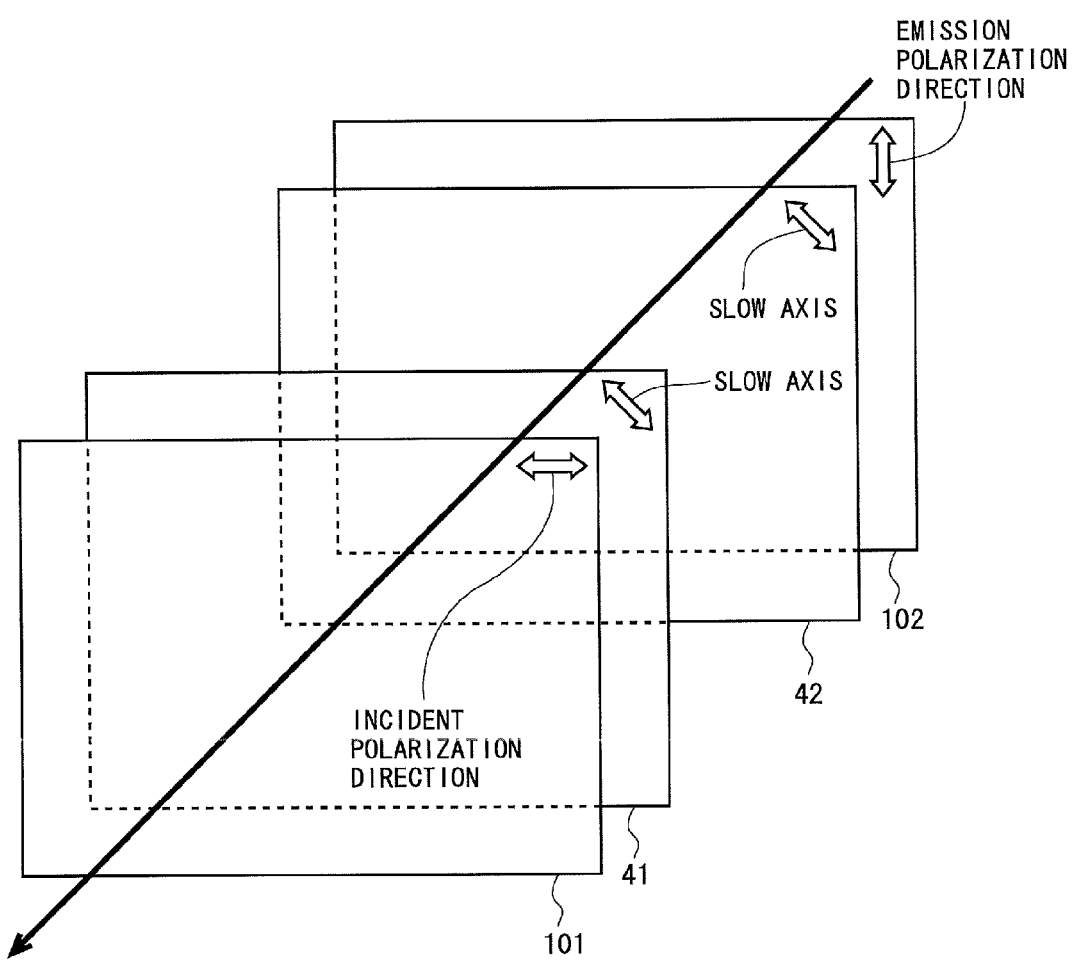
FIG. 24 is a diagram for describing how to install $\lambda/4$ wave plates when the emission polarization direction of the second liquid-crystal panel and the incident polarization direction of the first liquid-crystal panel are orthogonal to each other in the sixth embodiment.

FIG. 24 is a diagram for describing how to install λ/4 wave plates when the emission polarization direction of the second liquid-crystal panel 102 and the incident polarization direction of the first liquid-crystal panel 101 are orthogonal to each other. As is understood from FIG. 24, directions of respective slow axes of the two λ/4 wave plates (the first λ/4 wave plate 41 and the second λ/4 wave plate 42) are in the same direction. The directions of these slow axes form angles of 45 degrees to both the emission polarization direction and the incident polarization direction. The two λ/4 wave plates (the first λ/4 wave plate 41 and the second λ/4 wave plate 42) are installed so that directions of respective slow axes become as described above.

<6.3 Effects>

When a transparent member is installed between the first liquid-crystal panel 101 and the second liquid-crystal panel 102 for a structural reason or the like, there is a concern that surface reflection generated in the space between the first liquid-crystal panel 101 and the second liquid-crystal panel 102 affects the display. In this respect, according to the present embodiment, the two λ/4 wave plates (the first λ/4 wave plate 41 and the second λ/4 wave plate 42) are provided between the first liquid-crystal panel 101 and the second liquid-crystal panel 102. By disposing the first λ/4 wave plate 41 near the first liquid-crystal panel 101 and by disposing the second λ/4 wave plate 42 near the second liquid-crystal panel 102, influence to the display by the surface reflection generated in the space between the first liquid-crystal panel 101 and the second liquid-crystal panel 102 can be reduced. In this way, according to the present embodiment, influence to the display by the surface reflection of light can be reduced while enhancing the utilization efficiency of light emitted from the back-surface irradiation light source 31.

Further, when the emission polarization direction of the second liquid-crystal panel 102 and the incident polarization direction of the first liquid-crystal panel 101 are orthogonal to each other, the polarization direction after the light emitted from the second liquid-crystal panel 102 has passed through the two λ/4 wave plates and the incident polarization direction of the first liquid-crystal panel 101 can be made to coincide with each other by installing the two λ/4 wave plates (the first λ/4 wave plate 41 and the second λ/4 wave plate 42) as shown in FIG. 24. For example, in the first embodiment, it is assumed that the transmission axis of the second panel body emission-side polarizing plate 23 and the transmission axis of the first panel body incidence-side polarizing plate 22 (that is, the emission polarization direction of the second liquid-crystal panel 102 and the incident polarization direction of the first liquid-crystal panel 101) are parallel to each other. Concerning this, even when the emission polarization direction of the second liquid-crystal panel 102 and the incident polarization direction of the first liquid-crystal panel 101 are orthogonal to each other, it is possible to realize a dual display that achieves a similar effect to that of the first embodiment by providing the two λ/4 wave plates as shown in FIG. 24.

<6.4 Modification>

In the sixth embodiment, on the basis of the configuration of the first embodiment (see FIG. 6), two λ/4 wave plates are provided between the first liquid-crystal panel 101 and the second liquid-crystal panel 102. However, the present invention is not limited thereto. On the basis of each configuration of the second to fifth embodiments, a configuration in which two λ/4 wave plates are provided between the first liquid-crystal panel 101 and the second liquid-crystal panel 102 can be also adopted. However, it is necessary that the back-surface irradiation light source 31 or the backlight source 32 is not disposed between the two λ/4 wave plates.

<7. Seventh Embodiment>

<7.1 Configuration>

Figure 25:
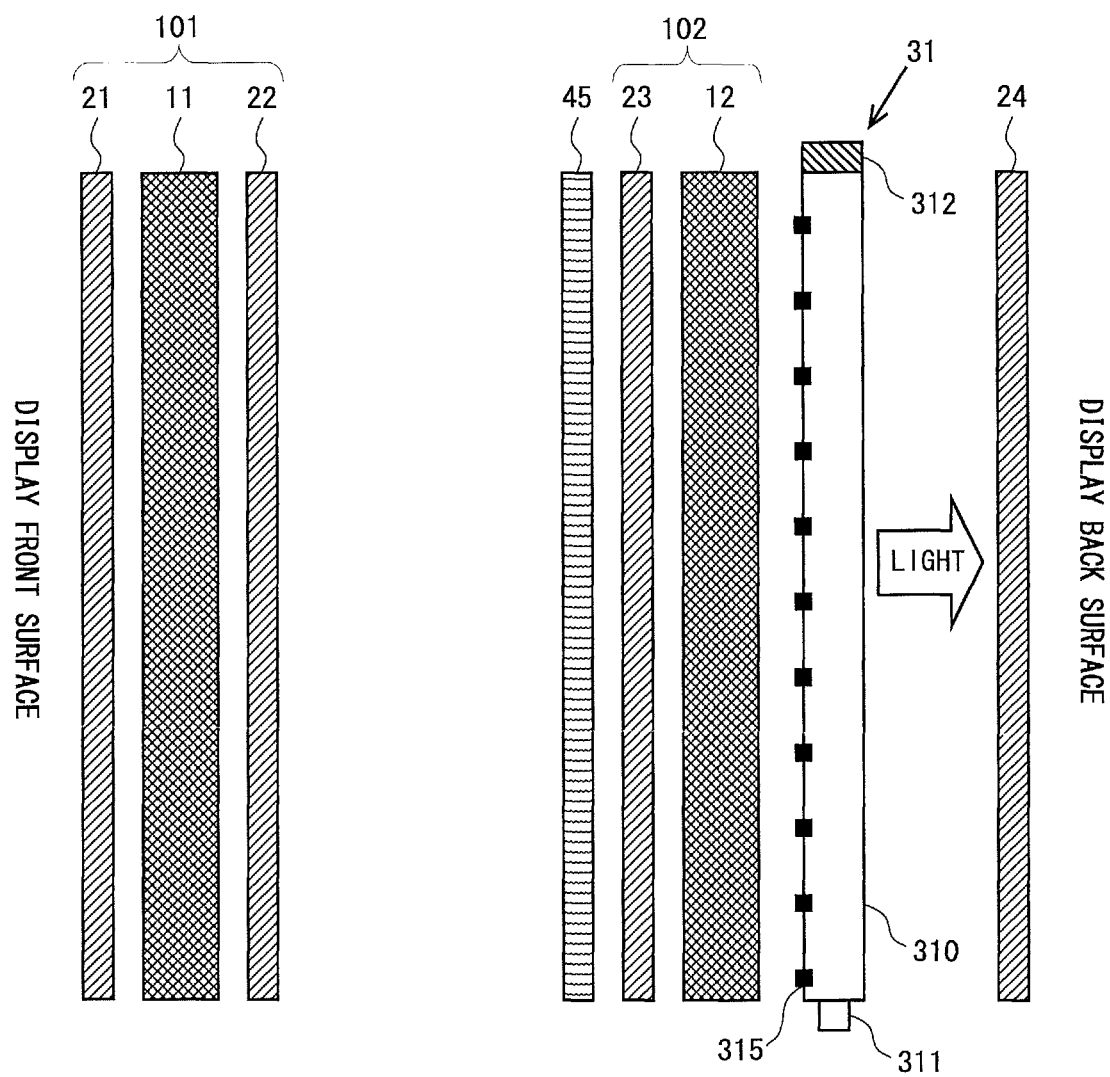
FIG. 25 is a diagram showing a configuration of an image display device according to a seventh embodiment of the present invention.

FIG. 25 is a diagram showing a configuration of an image display device according to a seventh embodiment of the present invention. As shown in FIG. 25, in the present embodiment, the first panel body emission-side polarizing plate 21, the first panel body 11, the first panel body incidence-side polarizing plate 22, the λ/2 wave plate 45, the second panel body emission-side polarizing plate 23, the second panel body 12, the back-surface irradiation light source 31, and the second panel body incidence-side polarizing plate 24 are provided from the display front-surface side toward the display back-surface side. That is, on the basis of the configuration of the first embodiment (see FIG. 6), one λ/2 wave plate 45 is additionally provided between the first panel body incidence-side polarizing plate 22 and the second panel body emission-side polarizing plate 23. In the present embodiment, the first panel body emission-side polarizing plate 21, the first panel body 11, and the first panel body incidence-side polarizing plate 22 constitute the first liquid-crystal panel 101, and the second panel body emission-side polarizing plate 23 and the second panel body 12 constitute the second liquid-crystal panel 102.

<7.2 λ/2 Wave Plate>

Figure 26:
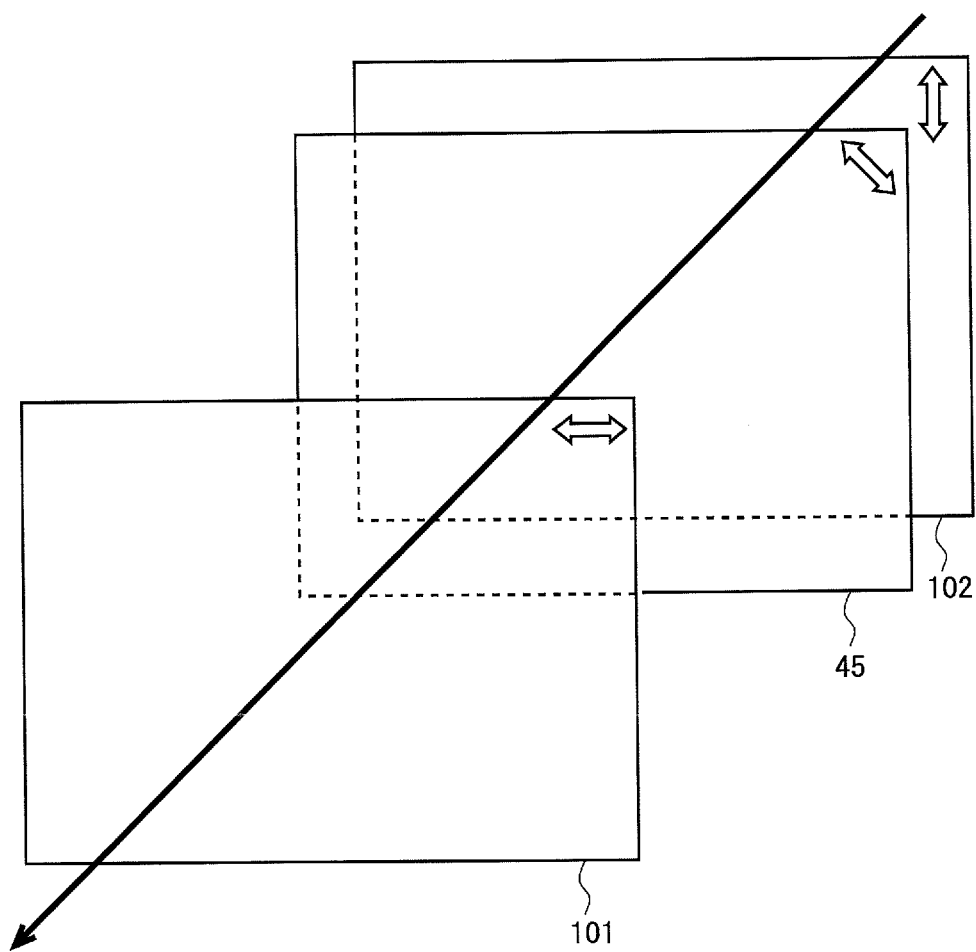
FIG. 26 is a diagram for describing how to install a $\lambda/2$ wave plate in the seventh embodiment.
Figure 27:
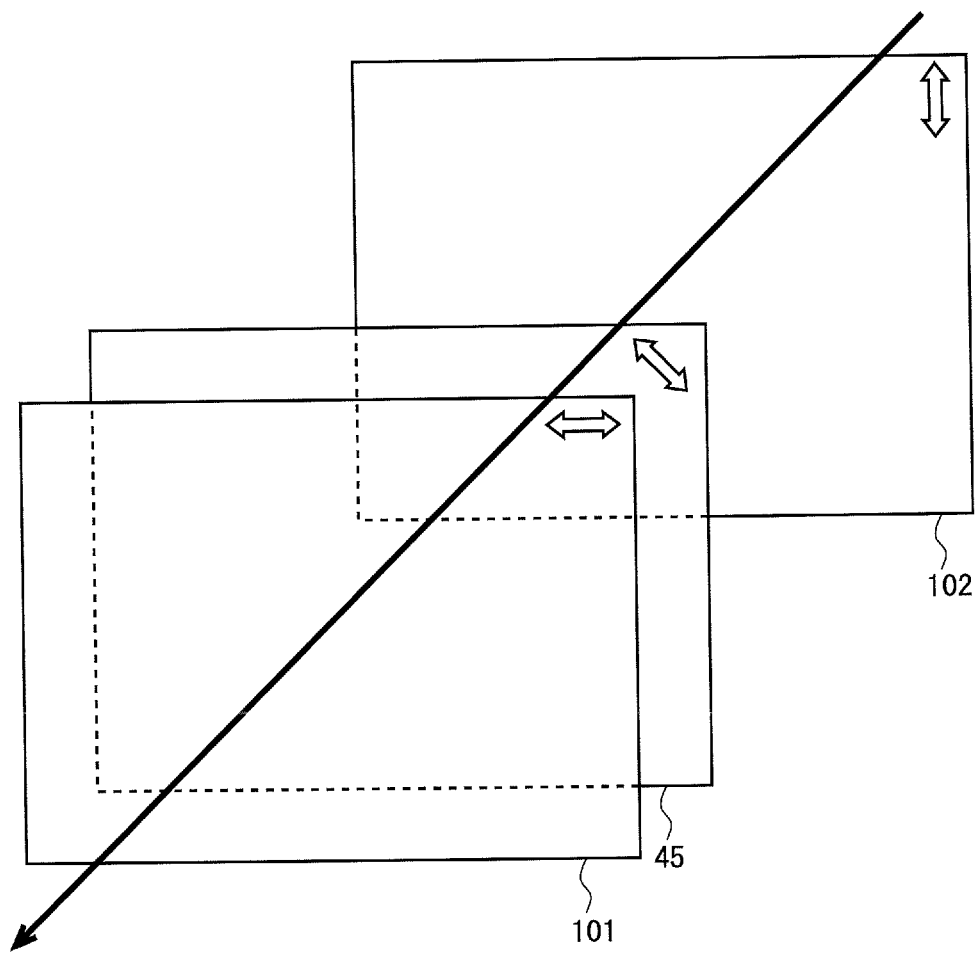
FIG. 27 is a diagram for describing how to install the $\lambda/2$ wave plate in the seventh embodiment.

As described above, the wave plates cause linearly polarized light vibrating in mutually perpendicular directions to pass, and give a predetermined phase difference between them. The λ/2 wave plate causes a phase difference of λ/2 (180 degrees) to be generated between two polarization components. FIG. 26 and FIG. 27 are diagrams for describing how to install a λ/2 wave plate 45. FIG. 26 is a diagram schematically showing a configuration when the λ/2 wave plate 45 is disposed at the second liquid-crystal panel 102 side. FIG. 27 is a diagram schematically showing a configuration when the λ/2 wave plate 45 is disposed at the first liquid-crystal panel 101 side. The λ/2 wave plate 45 is provided between the second liquid-crystal panel 102 and the first liquid-crystal panel 101 so that the direction of the slow axis of the λ/2 wave plate 45 coincides with the intermediate direction between the emission polarization direction of the second liquid-crystal panel 102 and the incident polarization direction of the first liquid-crystal panel 101.

<7.3 Effects>

According to the present embodiment, even when the emission polarization direction of the second liquid-crystal panel 102 and the incident polarization direction of the first liquid-crystal panel 101 have any relationship, when respective polarization directions (the emission polarization direction and the incident polarization direction) are known in advance, the polarization direction after the light emitted from the second liquid-crystal panel 102 passes through the λ/2 wave plate 45 can be made to coincide with the incident polarization direction of the first liquid-crystal panel 101 by installing the λ/2 wave plate 45 in the proper orientation. For example, in the first embodiment, it is assumed that the transmission axis of the second panel body emission-side polarizing plate and the transmission axis of the first panel body incidence-side polarizing plate 22 (that is, the emission polarization direction of the second liquid-crystal panel 102 and the incident polarization direction of the first liquid-crystal panel 101) are parallel to each other. Concerning this, even when the emission polarization direction of the second liquid-crystal panel 102 and the incident polarization direction of the first liquid-crystal panel 101 do not coincide with each other, it is possible to realize a dual display that achieves a similar effect to that of the first embodiment by installing the λ/2 wave plate in a proper direction in a similar manner to that of the present embodiment.

<7.4 Modification>

In the seventh embodiment, on the basis of the configuration of the first embodiment (see FIG. 6), one λ/2 wave plate 45 is provided between the first liquid-crystal panel 101 and the second liquid-crystal panel 102. However, the present invention is not limited thereto. On the basis of each configuration of the second to fifth embodiments, a configuration in which one λ/2 wave plate 45 is provided between the first liquid-crystal panel 101 and the second liquid-crystal panel 102 can be also adopted. However, when providing the λ/2 wave plate 45 on the basis of the configuration of the third embodiment (see FIG. 16), the λ/2 wave plate 45 needs to be disposed in the region between the first panel body incidence-side polarizing plate 22 and the second panel body emission-side polarizing plate 23.

<8. Eighth Embodiment>
<8.1 Configuration>

Figure 28:
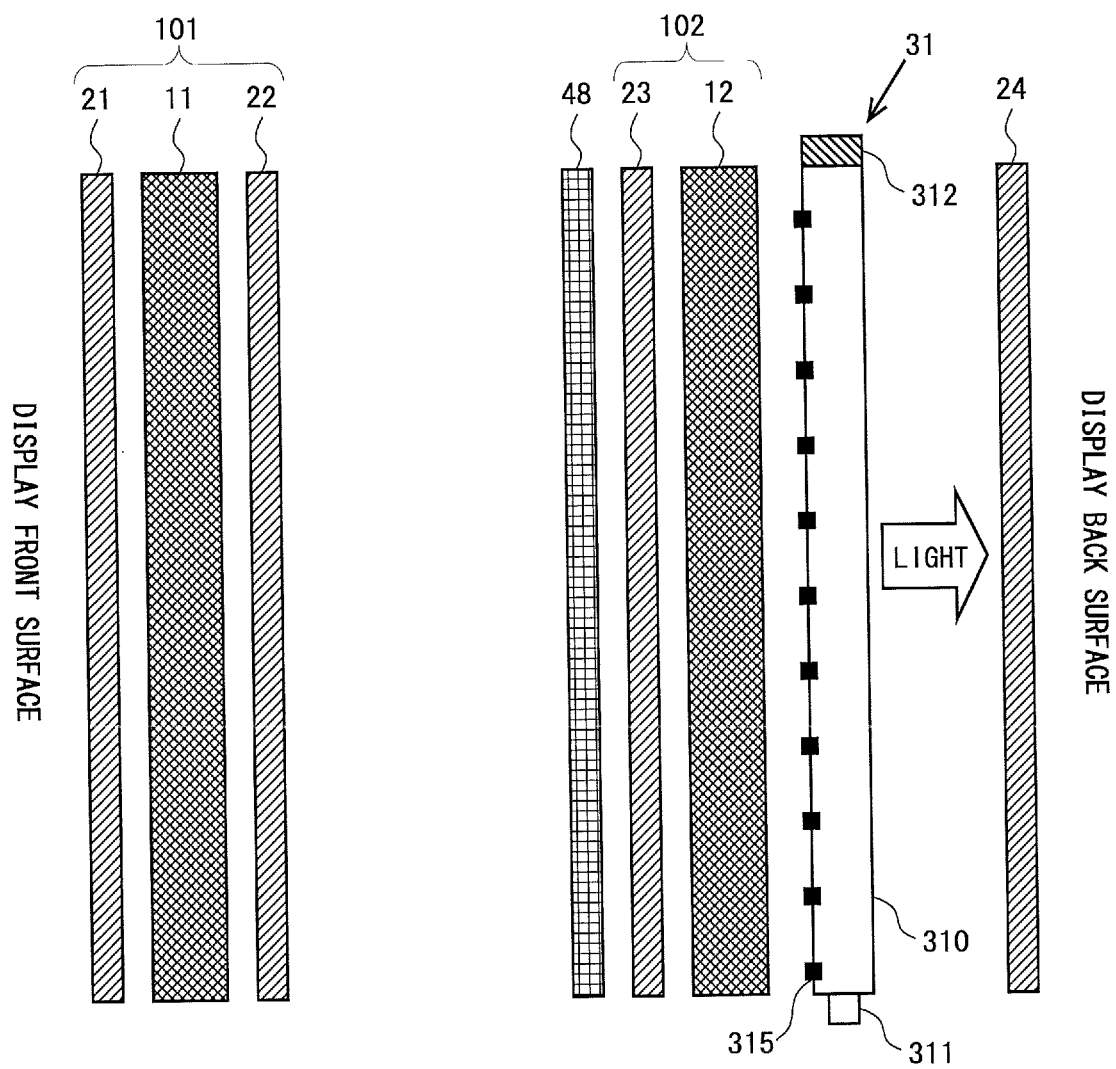
FIG. 28 is a diagram showing a configuration of an image display device according to an eighth embodiment of the present invention.

FIG. 28 is a diagram showing a configuration of an image display device according to an eighth embodiment of the present invention. As shown in FIG. 28, in the present embodiment, the first panel body emission-side polarizing plate 21, the first panel body 11, the first panel body incidence-side polarizing plate 22, a birefringent film 48, the second panel body emission-side polarizing plate 23, the second panel body 12, the back-surface irradiation light source 31, and the second panel body incidence-side polarizing plate 24 are provided from the display front-surface side toward the display back-surface side. That is, on the basis of the configuration of the first embodiment (see FIG. 6), one birefringent film 48 is additionally provided between the first panel body incidence-side polarizing plate 22 and the second panel body emission-side polarizing plate 23. In the present embodiment, the first panel body emission-side polarizing plate 21, the first panel body 11, and the first panel body incidence-side polarizing plate 22 constitute the first liquid-crystal panel 101, and the second panel body emission-side polarizing plate and the second panel body 12 constitute the second liquid-crystal panel 102.

<8.2 Birefringent Film>

Figure 29:
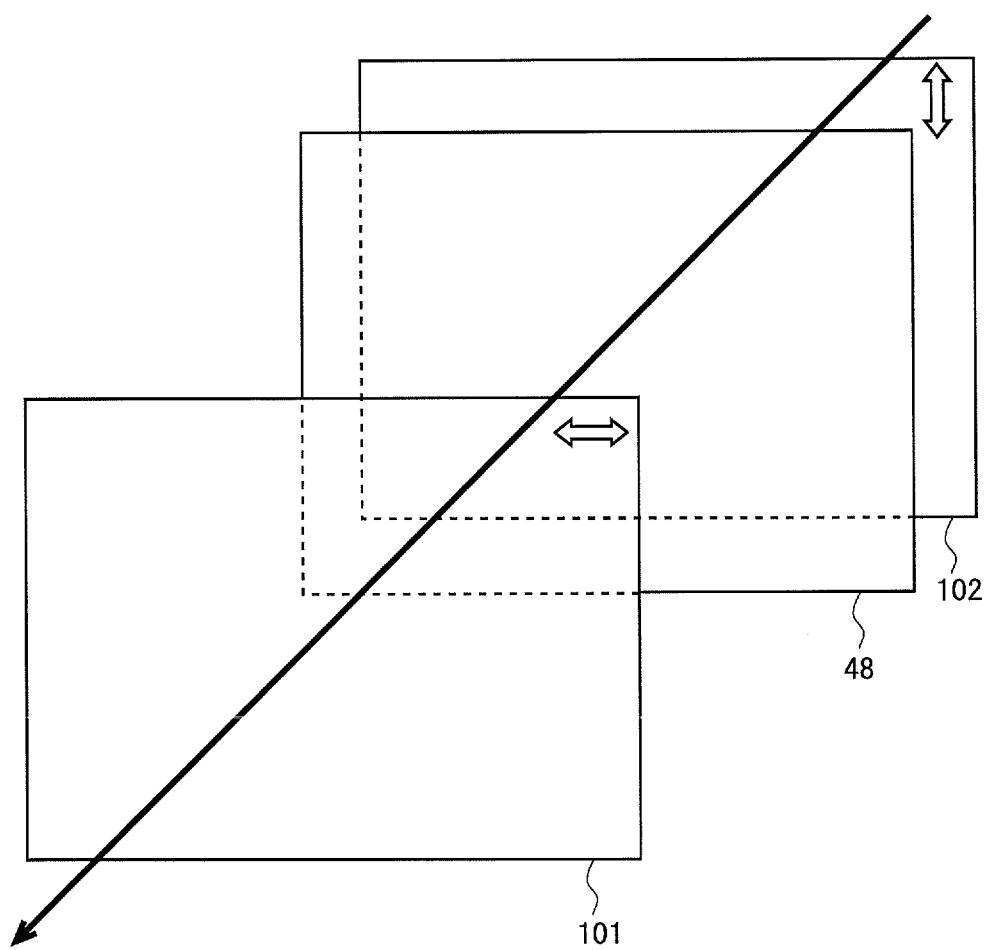
FIG. 29 is a diagram for describing how to install a birefringent film in the eighth embodiment.
Figure 30:
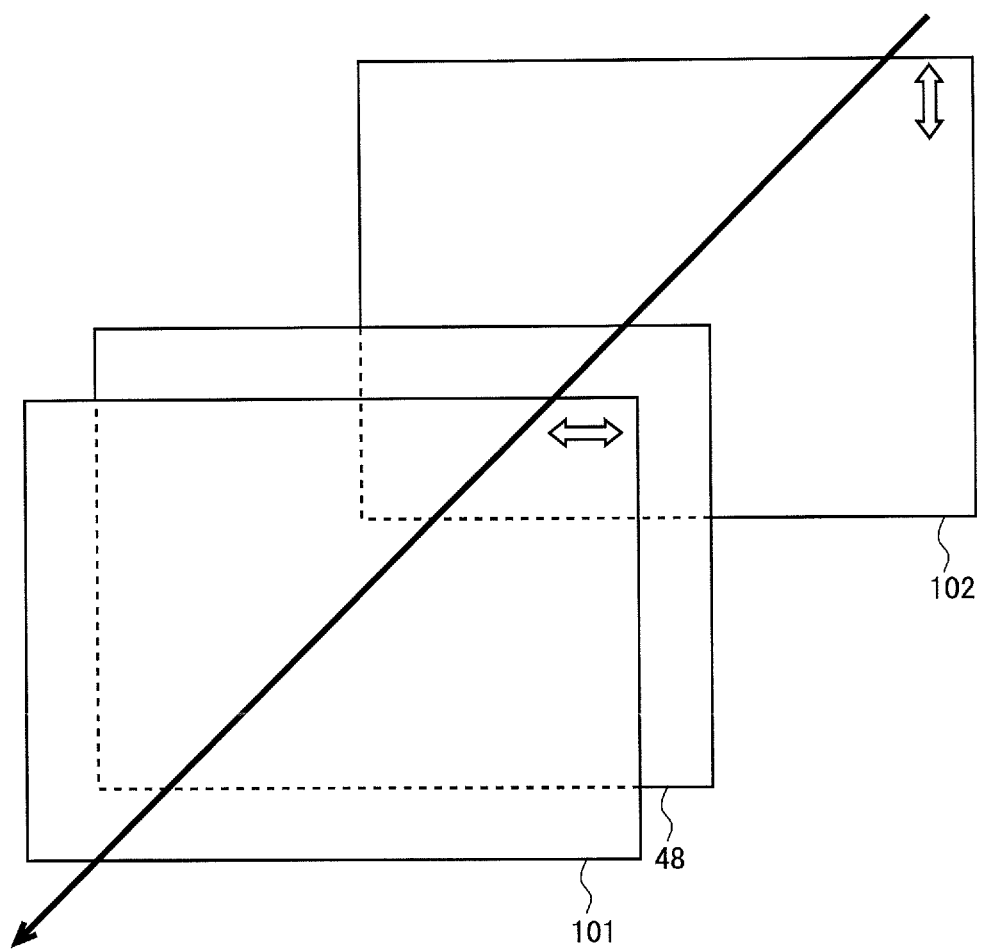
FIG. 30 is a diagram for describing how to install the birefringent film in the eighth embodiment.

FIG. 29 and FIG. 30 are diagrams for describing how to install the birefringent film 48. FIG. 29 is a diagram schematically showing a configuration when the birefringent film 48 is disposed at the second liquid-crystal panel 102 side. FIG. 30 is a diagram schematically showing a configuration when the birefringent film 48 is disposed at the first liquid-crystal panel 101 side. The birefringent film decomposes linearly polarized light so that a light does not have a specific vibrating direction, like elliptically polarized light. Therefore, when the birefringent film 48 is installed on the path of the light having passed through the second liquid-crystal panel 102, the light having passed through the birefringent film 48 always contains a component that vibrates in the same direction as the incident polarization direction of the first liquid-crystal panel 101. Therefore, in the present embodiment, the birefringent film 48 is provided between the second liquid-crystal panel 102 and the first liquid-crystal panel 101 without taking into account the relationship between the emission polarization direction of the second liquid-crystal panel 102 and the incident polarization direction of the first liquid-crystal panel 101.

<8.3 Effects>

According to the present embodiment, the birefringent film 48 is provided between the second liquid-crystal panel 102 and the first liquid-crystal panel 101. Therefore, the light given from the second liquid-crystal panel 102 to the first liquid-crystal panel 101 always contains a component that vibrates in the same direction as the incident polarization direction of the first liquid-crystal panel 101. Therefore, even when the emission polarization direction of the second liquid-crystal panel 102 and the incident polarization direction of the first liquid-crystal panel 101 have any relationship, it is possible to perform image display by the first liquid-crystal panel 101 by using the light that has passed through the second liquid-crystal panel 102 (display by the second liquid-crystal panel 102) as backlight. Further, even when the relationship between the emission polarization direction of the second liquid-crystal panel 102 and the incident polarization direction of the first liquid-crystal panel 101 is not determined at the time of design, it is possible to perform image display by the first liquid-crystal panel 101 by using the light that has passed through the second liquid-crystal panel 102 (display by the second liquid-crystal panel 102) as backlight. As described above, it is possible to realize a dual display that achieves a similar effect to that of the first embodiment by installing the birefringent film 48 between the second liquid-crystal panel 102 and the first liquid-crystal panel 101. However, in comparison with the configuration in which the emission polarization direction of the second liquid-crystal panel 102 and the incident polarization direction of the first liquid-crystal panel 101 are set in the same direction in a similar manner to that of the first embodiment, for example, brightness of the second liquid-crystal panel 102 becomes about one half.

<8.4 Modification>

In the eighth embodiment, on the basis of the configuration of the first embodiment (see FIG. 6), the birefringent film 48 is provided between the first liquid-crystal panel 101 and the second liquid-crystal panel 102. However, the present invention is not limited thereto. On the basis of the configuration of the fourth embodiment (see FIG. 17), a configuration in which the birefringent film 48 is provided between the first liquid-crystal panel 101 and the second liquid-crystal panel 102 can be also adopted. However, in this case, the birefringent film 48 needs to be disposed in the region between the backlight source 32 and the second panel body emission-side polarizing plate 23.

<9. Ninth Embodiment>
<9.1 Configuration>

Figure 31:
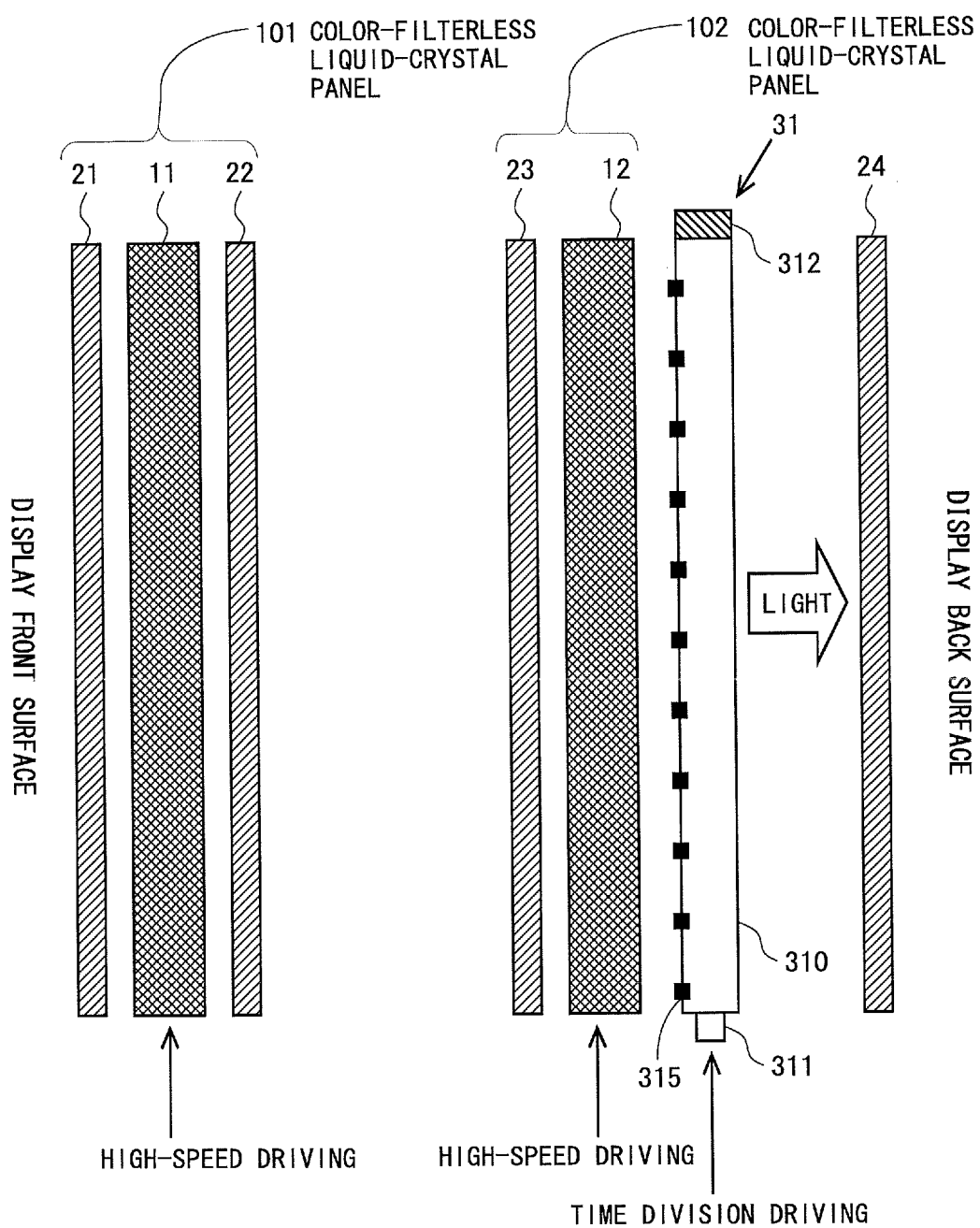
FIG. 31 is a diagram showing a configuration of an image display device according to a ninth embodiment of the present invention.

FIG. 31 is a diagram showing a configuration of an image display device according to a ninth embodiment of the present invention. In the present embodiment, both the first liquid-crystal panel 101 configured by the first panel body emission-side polarizing plate 21, the first panel body 11, and the first panel body incidence-side polarizing plate 22 and the second liquid-crystal panel 102 configured by the second panel body emission-side polarizing plate 23 and the second panel body 12 are color-filterless liquid crystal panels. Also, three-color (red, green, and blue) LEDs are provided as the LED 311 in the back-surface irradiation light source 31, and the three-color LEDs are driven in a time division manner. As described above, in the present embodiment, both the first liquid-crystal panel 101 and the second liquid-crystal panel 102 are driven in a field sequential manner.

Although a description is made herein on the assumption that three-color light sources of RGB (red, green, and blue) are used, the number of colors of the light sources and a combination of colors of the light sources are not limited thereto. However, in each of embodiments described later, a description will be made on the assumption that three-color light sources of RGB (red, green, and blue) are also used.

<9.2 Field Sequential Driving>

Here, field sequential driving will be described. Field sequential driving is a driving system for displaying a color image by turning on backlight of each color (three colors of red, green, and blue) by switching the backlight at a high speed without dividing each pixel into sub-pixels for each color. FIG. 32 is a diagram for describing a difference between the configuration of pixels in normal driving and the configuration of pixels in field sequential driving. In normal driving, one pixel 61 is divided into sub-pixels of three colors including red, green, and blue. On the other hand, in field sequential driving, three colors of red, green, and blue are sequentially displayed in one pixel 62. In general, in both normal driving and field sequential driving, one pixel (one pixel consisting of three-color sub-pixels, in normal driving) has a square shape. If one pixel has a prescribed size, it is understood that the resolution in field sequential driving is theoretically three times the resolution in normal driving.

Figure 33:
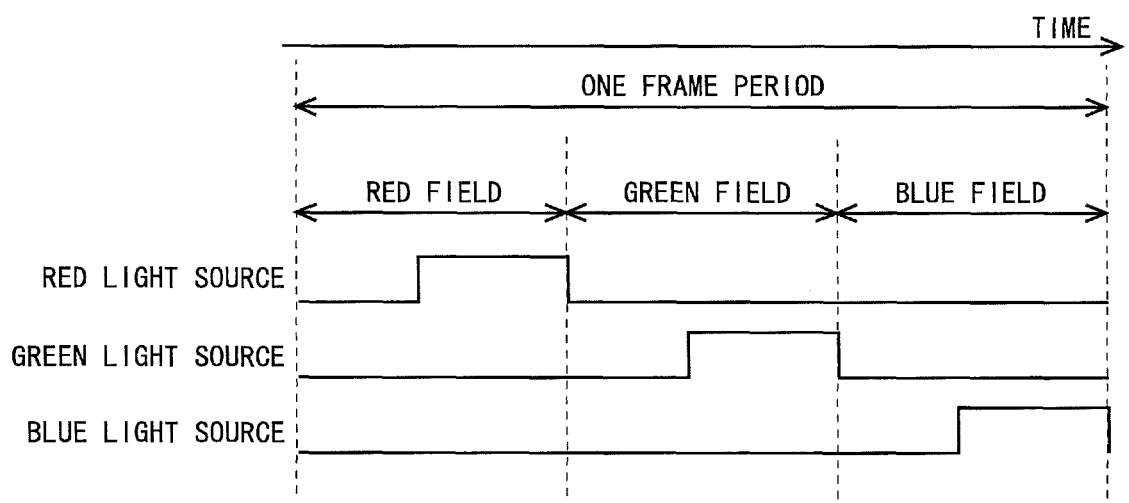
FIG. 33 is a diagram showing a change in an on state of a light source in the field sequential driving.

Infield sequential driving, one frame period is divided into three fields. In the present embodiment, one frame period is divided into a red field, a green field, and a blue field. In such field sequential driving, typically, driving is performed at a drive frequency of 180 Hz. In normal driving, typically, driving is performed at a drive frequency of 60 Hz. Further, in field sequential driving, as shown in FIG. 33, in each field, only the light source of a corresponding color is brought into the on state. Taking into account a response speed of the liquid crystal, each light source is brought into the on state only during a latter half period of a corresponding field, for example.

<9.3 Effects>

According to the present embodiment, a color filter is not provided in the first liquid-crystal panel 101 and the second liquid-crystal panel 102. Therefore, utilization efficiency of light is improved and a high aperture ratio is obtained, and concerning the space between the first liquid-crystal panel 101 and the second liquid-crystal panel 102, the viewer is enabled to visually recognize a more transmitted state. Accordingly, the display image by the second liquid-crystal panel 102 disposed at the back-surface side becomes easily visible for the viewer. Further, it is possible to achieve high brightness because the utilization efficiency of light is improved. Furthermore, a color reproduction range can be improved by sequentially turning on a plurality of single-color light sources.

<9.4 Modification>

The configuration of the ninth embodiment (see FIG. 31) is based on the configuration of the first embodiment (see FIG. 6). However, the present invention is not limited thereto. Based on the configuration of any of the second to eighth embodiments, both the first liquid-crystal panel 101 and the second liquid-crystal panel 102 may be driven in a field sequential manner.

<10. Tenth Embodiment>

<10.1 Configuration>

Figure 34:
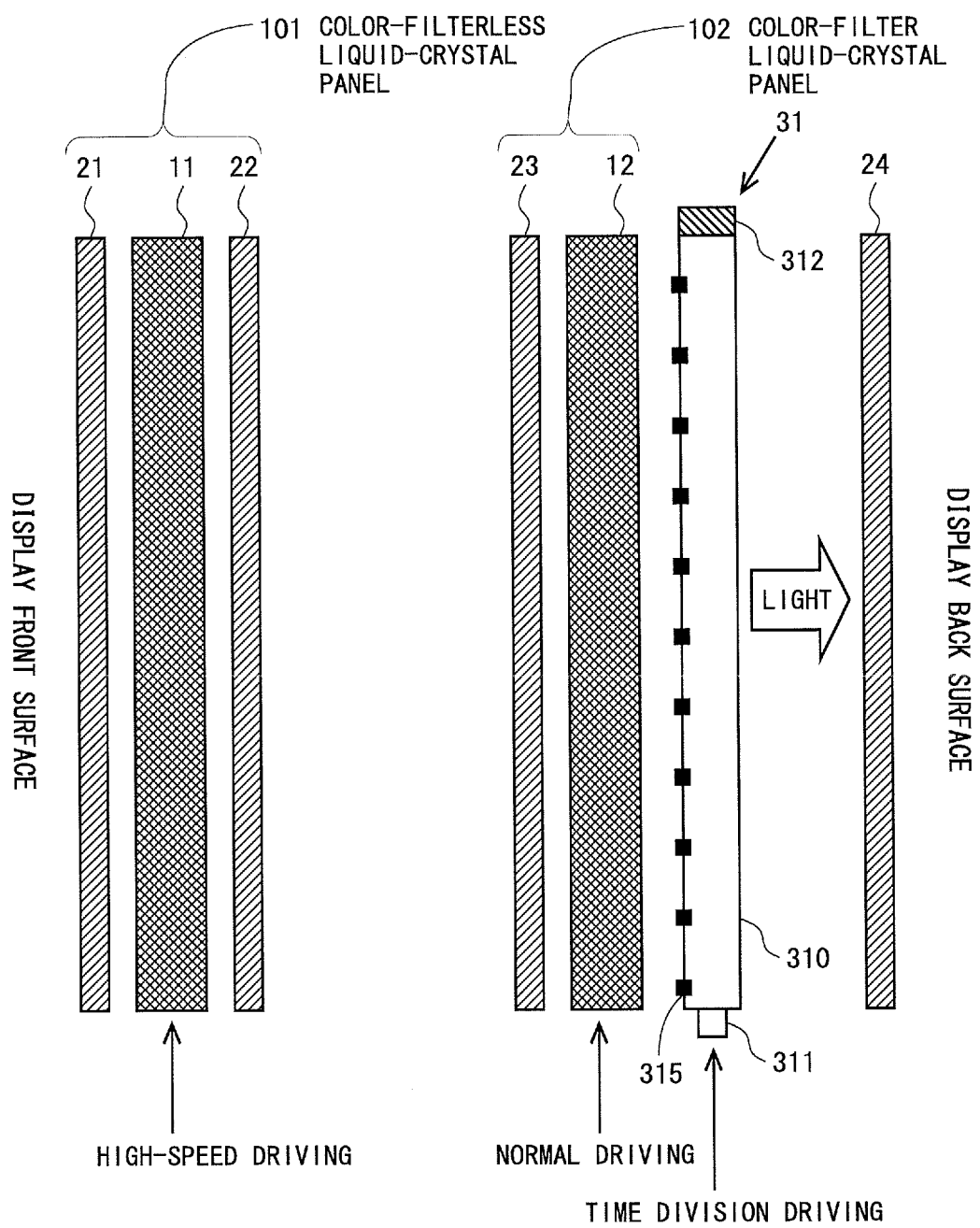
FIG. 34 is a diagram showing a configuration of an image display device according to a tenth embodiment of the present invention.

FIG. 34 is a diagram showing a configuration of an image display device according to a tenth embodiment of the present invention. In the present embodiment, the first liquid-crystal panel 101 configured by the first panel body emission-side polarizing plate 21, the first panel body 11, and the first panel body incidence-side polarizing plate 22 is a color-filterless liquid-crystal panel, and the second liquid-crystal panel 102 configured by the second panel body emission-side polarizing plate 23 and the second panel body 12 is a color-filter liquid-crystal panel. That is, the first liquid-crystal panel 101 is driven in a field sequential manner, and the second liquid-crystal panel 102 is normally driven.

In the present embodiment, in a similar manner to that of the ninth embodiment, three-color (red, green, and blue) LEDs are provided as the LED 311 in the back-surface irradiation light source 31, and the three-color LEDs are driven in a time division manner. However, because the second liquid-crystal panel 102 is a color-filter liquid crystal panel, it is assumed that the second liquid-crystal panel 102 is normally driven. Concerning this, when the drive frequency of the second liquid-crystal panel 102 is set sufficiently lower than the drive frequency of the first liquid-crystal panel 101, image display is performed normally by the second liquid-crystal panel 102 even when the three-color LEDs are driven in a time division manner. For example, the drive frequency of the second liquid-crystal panel 102 may be set to 60 Hz, and the drive frequency of the first liquid-crystal panel 101 may be set to 180 Hz.

<10.2 Effects>

In the ninth embodiment, both the first liquid-crystal panel 101 and the second liquid-crystal panel 102 are color-filterless liquid-crystal panels. However, because normal driving is generally performed by using a color-filter liquid-crystal panel, there is a concern that cost is increased due to the adoption of two color-filterless liquid-crystal panels. In this respect, according to the present embodiment, only one color-filterless liquid-crystal panel is adopted. Therefore, the increase in cost can be suppressed. From the above, it is possible to realize a dual display that achieves a similar effect to that of the ninth embodiment while suppressing the increase in cost.

<10.3 Modification>

Figure 35:
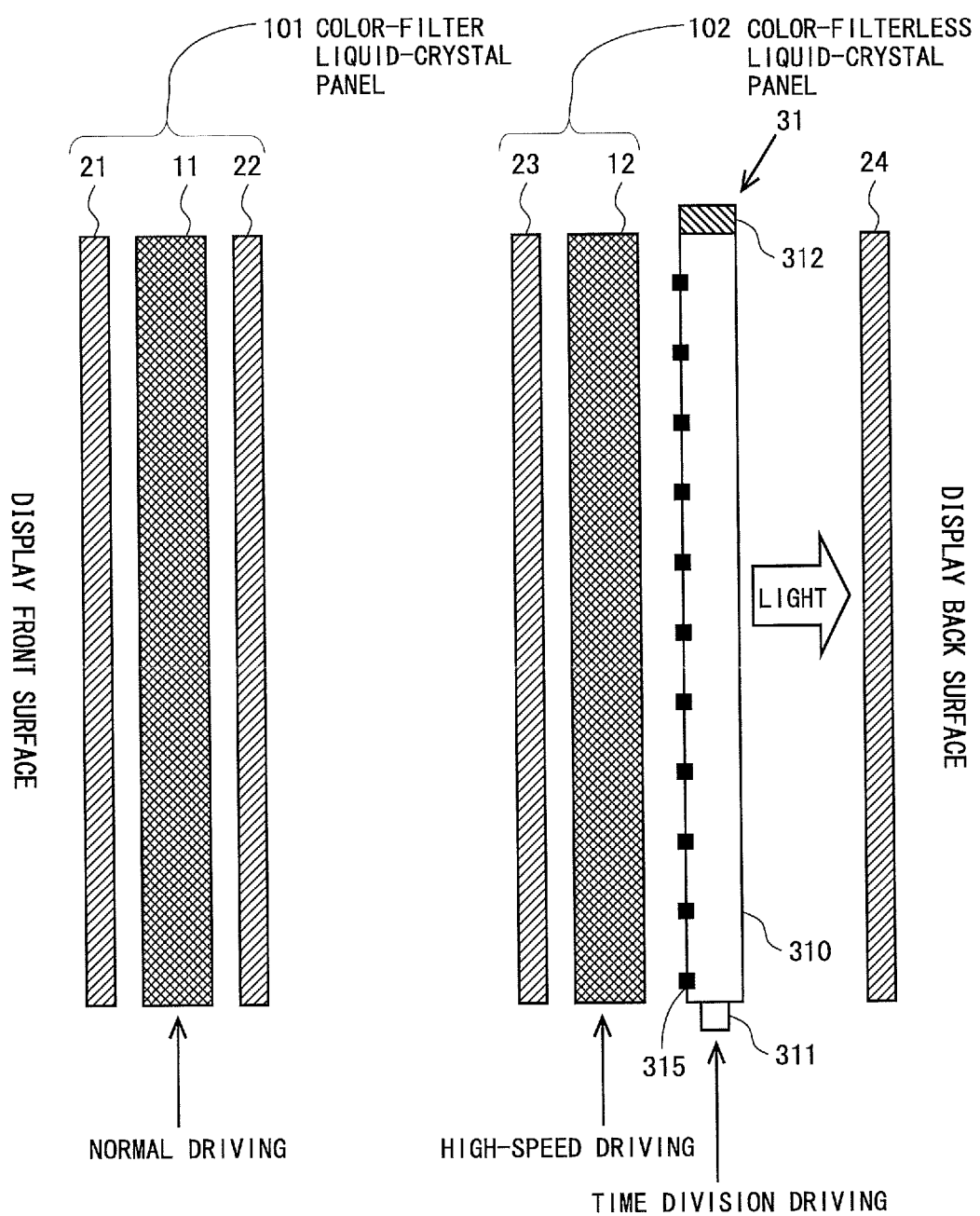
FIG. 35 is a diagram showing a configuration of an image display device according to a modification of the tenth embodiment.

FIG. 35 is a diagram showing a configuration of an image display device according to a modification of the tenth embodiment. In the present modification, the first liquid-crystal panel 101 configured by the first panel body emission-side polarizing plate 21, the first panel body 11, and the first panel body incidence-side polarizing plate 22 is a color-filter liquid-crystal panel, and the second liquid-crystal panel 102 configured by the second panel body emission-side polarizing plate 23 and the second panel body 12 is a color-filterless liquid-crystal panel. That is, the first liquid-crystal panel 101 is normally driven, and the second liquid-crystal panel 102 is driven in a field sequential manner. In the present modification, when the drive frequency of the first liquid-crystal panel 101 is set sufficiently lower than the drive frequency of the second liquid-crystal panel 102, image display is performed normally by the first liquid-crystal panel 101, even when the three-color LEDs are driven in a time division manner. Also in the present modification, only one color-filterless liquid-crystal panel is adopted in a similar manner to that of the tenth embodiment. Therefore, it is possible to realize a dual display that achieves a similar effect to that of the ninth embodiment while suppressing the increase in cost.

<10.4 Others>

The configuration of the tenth embodiment (see FIG. 34) and the configuration of the modification (see FIG. 35) are based on the configuration of the first embodiment (see FIG. 6). However, the present invention is not limited thereto. Based on the configuration of any of the first to eighth embodiments, field sequential driving can be performed by adopting a color-filterless liquid-crystal panel for the first liquid-crystal panel 101, and normal driving can be performed by adopting a color-filter liquid-crystal panel for the second liquid-crystal panel 102. Further, based on the configuration of any of the first to eighth embodiments, normal driving can be performed by adopting a color-filter liquid-crystal panel for the first liquid-crystal panel 101, and field sequential driving can be performed by adopting a color-filterless liquid-crystal panel for the second liquid-crystal panel 102.

<11. Eleventh Embodiment>

<11.1 Overview>

Figure 36:
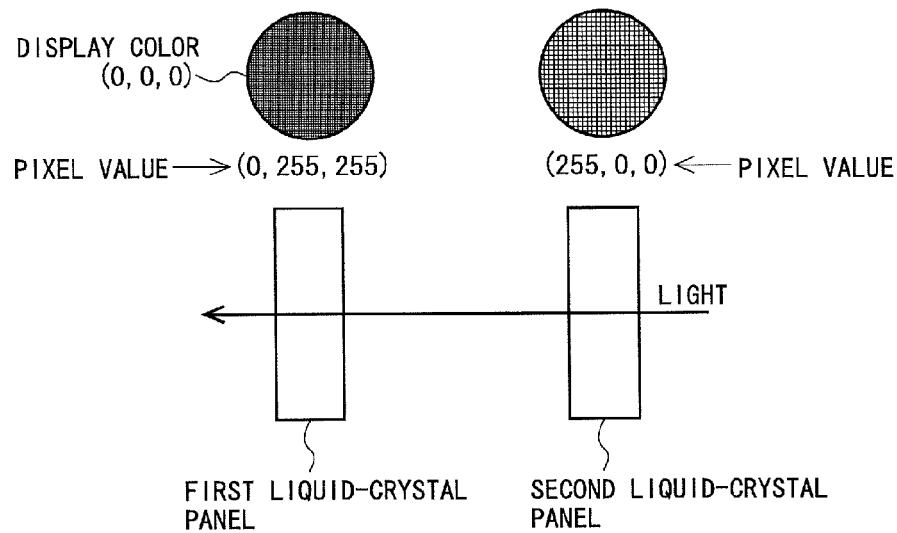
FIG. 36 is a diagram for describing lowering of a degree of freedom of display by the first liquid-crystal panel.

In the first embodiment, image display is performed by the first liquid-crystal panel 101 by using the light that has passed through the second panel body 12 (display by the second liquid-crystal panel 102) as backlight. Therefore, the first liquid-crystal panel 101 can only display colors based on colors that are included in the display image on the second liquid-crystal panel 102. Therefore, when display of black or display of a color near a single color is performed by the second liquid-crystal panel 102, the degree of freedom of display by the first liquid-crystal panel 101 becomes extremely low. More specifically, when display of a single color of red (R=255, G=0, B=0) is performed by the second liquid-crystal panel 102, for example, even when display of cyan (R=0, G=255, B=255) is to be performed by the first liquid-crystal panel 101, black (R=0, G=0, B=0) is displayed by the first liquid-crystal panel 101 because light components of green and blue are not given from the second liquid-crystal panel 102 to the first liquid-crystal panel 101. FIG. 36 is a diagram schematically showing this phenomenon.

Therefore, in the present embodiment, display quality of the first liquid-crystal panel 101 are enhanced by whitening the display image on the second liquid-crystal panel 102. In this case, the "whitening" refers to displaying a color whiter than the original color.

<11.2 Configuration>

Figure 37:
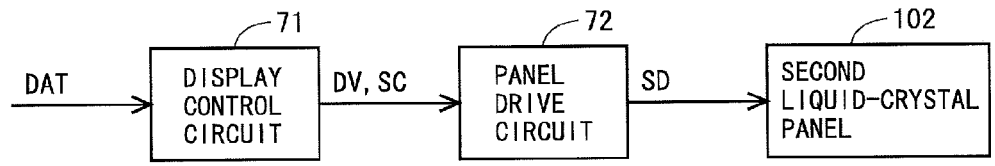
FIG. 37 is a block diagram for describing a configuration for whitening a display image on a second liquid-crystal panel in an eleventh embodiment of the present invention.

FIG. 37 is a block diagram for describing a configuration for whitening a display image on the second liquid-crystal panel 102. As a configuration element for driving the second liquid-crystal panel 102, a display control circuit 71 and a panel drive circuit 72 are provided in the image display device. The display control circuit 71 outputs, based on the input image signal DAT, a digital video signal DV and a control signal SC for controlling the operation of the panel drive circuit 72. In the present embodiment, a display color correction section is realized by the display control circuit 71. The panel drive circuit 72 outputs a driving signal SD based on the digital video signal DV and the control signal SC that are output from the display control circuit 71. The second liquid-crystal panel 102 performs image display based on the driving signal SD. The panel drive circuit 72 is configured by a gate driver and a source driver, for example.

Figure 38:
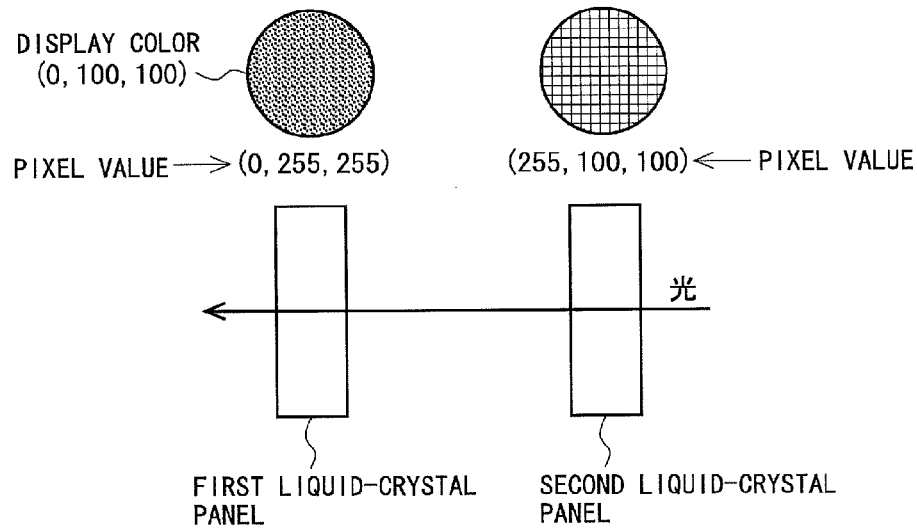
FIG. 38 is a diagram for describing whitening of the display image in the eleventh embodiment.

Usually, the display control circuit 71 outputs the digital video signal DV so that a color shown by the input image signal DAT is displayed by the second liquid-crystal panel 102. On the other hand, in the present embodiment, when the color shown by the input image signal DAT contains a color of a small component, the display control circuit 71 outputs the digital video signal DV so that a color whiter than the color shown by the input image signal DAT is displayed by the second liquid-crystal panel 102. In order to realize this, for example, in an image display device that performs gradation display of 255 gradations for each color of RGB, a rule such as "for a color with a gradation value of less than 100, the gradation value is changed to 100" is established in advance. Accordingly, when a color shown by the input image signal DAT given to the display control circuit 71 is a single color of red (R=255, G=0, B=0), for example, the digital video signal DV that shows a color (R=255, G=100, B=100) having an enhanced green component and an enhanced blue component is output from the display control circuit 71. As a result, the light given from the second liquid-crystal panel 102 to the first liquid-crystal panel 101 contains not only the red component but also the green component and the blue component. Accordingly, when cyan (R=0, G=255, B=255) is to be displayed by the first liquid-crystal panel 101, a color (R=0, G=100, B=100) having an enhanced green component and an enhanced blue component as compared with the example shown in FIG. 36 is displayed. FIG. 38 is a diagram schematically showing this phenomenon.

Further, a configuration for whitening the display image on the second liquid-crystal panel 102 can be applied to any of the first to tenth embodiments.

<11.3 Effects>

According to the present embodiment, whitening is performed to the display image on the second liquid-crystal panel 102. Therefore, even when display of black or a color near a single color, for example, is to be performed by the second liquid-crystal panel 102, display of a color containing components of at least a prescribed size or more for all colors of RGB is actually performed by the second liquid-crystal panel 102. Therefore, the light given from the second liquid-crystal panel 102 to the first liquid-crystal panel 101 contains components of at least a prescribed size or more for all colors of RGB. Accordingly, the degree of freedom of display by the first liquid-crystal panel 101 is improved. As a result, display quality of the first liquid-crystal panel 101 can be enhanced.

<12. Others>

The present invention is not limited to the above embodiments, and may be subjected to various modifications without departing from the scope of the present invention.

<13. Reference Examples>

Each of the above embodiments is based on the configuration shown in FIG. 1 (the configuration including the back-surface irradiation light source 31 in one of regions between the first panel body emission-side polarizing plate 21 and the second panel body incidence-side polarizing plate 24). However, there is also considered realizing a dual display having expressive power such as the ability to display an image with a sense of depth and three-dimensional appearance by a configuration not including the back-surface irradiation light source 31. Hereinafter, a dual display having a configuration not including the back-surface irradiation light source 31 will be described as reference examples.

<13.1 First Reference Example>

<13.1.1 Configuration>

Figure 39:
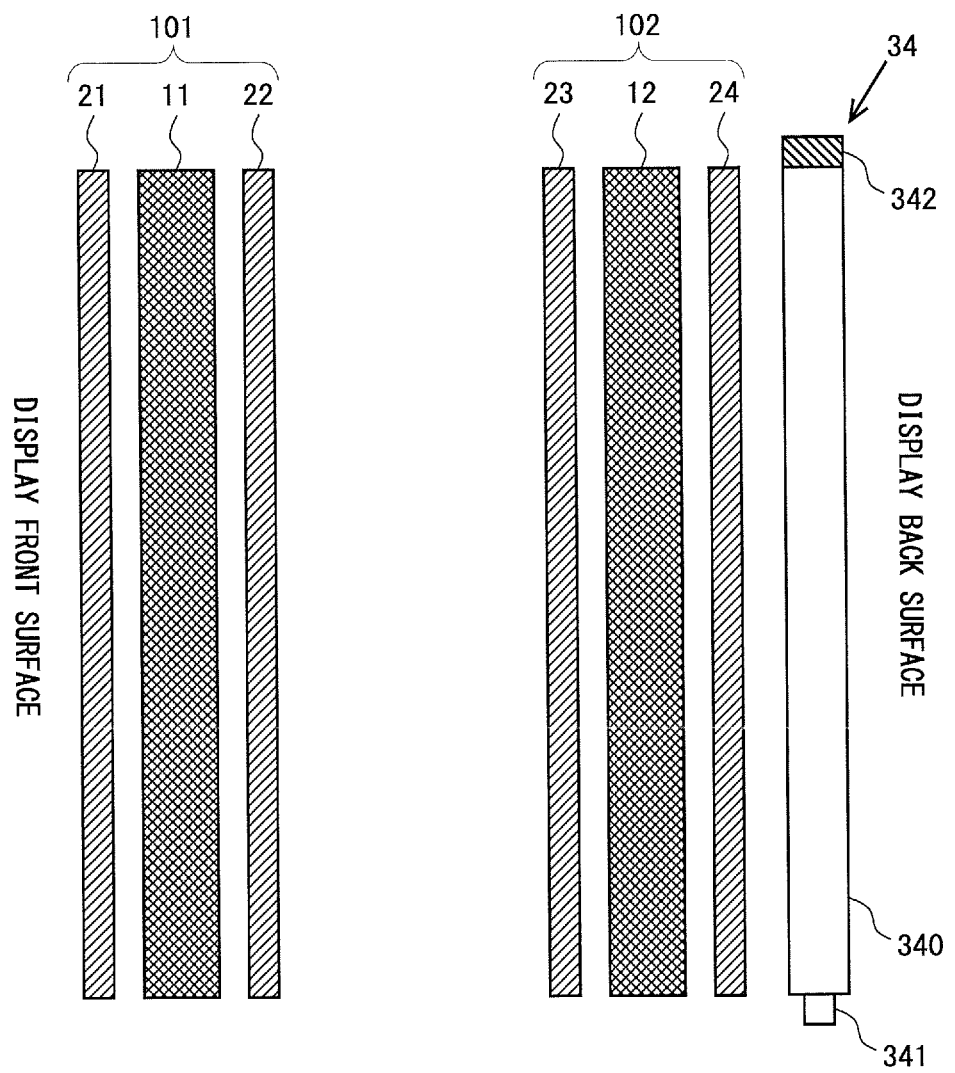
FIG. 39 is a diagram showing a configuration of an image display device according to a first reference example.

FIG. 39 is a diagram showing a configuration of an image display device according to the first reference example. As shown in FIG. 39, in the present reference example, the first panel body emission-side polarizing plate 21, the first panel body 11, the first panel body incidence-side polarizing plate 22, the second panel body emission-side polarizing plate 23, the second panel body 12, the second panel body incidence-side polarizing plate 24, and a backlight source 34 are provided from the display front-surface side toward the display back-surface side. That is, the backlight source 34 is provided at the back surface of the second panel body incidence-side polarizing plate 24. The backlight source 34 includes a light guide plate 340, an LED 341, and a reflection sheet 342. Scatterers are formed on the light guide plate 340 to effectively scatter light. In the present reference example, the first panel body emission-side polarizing plate 21, the first panel body 11, and the first panel body incidence-side polarizing plate 22 constitute the first liquid-crystal panel 101, and the second panel body emission-side polarizing plate 23, the second panel body 12, and the second panel body incidence-side polarizing plate 24 constitute the second liquid-crystal panel 102. However, it is also possible to adopt a configuration in which one of the first panel body incidence-side polarizing plate 22 and the second panel body emission-side polarizing plate 23 is not provided. The emission polarization direction of the second liquid-crystal panel 102 (the direction of the transmission axis of the second panel body emission-side polarizing plate 23) is set to be the same as the incident polarization direction of the first liquid-crystal panel 101 (the direction of the transmission axis of the first panel body incidence-side polarizing plate 22) (the polarization direction of light incident to the first panel body 11 when desired image display is performed by the first liquid-crystal panel 101). Further, it is assumed that in all reference examples including the present reference example, the TN mode is adopted as the operation mode of the liquid crystal. That is, it is assumed that inside the first panel body 11 and the second panel body 12, liquid crystal molecules are arranged in a 90-degree twisted state. However, a mode other than the TN mode may be adopted as the operation mode of the liquid crystal.

Further, the frontmost polarizing plate is realized by the first panel body emission-side polarizing plate 21, the rearmost polarizing plate is realized by the second panel body incidence-side polarizing plate 24, and the inter-panel polarizing plate is realized by the first panel body incidence-side polarizing plate 22 or the second panel body emission-side polarizing plate 23.

<13.1.2 Detailed Configuration of Second Liquid-Crystal Panel Side>

Figure 40:
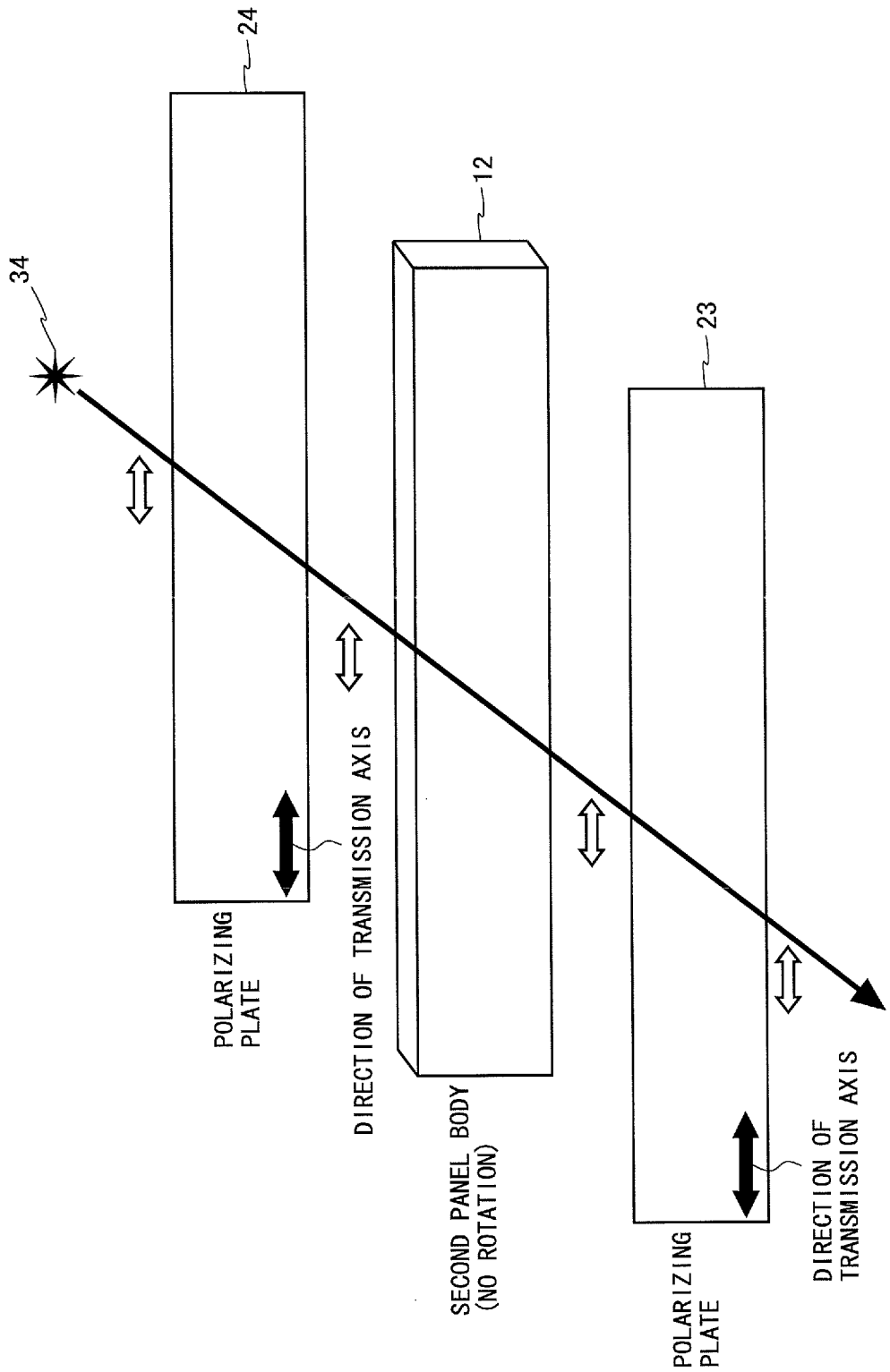
FIG. 40 is a diagram for describing a detailed configuration of a second liquid-crystal panel side in the first reference example.
Figure 41:
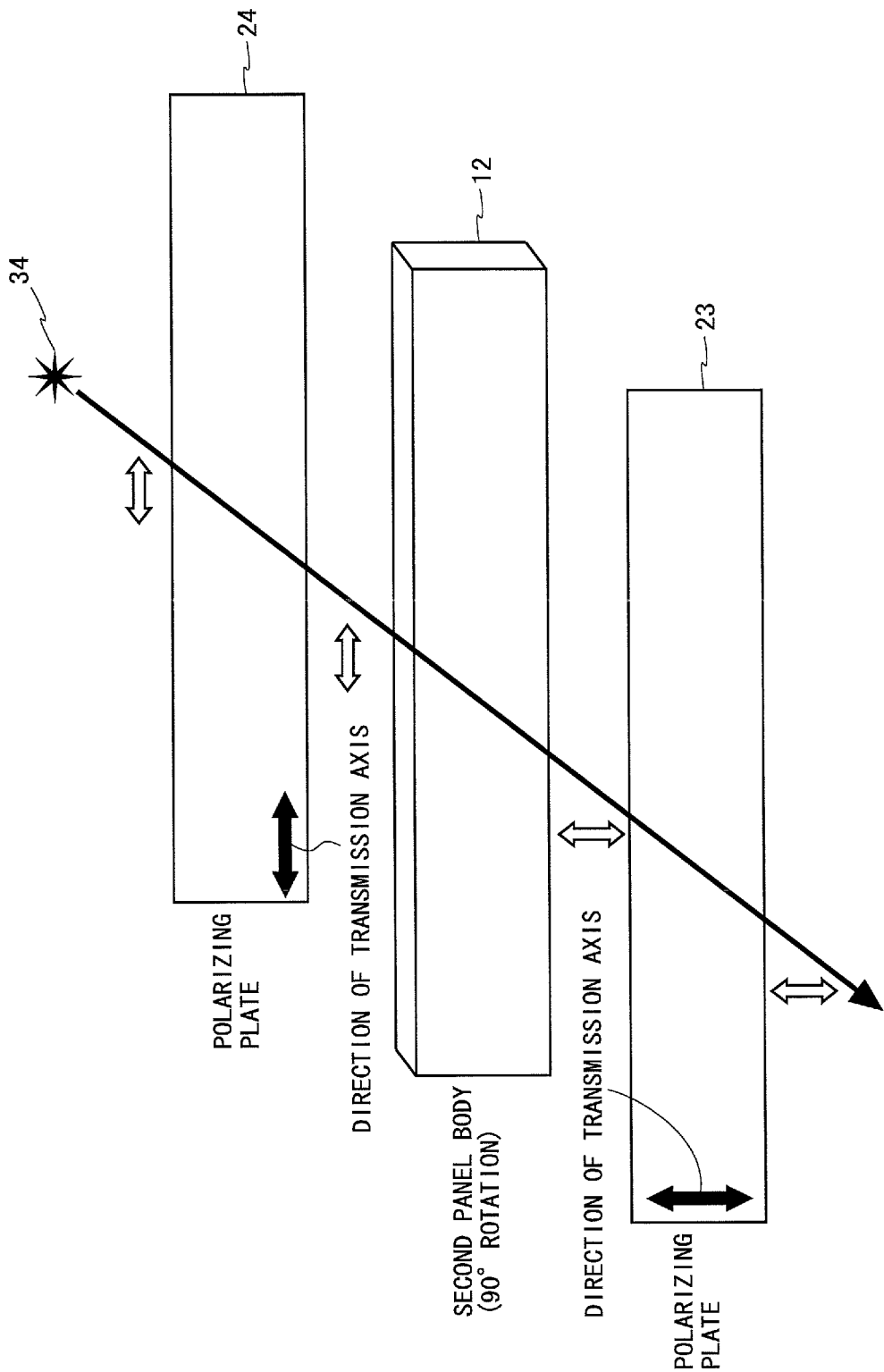
FIG. 41 is a diagram for describing a detailed configuration of the second liquid-crystal panel side in the first reference example.

With reference to FIG. 40 and FIG. 41, a detailed configuration of the second liquid-crystal panel 102 side will be described. Any of the reflection type polarizing plate and the absorption type polarizing plate can be adopted for the second panel body emission-side polarizing plate 23 and the second panel body incidence-side polarizing plate 24. A configuration shown in FIG. 40 is adopted when the second liquid-crystal panel 102 is operated in the normally black mode, and a configuration shown in FIG. 41 is adopted when the second liquid-crystal panel 102 is operated in the normally white mode.

First, with reference to FIG. 40, there will be described how light advances when the transmission axis of the second panel body incidence-side polarizing plate 24 and the transmission axis of the second panel body emission-side polarizing plate 23 are parallel to each other. When linearly polarized light emitted from the backlight source 34 is incident to the second panel body incidence-side polarizing plate 24, a polarization component having the same polarization direction as the direction of the transmission axis of the second panel body incidence-side polarizing plate 24 passes through the second panel body incidence-side polarizing plate 24. On the other hand, a polarization component having the same polarization direction as the direction of the reflection axis of the second panel body incidence-side polarizing plate 24 does not pass through the second panel body incidence-side polarizing plate 24. The polarization component having passed through the second panel body incidence-side polarizing plate 24 is incident to the second panel body 12. In this case, when a predetermined voltage is applied to the liquid crystal in the second panel body 12, the polarization component incident to the second panel body 12 passes through the second panel body 12 without rotating the polarization direction, and is incident to the second panel body emission-side polarizing plate 23. Because the polarization direction of the polarization component incident to the second panel body emission-side polarizing plate 23 is the same as the direction of the transmission axis of the second panel body emission-side polarizing plate 23, the polarization component passes through the second panel body emission-side polarizing plate 23 and exits to the front side. When no voltage is applied to the liquid crystal in the second panel body 12, the polarization component incident to the second panel body 12 passes through the second panel body 12 while rotating the polarization direction by 90 degrees. Therefore, the polarization component does not pass through the second panel body emission-side polarizing plate 23.

Next, with reference to FIG. 41, there will be described how light advances when the transmission axis of the second panel body incidence-side polarizing plate 24 and the transmission axis of the second panel body emission-side polarizing plate 23 are orthogonal to each other. When linearly polarized light emitted from the backlight source 34 is incident to the second panel body incidence-side polarizing plate 24, a polarization component having the same polarization direction as the direction of the transmission axis of the second panel body incidence-side polarizing plate 24 passes through the second panel body incidence-side polarizing plate 24. On the other hand, a polarization component having the same polarization direction as the direction of the reflection axis of the second panel body incidence-side polarizing plate 24 does not pass through the second panel body incidence-side polarizing plate 24. The polarization component having passed through the second panel body incidence-side polarizing plate 24 is incident to the second panel body 12. In this case, when no voltage is applied to the liquid crystal in the second panel body 12, the polarization component incident to the second panel body 12 passes through the second panel body 12 while rotating the polarization direction by 90 degrees, and is incident to the second panel body emission-side polarizing plate 23. Because the polarization direction of the polarization component incident to the second panel body emission-side polarizing plate 23 is the same as the direction of the transmission axis of the second panel body emission-side polarizing plate 23, the polarization component passes through the second panel body emission-side polarizing plate 23 and exits to the front side. When a predetermined voltage is applied to the liquid crystal in the second panel body 12, the polarization component incident to the second panel body 12 passes through the second panel body 12 without rotating the polarization direction. Therefore, the polarization component does not pass through the second panel body emission-side polarizing plate 23.

As described above, concerning the relationship between the second panel body incidence-side polarizing plate 24 and the second panel body emission-side polarizing plate 23, the transmission axes of both polarizing plates may be parallel to each other or the transmission axes of both polarizing plates may be orthogonal to each other.

<13.1.3 Detailed Configuration of First Liquid-Crystal Panel Side>

Figure 42:
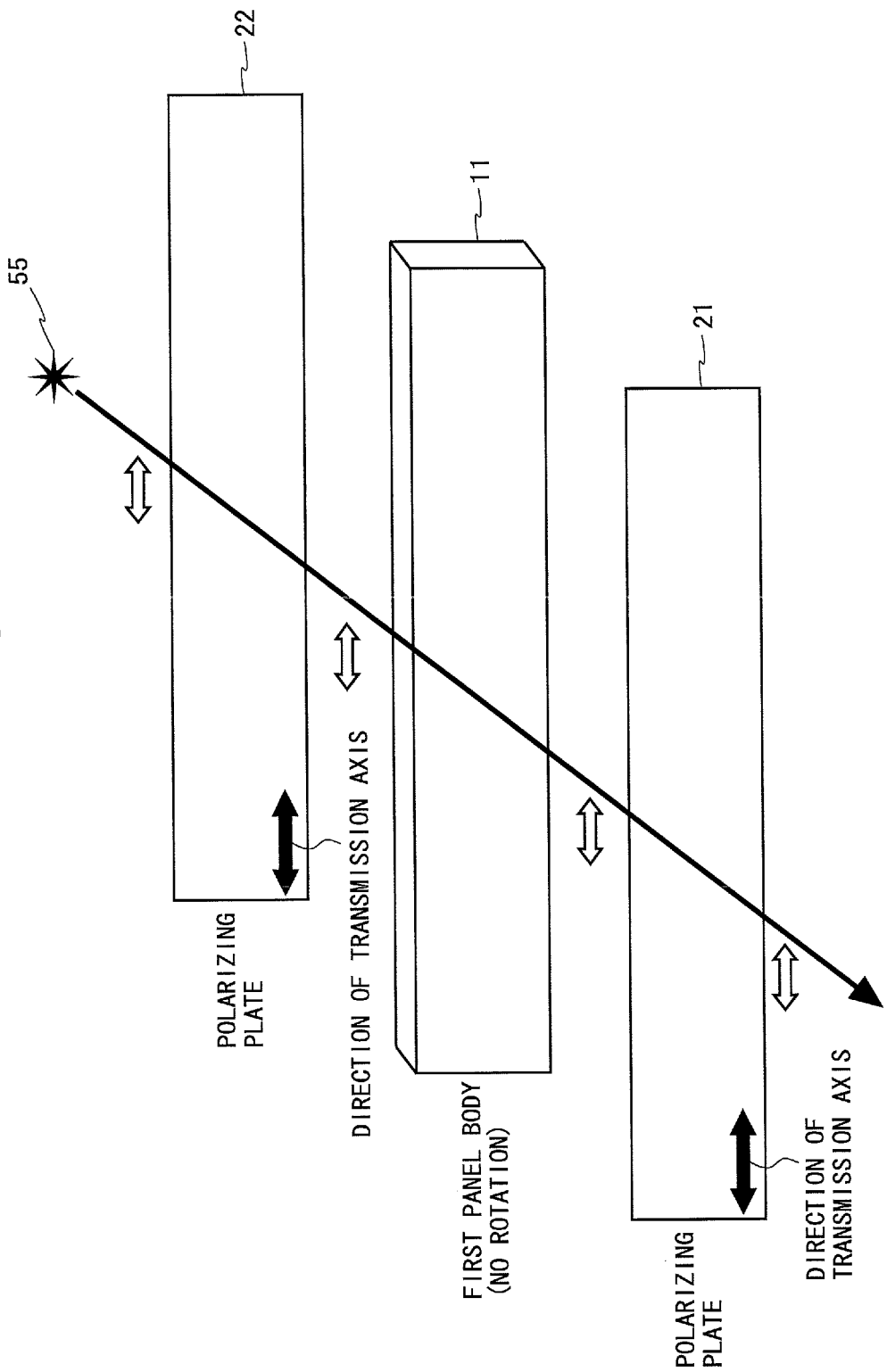
FIG. 42 is a diagram for describing a detailed configuration of a first liquid-crystal panel side in the first reference example.
Figure 43:
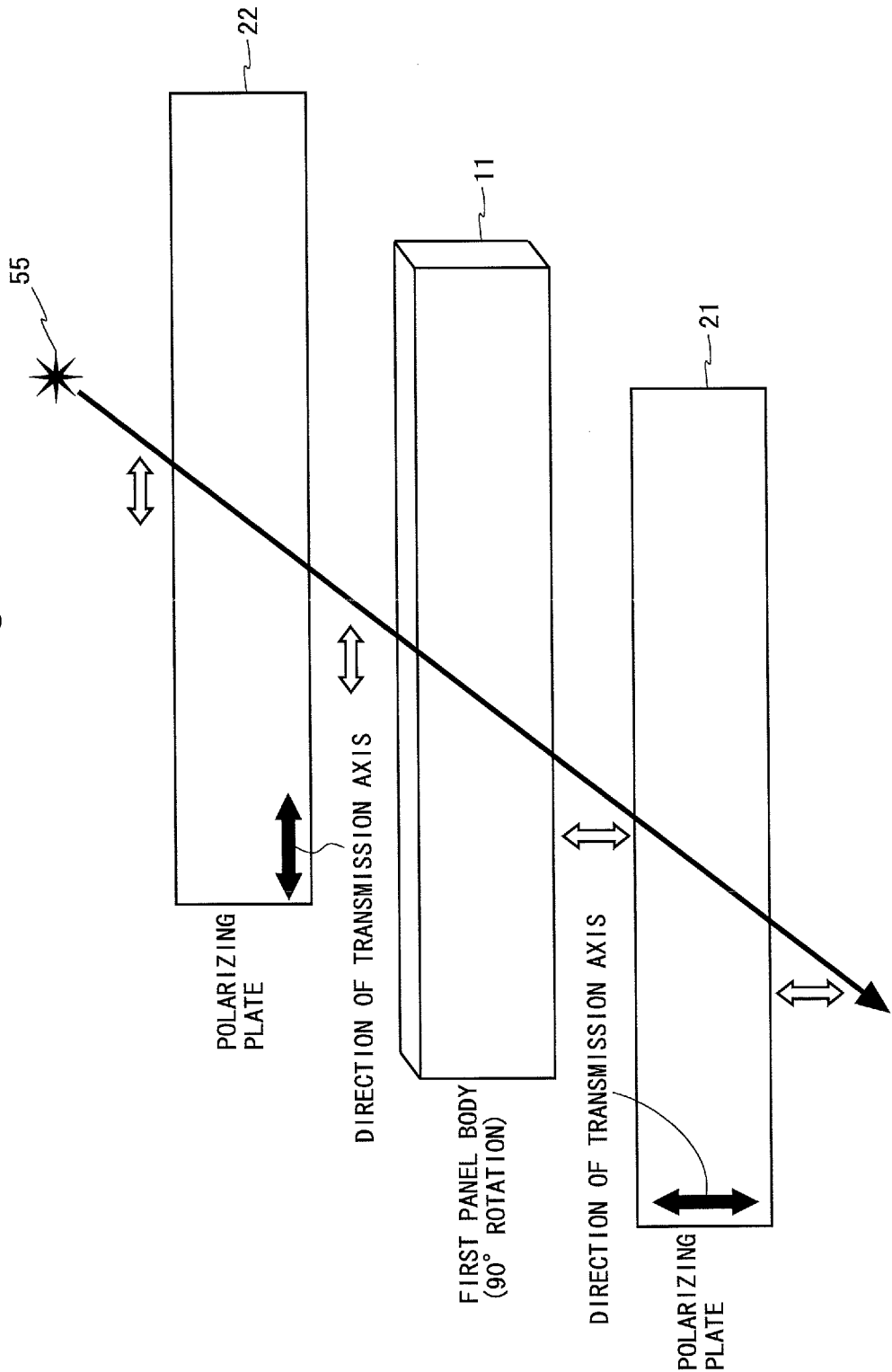
FIG. 43 is a diagram for describing a detailed configuration of the first liquid-crystal panel side in the first reference example.

With reference to FIG. 42 and FIG. 43, a detailed configuration of the first liquid-crystal panel 101 side will be described. In FIG. 42 and FIG. 43, a mark indicated by reference numeral 55 represents linearly polarized light having passed through the second panel body emission-side polarizing plate 23. Any of the reflection type polarizing plate and the absorption type polarizing plate can be adopted for the first panel body incidence-side polarizing plate 22 and the first panel body emission-side polarizing plate 21. It is assumed that the transmission axis of the first panel body incidence-side polarizing plate 22 and the transmission axis of the second panel body emission-side polarizing plate 23 are parallel to each other. A configuration shown in FIG. 42 is adopted when the first liquid-crystal panel 101 is operated in the normally black mode, and a configuration shown in FIG. 43 is adopted when the first liquid-crystal panel 101 is operated in the normally white mode.

First, with reference to FIG. 42, there will be described how light advances when the transmission axis of the first panel body incidence-side polarizing plate 22 and the transmission axis of the first panel body emission-side polarizing plate 21 are parallel to each other. Because the transmission axis of the first panel body incidence-side polarizing plate 22 and the transmission axis of the second panel body emission-side polarizing plate 23 are parallel to each other, the linearly polarized light 55 that has passed through the second panel body emission-side polarizing plate 23 passes through the first panel body incidence-side polarizing plate 22, and is incident to the first panel body 11. In this case, when a predetermined voltage is applied to the liquid crystal in the first panel body 11, the polarization component incident to the first panel body 11 passes through the first panel body 11 without rotating the polarization direction, and is incident to the first panel body emission-side polarizing plate 21. Because the polarization direction of the polarization component incident to the first panel body emission-side polarizing plate 21 is the same as the direction of the transmission axis of the first panel body emission-side polarizing plate 21, the polarization component passes through the first panel body emission-side polarizing plate 21 and exits to the front side. When no voltage is applied to the liquid crystal in the first panel body 11, the polarization component incident to the first panel body 11 passes through the first panel body 11 while rotating the polarization direction by 90 degrees. Therefore, the polarization component does not pass through the first panel body emission-side polarizing plate 21.

Next, with reference to FIG. 43, there will be described how light advances when the transmission axis of the first panel body incidence-side polarizing plate 22 and the transmission axis of the first panel body emission-side polarizing plate 21 are orthogonal to each other. Because the transmission axis of the first panel body incidence-side polarizing plate 22 and the transmission axis of the second panel body emission-side polarizing plate 23 are parallel to each other, the linearly polarized light 51 that has passed through the second panel body emission-side polarizing plate 23 passes through the first panel body incidence-side polarizing plate 22, and is incident to the first panel body 11. In this case, when no voltage is applied to the liquid crystal in the first panel body 11, the polarization component incident to the first panel body 11 passes through the first panel body 11 while rotating the polarization direction by 90 degrees, and is incident to the first panel body emission-side polarizing plate 21. Because the polarization direction of the polarization component incident to the first panel body emission-side polarizing plate 21 is the same as the direction of the transmission axis of the first panel body emission-side polarizing plate 21, the polarization component passes through the first panel body emission-side polarizing plate 21 and exits to the front side. When a predetermined voltage is applied to the liquid crystal in the first panel body 11, the polarization component incident to the first panel body 11 passes through the first panel body 11 without rotating the polarization direction. Therefore, the polarization component does not pass through the first panel body emission-side polarizing plate 21.

As described above, concerning the relationship between the first panel body incidence-side polarizing plate 22 and the first panel body emission-side polarizing plate 21, the transmission axes of both polarizing plates may be parallel to each other or the transmission axes of both polarizing plates may be orthogonal to each other.

<13.1.4 Effects>

According to the present reference example, the backlight source 32 is provided at a further back surface of the second liquid-crystal panel 102 disposed at the back surface of the first liquid-crystal panel 101. In such a configuration, the emission polarization direction of the second liquid-crystal panel 102 (the direction of the transmission axis of the second panel body emission-side polarizing plate 23) is set to be the same as the incident polarization direction of the first liquid-crystal panel 101 (the direction of the transmission axis of the first panel body incidence-side polarizing plate 22). As a result, the light emitted from the backlight source 32 passes through the second panel body 12 and the first panel body 11 depending on respective states of liquid crystals (transmittances based on magnitudes of liquid crystal application voltages) in the second panel body 12 and the first panel body 11. Accordingly, the viewer is enabled to view display images on both the first liquid-crystal panel 101 and the second liquid-crystal panel 102. In this case, by providing some space between the first liquid-crystal panel 101 and the second liquid-crystal panel 102, it is possible to display an image with a sense of depth and three-dimensional appearance. From the above, it is possible to realize a dual display having high expressive power by using one light source (the backlight source 32).

Further, according to the present reference example, it is also possible to adopt a configuration not including one of the second panel body emission-side polarizing plate 23 and the first panel body incidence-side polarizing plate 22.

Accordingly, a light component absorbed or reflected by the polarizing plate is reduced, and the light emitted from the light source is more effectively utilized than in the conventional art. Further, because the number of required polarizing plates is smaller than that in the conventional art, the effect of reducing the manufacturing cost can be obtained.

<13.1.5 Modification>

Figure 44:
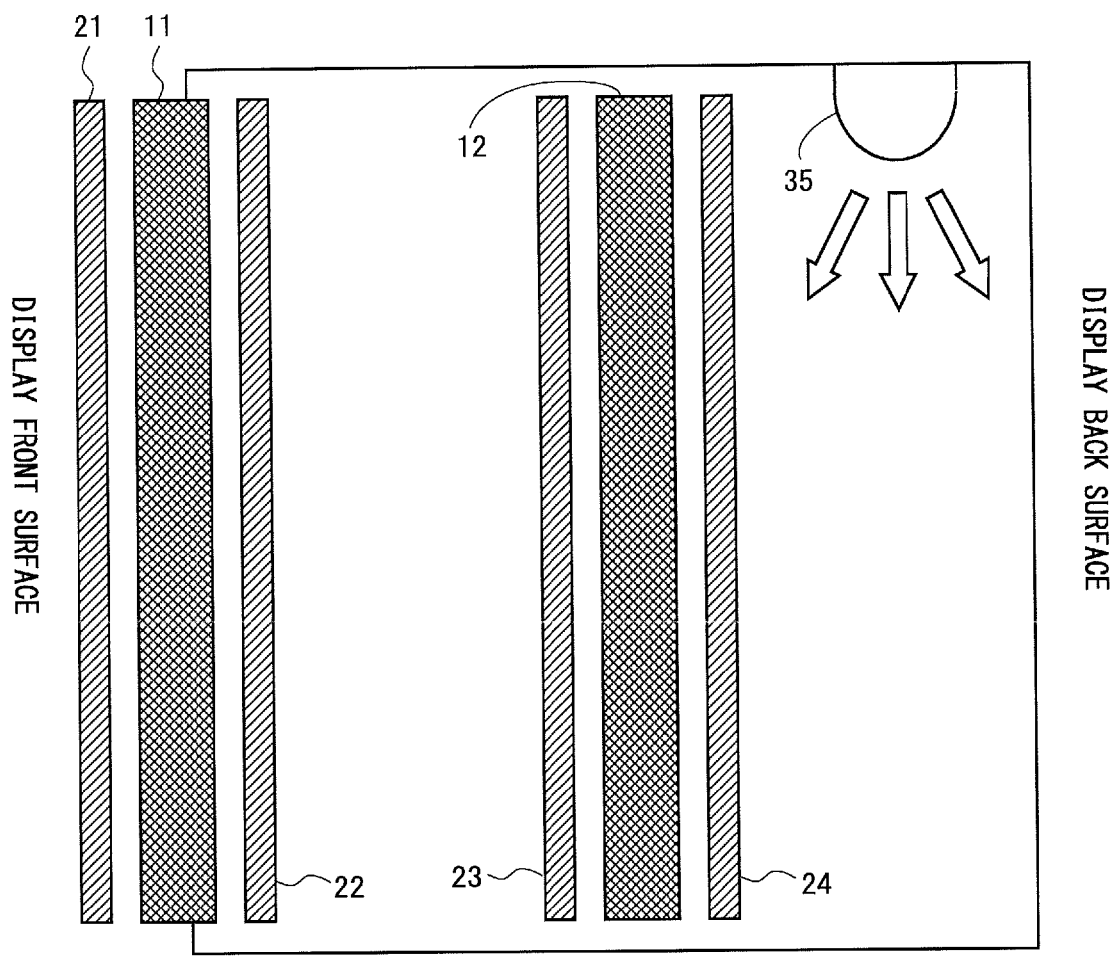
FIG. 44 is a diagram showing a configuration of an image display device according to a modification of the first reference example.

According to the first reference example, the backlight source 34 using the light guide plate 340 is provided at the back surface of the second panel body incidence-side polarizing plate 24. However, as shown in FIG. 44, the configuration may be such that a space is provided at the back surface of the second panel body incidence-side polarizing plate 24 and the space is filled with light by an LED 35 or the like.

<13.2 Second Reference Example>
<13.2.1 Configuration>

Figure 45:
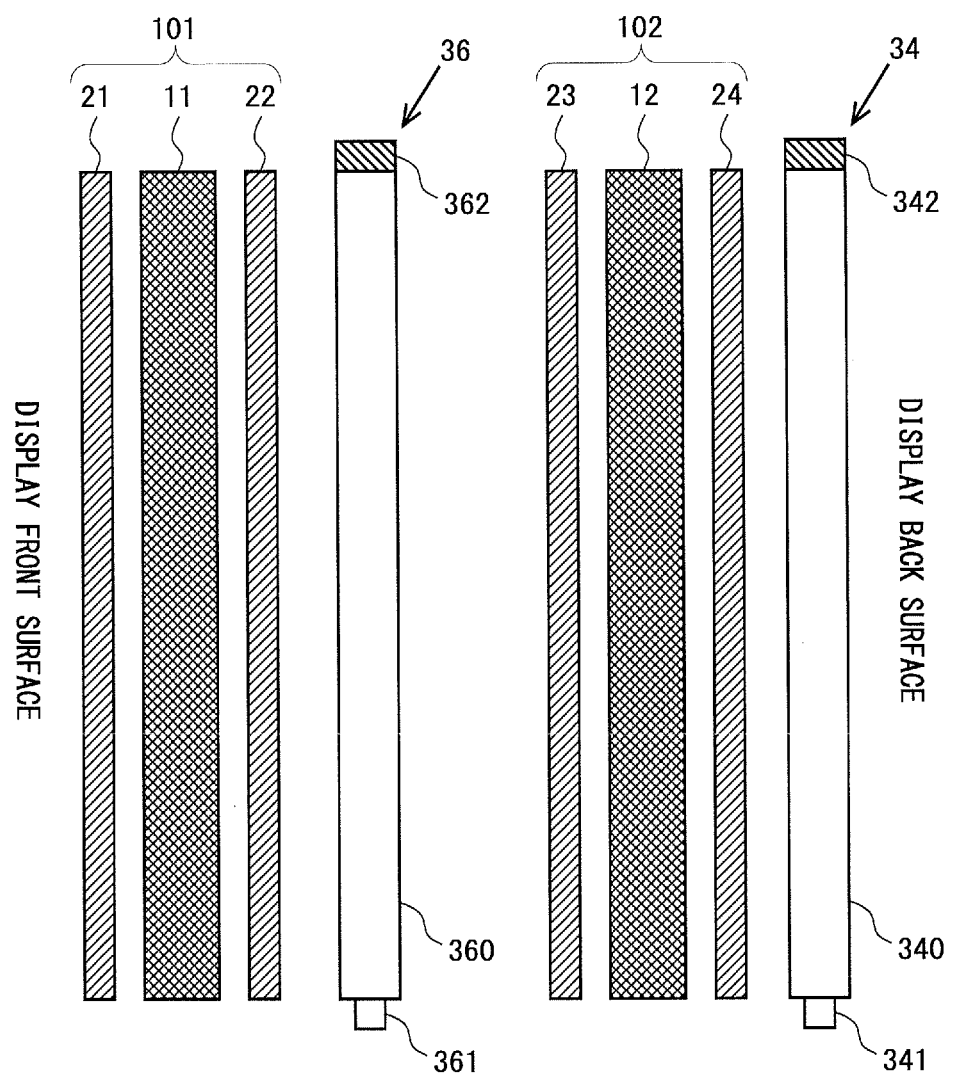
FIG. 45 is a diagram showing a configuration of an image display device according to a second reference example.

FIG. 45 is a diagram showing a configuration of an image display device according to the second reference example. As shown in FIG. 45, in the present reference example, the first panel body emission-side polarizing plate 21, the first panel body 11, the first panel body incidence-side polarizing plate 22, a backlight source 36, the second panel body emission-side polarizing plate 23, the second panel body 12, the second panel body incidence-side polarizing plate 24, and the backlight source 34 are provided from the display front-surface side toward the display back-surface side. That is, on the basis of the configuration of the first reference example (see FIG. 39), the backlight source 36 is additionally provided between the first panel body incidence-side polarizing plate 22 and the second panel body emission-side polarizing plate 23. Herein, for convenience of description, the backlight source 34 is referred to as a "first backlight source", and the backlight source 36 is referred to as a "second backlight source". In the present reference example, the first panel body emission-side polarizing plate 21, the first panel body 11, and the first panel body incidence-side polarizing plate 22 constitute the first liquid-crystal panel 101, and the second panel body emission-side polarizing plate 23, the second panel body 12, and the second panel body incidence-side polarizing plate 24 constitute the second liquid-crystal panel 102. According to the present reference example, it is also possible to adopt a configuration not including the second panel body emission-side polarizing plate 23.

The second backlight source 36 includes a light guide plate 360, an LED 361, and a reflection sheet 362, in a similar manner to that of the first backlight source 34. It is necessary that the display image by the second liquid-crystal panel 102 is visible from the display front-surface side. Therefore, the second backlight source 36 is produced by using a light guide plate that is usually in the transparent state and that emits light only when light is incident to the light guide plate. Specifically, there is adopted a light guide plate that is formed by mixing a scattering material into a transparent resin, or a light guide plate that is formed by dot-printing a transparent ink into a flat plate-like transparent resin.

<13.2.2 Effects>

In the first reference example, image display is performed by the first liquid-crystal panel 101 by using the light that has passed through the second panel body 12 (display by the second liquid-crystal panel 102) as backlight. Therefore, the first liquid-crystal panel 101 can only display colors based on colors that are included in the display image on the second liquid-crystal panel 102. Therefore, when display of black or display of a color near a single color is performed by the second liquid-crystal panel 102, for example, the degree of freedom of display by the first liquid-crystal panel 101 becomes extremely low. In this respect, according to the present reference example, the second backlight source 36 is provided at the immediate back surface of the first liquid-crystal panel 101. Therefore, irrespective of the state of display by the second liquid-crystal panel 102, the light component of each color is given to the first liquid-crystal panel 101, and the degree of freedom of display by the first liquid-crystal panel 101 can be enhanced. Further, by independently controlling the light amount of the first backlight source 34 and the light amount of the second backlight source 36, it is possible to individually adjust brightness of the first liquid-crystal panel 101 and brightness of the second liquid-crystal panel 102.

<13.2.3 Modification>

Figure 46:
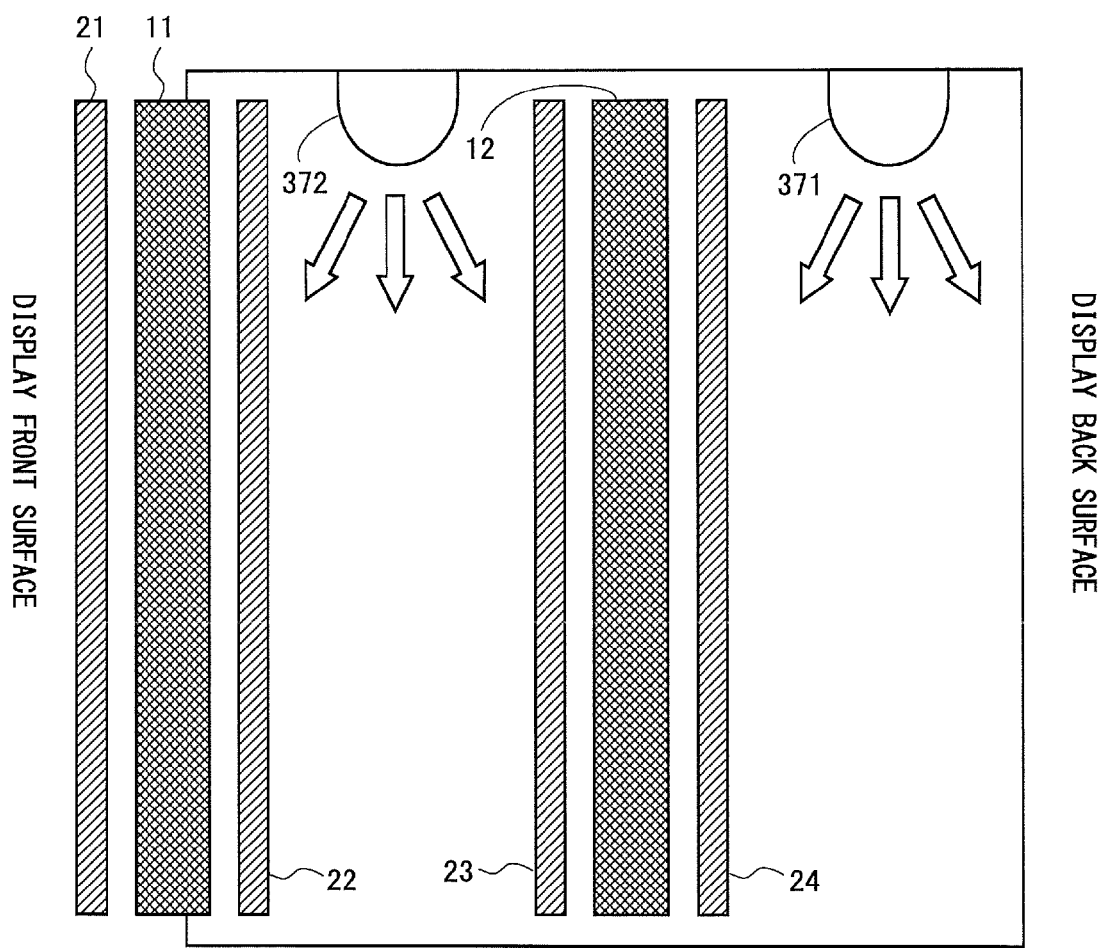
FIG. 46 is a diagram showing a configuration of an image display device according to a modification of the second reference example.

FIG. 46 is a diagram showing a configuration of an image display device according to a modification of the second reference example. In the second reference example, a backlight source using a light guide plate is adopted as the first backlight source 34 and the second backlight source 36. However, as shown in FIG. 46, the configuration may be such that a space is provided at the back surface of the second panel body incidence-side polarizing plate 24 and the space is filled with light by an LED 371 or the like while a space between the first liquid-crystal panel 101 and the second liquid-crystal panel 102 is filled with light by an LED 372 or the like.

<13.3 Third Reference Example>

<13.3.1 Configuration>

Figure 47:
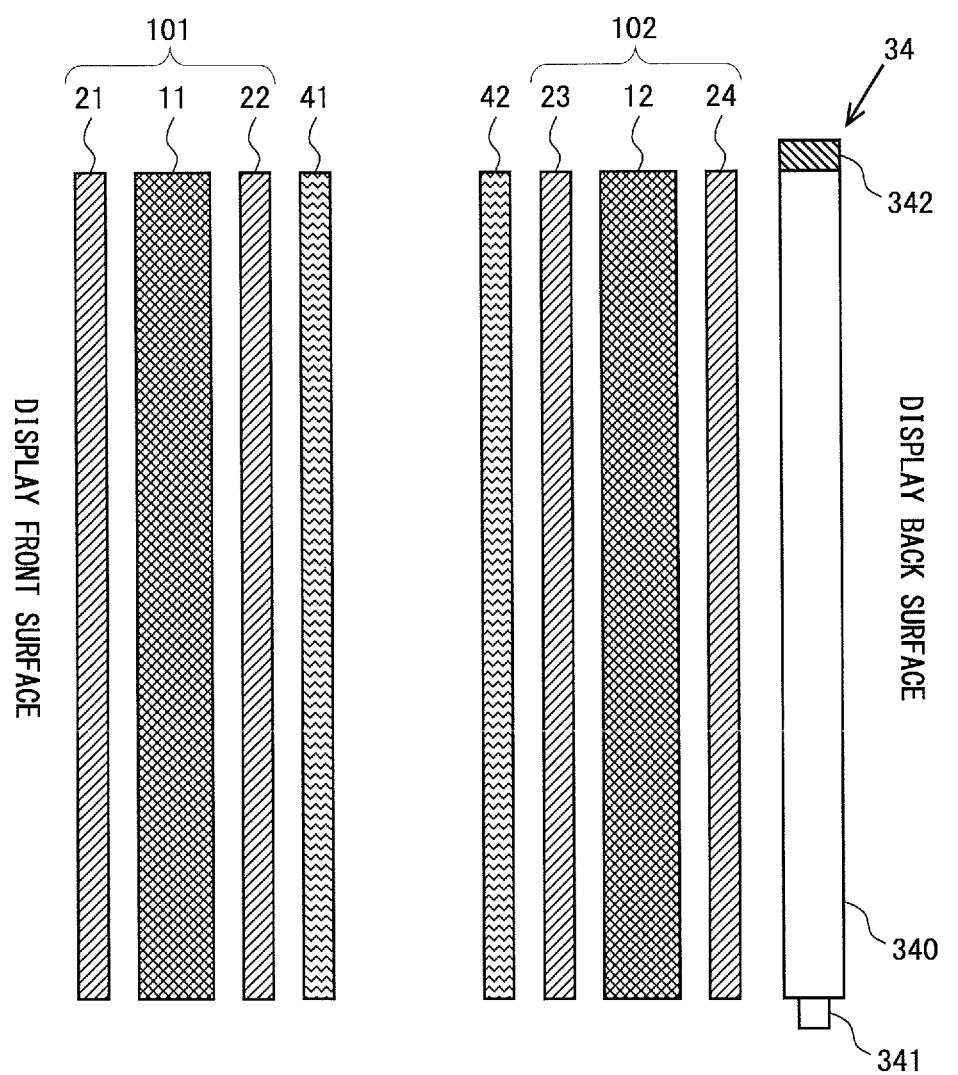
FIG. 47 is a diagram showing a configuration of an image display device according to a third reference example.

FIG. 47 is a diagram showing a configuration of an image display device according to the third reference example. As shown in FIG. 47, in the present reference example, the first panel body emission-side polarizing plate 21, the first panel body 11, the first panel body incidence-side polarizing plate 22, a first $\lambda/4$ wave plate 41, a second $\lambda/4$ wave plate 42, the second panel body emission-side polarizing plate 23, the second panel body 12, the second panel body incidence-side polarizing plate 24, and the backlight source 34 are provided from the display front-surface side toward the display back-surface side. That is, on the basis of the configuration of the first reference example (see FIG. 39), two $\lambda/4$ wave plates (the first $\lambda/4$ wave plate 41 and the second $\lambda/4$ wave plate 42) are additionally provided between the first liquid-crystal panel 101 and the second liquid-crystal panel 102. In the present reference example, the first panel body emission-side polarizing plate 21, the first panel body 11, and the first panel body incidence-side polarizing plate 22 constitute the first liquid-crystal panel 101, and the second panel body emission-side polarizing plate 23, the second panel body 12, and the second panel body incidence-side polarizing plate 24 constitute the second liquid-crystal panel 102.

<13.3.2 Wave Plate>

Here, a wave plate will be described. A wave plate causes linearly polarized light vibrating in mutually perpendicular directions to pass, and gives a predetermined phase difference between them. There are various kinds of wave plates. Generally, a $\lambda/4$ wave plate and a $\lambda/2$ wave plate are often used. In the present reference example, the two $\lambda/4$ wave plates are provided between the first liquid-crystal panel 101 and the second liquid-crystal panel 102, as described above. Inside the $\lambda/4$ wave plate, light is divided into two mutually orthogonal polarization components, and the light advances as divided polarization components. While birefringent crystal such as berg crystal is used as a material of the wave plate, the refractive index varies depending on the vibrating direction of the linearly polarized light in the birefringent crystal. Therefore, after the two polarization components pass through the $\lambda/4$ wave plate, a phase difference is generated between the two polarization components. In the $\lambda/4$ wave plate, a phase difference between the two polarization components becomes $\lambda/4$ (90 degrees).

In the present reference example, depending on the relationship between the emission polarization direction of the second liquid-crystal panel 102 and the incident polarization direction of the first liquid-crystal panel 101, how to install the two $\lambda/4$ wave plates (the first $\lambda/4$ wave plate 41 and the second $\lambda/4$ wave plate 42) is different. This will be described below.

<13.3.2.1 When Emission Polarization Direction Coincides with Incident Polarization Direction>

FIG. 23 is a diagram for describing how to install $\lambda/4$ wave plates when the emission polarization direction of the second liquid-crystal panel 102 coincides with the incident polarization direction of the first liquid-crystal panel 101. As is understood from FIG. 23, a direction of a slow axis of one of the two $\lambda/4$ wave plates (for example, the first $\lambda/4$ wave plate 41) corresponds to a direction in which the emission polarization direction/incident polarization direction are rotated to the right by 45 degrees, and a direction of a slow axis of the other of the two $\lambda/4$ wave plates (for example, the second $\lambda/4$ wave plate 42) corresponds to a direction in which the emission polarization direction/incident polarization direction are rotated to the left by 45 degrees. The two $\lambda/4$ wave plates (the first $\lambda/4$ wave plate 41 and the second $\lambda/4$ wave plate 42) are installed so that directions of respective slow axes become as described above.

<13.3.2.2 When Emission Polarization Direction and Incident Polarization Direction are Orthogonal to Each Other>

FIG. 24 is a diagram for describing how to install $\lambda/4$ wave plates when the emission polarization direction of the second liquid-crystal panel 102 and the incident polarization direction of the first liquid-crystal panel 101 are orthogonal to each other. As is understood from FIG. 24, directions of respective slow axes of the two λ/4 wave plates (the first λ/4 wave plate 41 and the second λ/4 wave plate 42) are in the same direction. The directions of these slow axes form angles of 45 degrees to both the emission polarization direction and the incident polarization direction. The two λ/4 wave plates (the first λ/4 wave plate 41 and the second λ/4 wave plate 42) are installed so that directions of respective slow axes become as described above.

<13.3.3 Effects>

When a transparent member is installed between the first liquid-crystal panel 101 and the second liquid-crystal panel 102 for a structural reason or the like, there is a concern that surface reflection generated in the space between the first liquid-crystal panel 101 and the second liquid-crystal panel 102 affects the display. In this respect, according to the present reference example, the two λ/4 wave plates (the first λ/4 wave plate 41 and the second λ/4 wave plate 42) are provided between the first liquid-crystal panel 101 and the second liquid-crystal panel 102. By disposing the first λ/4 wave plate 41 near the first liquid-crystal panel 101 and by disposing the second λ/4 wave plate 42 near the second liquid-crystal panel 102, influence to the display by the surface reflection generated in the space between the first liquid-crystal panel 101 and the second liquid-crystal panel 102 can be reduced. In this way, according to the present reference example, influence to the display by the surface reflection of light can be reduced while enhancing the utilization efficiency of light emitted from the back-surface irradiation light source 31.

Further, when the emission polarization direction of the second liquid-crystal panel 102 and the incident polarization direction of the first liquid-crystal panel 101 are orthogonal to each other, the polarization direction after the light emitted from the second liquid-crystal panel 102 has passed through the two λ/4 wave plates and the incident polarization direction of the first liquid-crystal panel 101 can be made to coincide with each other by installing the two λ/4 wave plates (the first λ/4 wave plate 41 and the second λ/4 wave plate 42) as shown in FIG. 24. For example, in the first reference example, it is assumed that the transmission axis of the second panel body emission-side polarizing plate 23 and the transmission axis of the first panel body incidence-side polarizing plate 22 (that is, the emission polarization direction of the second liquid-crystal panel 102 and the incident polarization direction of the first liquid-crystal panel 101) are parallel to each other. Concerning this, even when the emission polarization direction of the second liquid-crystal panel 102 and the incident polarization direction of the first liquid-crystal panel 101 are orthogonal to each other, it is possible to realize a dual display that achieves a similar effect to that of the first reference example by providing the two λ/4 wave plates as shown in FIG. 24.

<13.3.4 Modification>

In the third reference example, on the basis of the configuration of the first reference example (see FIG. 39), two λ/4 wave plates are provided between the first liquid-crystal panel 101 and the second liquid-crystal panel 102. However, on the basis of the configuration of the second reference example (see FIG. 45), a configuration in which two λ/4 wave plates are provided between the first liquid-crystal panel 101 and the second liquid-crystal panel 102 can be also adopted. However, in this case, it is necessary that the backlight source 36 is not disposed between the two λ/4 wave plates.

<13.4 Fourth Reference Example>

<13.4.1 Configuration>

Figure 48:
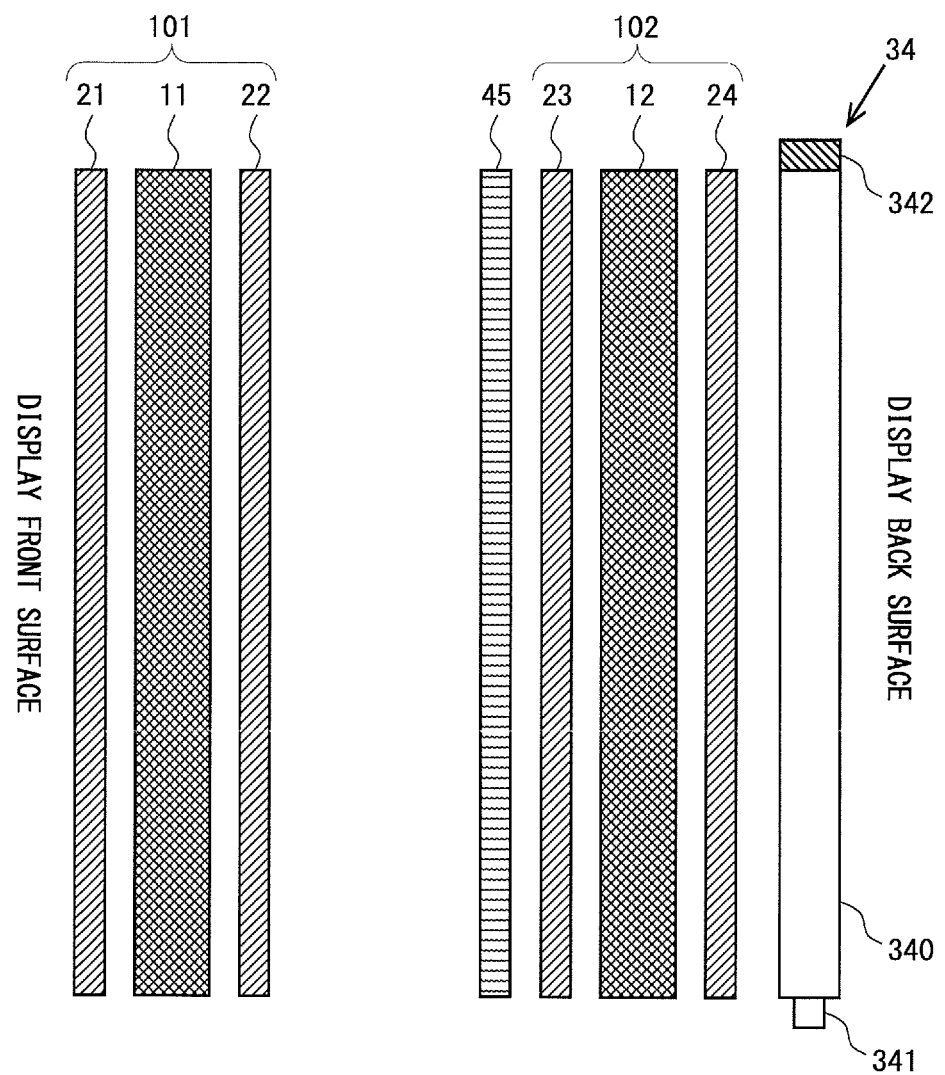
FIG. 48 is a diagram showing a configuration of an image display device according to a fourth reference example.

FIG. 48 is a diagram showing a configuration of an image display device according to the fourth reference example. As shown in FIG. 48, in the present reference example, the first panel body emission-side polarizing plate 21, the first panel body 11, the first panel body incidence-side polarizing plate 22, the λ/2 wave plate 45, the second panel body emission-side polarizing plate 23, the second panel body 12, the second panel body incidence-side polarizing plate 24, and the backlight source 34 are provided from the display front-surface side toward the display back-surface side. That is, on the basis of the configuration of the first reference example (see FIG. 39), one λ/2 wave plate 45 is additionally provided between the first panel body incidence-side polarizing plate 22 and the second panel body emission-side polarizing plate 23. In the present reference example, the first panel body emission-side polarizing plate 21, the first panel body 11, and the first panel body incidence-side polarizing plate 22 constitute the first liquid-crystal panel 101, and the second panel body emission-side polarizing plate 23, the second panel body 12, and the second panel body incidence-side polarizing plate 24 constitute the second liquid-crystal panel 102.

<13.4.2 λ/2 Wave Plate>

As described above, the wave plates cause linearly polarized light vibrating in mutually perpendicular directions to pass, and give a predetermined phase difference between them. The λ/2 wave plate causes a phase difference of λ/2 (180 degrees) to be generated between two polarization components. FIG. 26 and FIG. 27 are diagrams for describing how to install a λ/2 wave plate 45. FIG. 26 is a diagram schematically showing a configuration when the λ/2 wave plate 45 is disposed at the second liquid-crystal panel 102 side. FIG. 27 is a diagram schematically showing a configuration when the λ/2 wave plate 45 is disposed at the first liquid-crystal panel 101 side. The λ/2 wave plate 45 is provided between the second liquid-crystal panel 102 and the first liquid-crystal panel 101 so that the direction of the slow axis of the λ/2 wave plate 45 coincides with the intermediate direction between the emission polarization direction of the second liquid-crystal panel 102 and the incident polarization direction of the first liquid-crystal panel 101.

<13.4.3 Effects>

According to the present reference example, even when the emission polarization direction of the second liquid-crystal panel 102 and the incident polarization direction of the first liquid-crystal panel 101 have any relationship, when respective polarization directions (the emission polarization direction and the incident polarization direction) are known in advance, the polarization direction after the light emitted from the second liquid-crystal panel 102 passes through the λ/2 wave plate 45 can be made to coincide with the incident polarization direction of the first liquid-crystal panel 101 by installing the λ/2 wave plate 45 in the proper orientation. For example, in the first reference example, it is assumed that the transmission axis of the second panel body emission-side polarizing plate 23 and the transmission axis of the first panel body incidence-side polarizing plate 22 (that is, the emission polarization direction of the second liquid-crystal panel 102 and the incident polarization direction of the first liquid-crystal panel 101) are parallel to each other. Concerning this, even when the emission polarization direction of the second liquid-crystal panel 102 and the incident polarization direction of the first liquid-crystal panel 101 do not coincide with each other, it is possible to realize a dual display that achieves a similar effect to that of the first reference example by installing the λ/2 wave plate in a proper direction in a similar manner to that of the present reference example.

<13.4.4 Modification>

In the fourth reference example, on the basis of the configuration of the first reference example (see FIG. 39), one λ/2 wave plate 45 is provided between the first liquid-crystal panel 101 and the second liquid-crystal panel 102. However, on the basis of the configuration of the second reference example (see FIG. 45), a configuration in which one λ/2 wave plate 45 is provided between the first liquid-crystal panel 101 and the second liquid-crystal panel 102 can be also adopted.

<13.5 Fifth Reference Example>

<13.5.1 Configuration>

Figure 49:
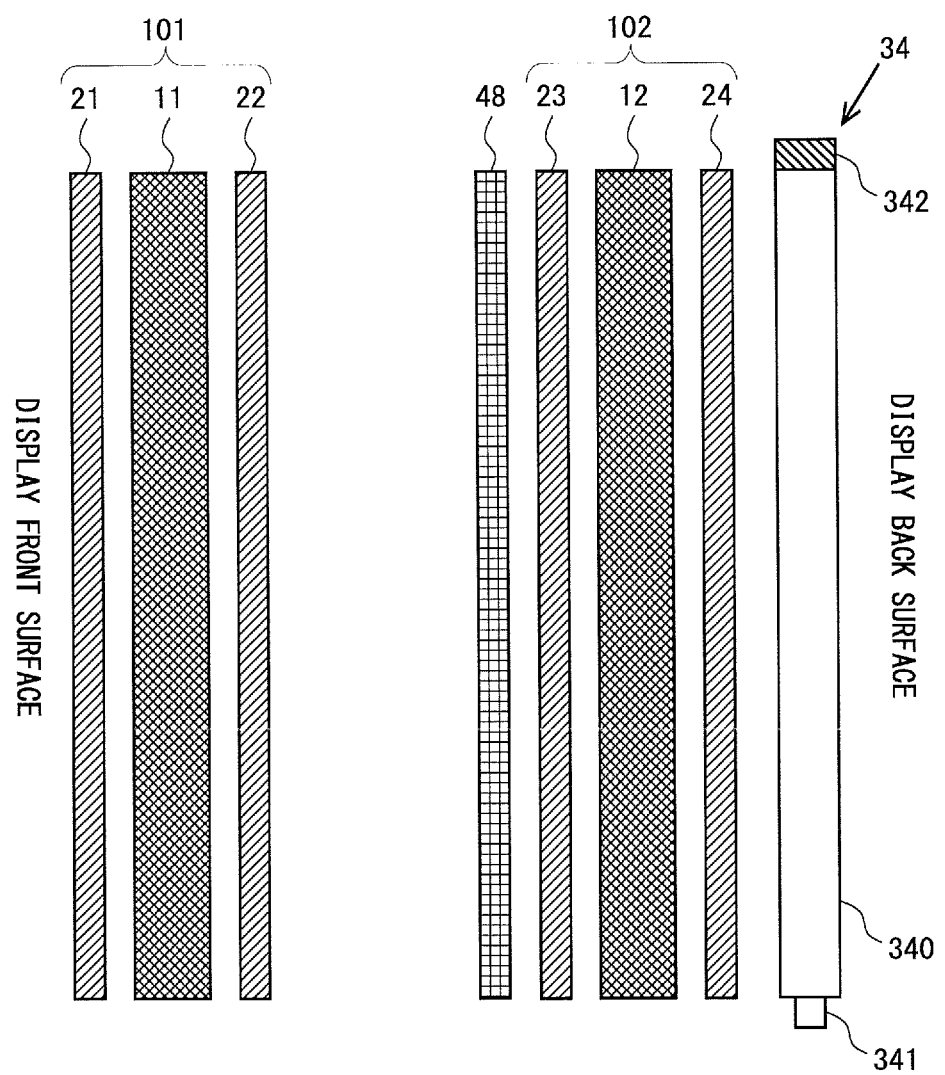
FIG. 49 is a diagram showing a configuration of an image display device according to a fifth reference example.

FIG. 49 is a diagram showing a configuration of an image display device according to the fifth reference example. As shown in FIG. 49, in the present reference example, the first panel body emission-side polarizing plate 21, the first panel body 11, the first panel body incidence-side polarizing plate 22, a birefringent film 48, the second panel body emission-side polarizing plate 23, the second panel body 12, the second panel body incidence-side polarizing plate 24, and the backlight source 34 are provided from the display front-surface side toward the display back-surface side. That is, on the basis of the configuration of the first reference example (see FIG. 39), one birefringent film 48 is additionally provided between the first panel body incidence-side polarizing plate 22 and the second panel body emission-side polarizing plate 23. In the present reference example, the first panel body emission-side polarizing plate 21, the first panel body 11, and the first panel body incidence-side polarizing plate 22 constitute the first liquid-crystal panel 101, and the second panel body emission-side polarizing plate 23, the second panel body 12, and the second panel body incidence-side polarizing plate 24 constitute the second liquid-crystal panel 102.

<13.5.2 Birefringent Film>

FIG. 29 and FIG. 30 are diagrams for describing how to install the birefringent film 48. FIG. 29 is a diagram schematically showing a configuration when the birefringent film 48 is disposed at the second liquid-crystal panel 102 side. FIG. 30 is a diagram schematically showing a configuration when the birefringent film 48 is disposed at the first liquid-crystal panel 101 side. The birefringent film decomposes linearly polarized light so that a light does not have a specific vibrating direction, like elliptically polarized light. Therefore, when the birefringent film 48 is installed on the path of the light having passed through the second liquid-crystal panel 102, the light having passed through the birefringent film 48 always contains a component that vibrates in the same direction as the incident polarization direction of the first liquid-crystal panel 101. Therefore, in the present reference example, the birefringent film 48 is provided between the second liquid-crystal panel 102 and the first liquid-crystal panel 101 without taking into account the relationship between the emission polarization direction of the second liquid-crystal panel 102 and the incident polarization direction of the first liquid-crystal panel 101.

<13.5.3 Effects>

According to the present reference example, the birefringent film 48 is provided between the second liquid-crystal panel 102 and the first liquid-crystal panel 101. Therefore, the light given from the second liquid-crystal panel 102 to the first liquid-crystal panel 101 always contains a component that vibrates in the same direction as the incident polarization direction of the first liquid-crystal panel 101. Therefore, even when the emission polarization direction of the second liquid-crystal panel 102 and the incident polarization direction of the first liquid-crystal panel 101 have any relationship, it is possible to perform image display by the first liquid-crystal panel 101 by using the light that has passed through the second liquid-crystal panel 102 (display by the second liquid-crystal panel 102) as backlight. Further, even when the relationship between the emission polarization direction of the second liquid-crystal panel 102 and the incident polarization direction of the first liquid-crystal panel 101 is not determined at the time of design, it is possible to perform image display by the first liquid-crystal panel 101 by using the light that has passed through the second liquid-crystal panel 102 (display by the second liquid-crystal panel 102) as backlight. As described above, it is possible to realize a dual display that achieves a similar effect to that of the first reference example by installing the birefringent film 48 between the second liquid-crystal panel 102 and the first liquid-crystal panel 101. However, in comparison with the configuration in which the emission polarization direction of the second liquid-crystal panel 102 and the incident polarization direction of the first liquid-crystal panel 101 are set in the same direction in a similar manner to that of the first reference example, for example, brightness of the second liquid-crystal panel 102 becomes about one half.

<13.5.4 Modification>

In the fifth reference example, on the basis of the configuration of the first reference example (see FIG. 39), the birefringent film 48 is provided between the first liquid-crystal panel 101 and the second liquid-crystal panel 102. However, on the basis of the configuration of the second reference example (see FIG. 45), a configuration in which the birefringent film 48 is provided between the first liquid-crystal panel 101 and the second liquid-crystal panel 102 can be also adopted. However, in this case, the birefringent film 48 needs to be disposed in the region between the backlight source 36 and the second panel body emission-side polarizing plate 23.

<13.6 Sixth Reference Example>

<13.6.1 Configuration>

Figure 50:
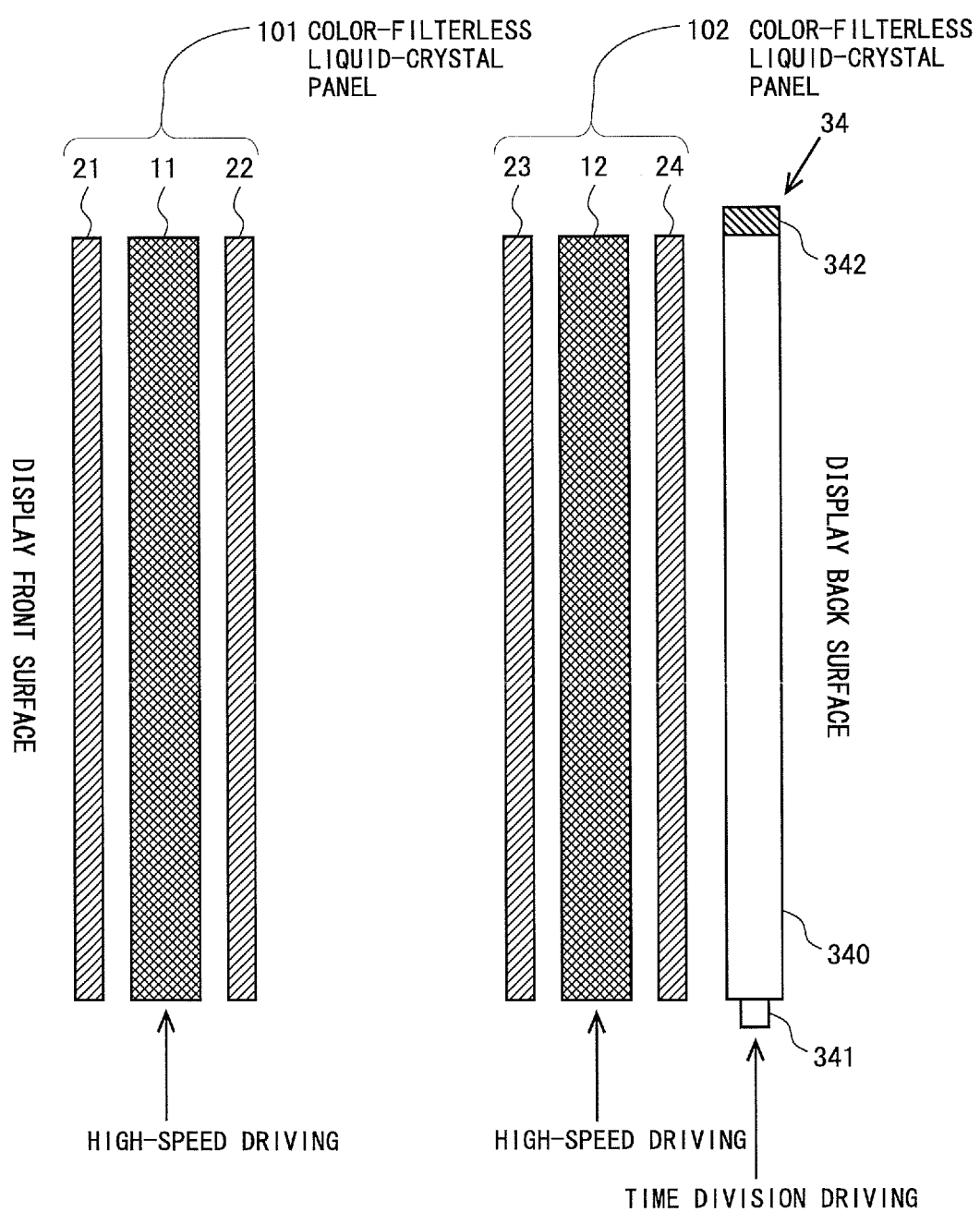
FIG. 50 is a diagram showing a configuration of an image display device according to a sixth reference example.

FIG. 50 is a diagram showing a configuration of an image display device according to the sixth reference example. In the present reference example, both the first liquid-crystal panel 101 configured by the first panel body emission-side polarizing plate 21, the first panel body 11, and the first panel body incidence-side polarizing plate 22 and the second liquid-crystal panel 102 configured by the second panel body emission-side polarizing plate 23, the second panel body 12, and the second panel body incidence-side polarizing plate 24 are color-filterless liquid-crystal panels. Also, three-color (red, green, and blue) LEDs are provided as the LED 341 in the backlight source 34, and the three-color LEDs are driven in a time division manner. As described above, in the present reference example, both the first liquid-crystal panel 101 and the second liquid-crystal panel 102 are driven in a field sequential manner.

Although a description is made herein on the assumption that three-color light sources of RGB (red, green, and blue) are used, the number of colors of the light sources and a combination of colors of the light sources are not limited thereto. However, in each of reference examples described later, a description will be made on the assumption that three-color light sources of RGB (red, green, and blue) are also used.

<13.6.2 Field Sequential Driving>

Here, field sequential driving will be described. Field sequential driving is a driving system for displaying a color image by turning on backlight of each color (three colors of red, green, and blue) by switching the backlight at a high speed without dividing each pixel into sub-pixels for each color. FIG. 32 is a diagram for describing a difference between the configuration of pixels in normal driving and the configuration of pixels in field sequential driving. In normal driving, one pixel 61 is divided into sub-pixels of three colors including red, green, and blue. On the other hand, in field sequential driving, three colors of red, green, and blue are sequentially displayed in one pixel 62. From the above, if one pixel has a prescribed size, it is understood that the resolution in field sequential driving is three times the resolution in normal driving.

In field sequential driving, one frame period is divided into three fields. In the present reference example, one frame period is divided into a red field, a green field, and a blue field. In such field sequential driving, typically, driving is performed at a drive frequency of 180 Hz. In normal driving, typically, driving is performed at a drive frequency of 60 Hz. Further, in field sequential driving, as shown in FIG. 33, in each field, only the light source of a corresponding color is brought into the on state. Taking into account a response speed of the liquid crystal, each light source is brought into the on state only during a latter half period of a corresponding field, for example.

<13.6.3 Effects>

According to the present reference example, a color filter is not provided in the first liquid-crystal panel 101 and the second liquid-crystal panel 102. Therefore, utilization efficiency of light is improved and a high aperture ratio is obtained, and concerning the space between the first liquid-crystal panel 101 and the second liquid-crystal panel 102, the viewer is enabled to visually recognize a more transmitted state. Accordingly, the display image by the second liquid-crystal panel 102 disposed at the back-surface side becomes easily visible for the viewer. Further, it is possible to achieve high brightness because the utilization efficiency of light is improved. Furthermore, a color reproduction range can be improved by sequentially turning on a plurality of single-color light sources.

<13.6.4 Modification>

The configuration of the sixth reference example (see FIG. 50) is based on the configuration of the first reference example (see FIG. 39). However, based on the configuration of any of the second to fifth reference examples, both the first liquid-crystal panel 101 and the second liquid-crystal panel 102 may be driven in a field sequential manner.

<13.7 Seventh Reference Example>

<13.7.1 Configuration>

Figure 51:
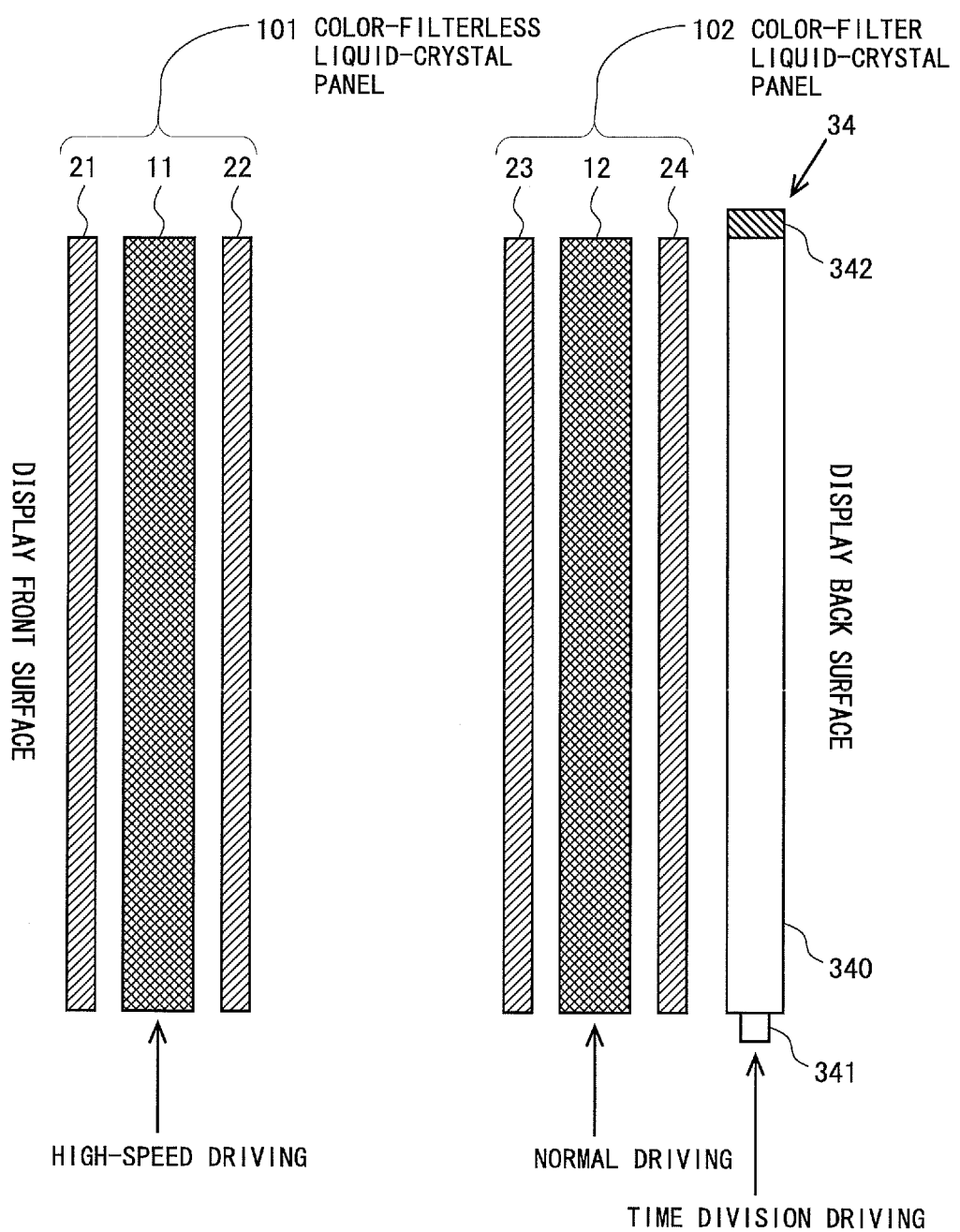
FIG. 51 is a diagram showing a configuration of an image display device according to a seventh reference example.

FIG. 51 is a diagram showing a configuration of an image display device according to the seventh reference example. In the present reference example, the first liquid-crystal panel 101 configured by the first panel body emission-side polarizing plate 21, the first panel body 11, and the first panel body incidence-side polarizing plate 22 is a color-filterless liquid-crystal panel, and the second liquid-crystal panel 102 configured by the second panel body emission-side polarizing plate 23, the second panel body 12, and the second panel body incidence-side polarizing plate 24 is a color-filter liquid-crystal panel. That is, the first liquid-crystal panel 101 is driven in a field sequential manner, and the second liquid-crystal panel 102 is normally driven.

In the present reference example, in a similar manner to that of the sixth reference example, three-color (red, green, and blue) LEDs are provided as the LED 341 in the backlight source 34, and the three-color LEDs are driven in a time division manner. However, because the second liquid-crystal panel 102 is a color-filter liquid crystal panel, it is assumed that the second liquid-crystal panel 102 is normally driven. Concerning this, when the drive frequency of the second liquid-crystal panel 102 is set sufficiently lower than the drive frequency of the first liquid-crystal panel 101, image display is performed normally by the second liquid-crystal panel 102, even when the three-color LEDs are driven in a time division manner. For example, the drive frequency of the second liquid-crystal panel 102 may be set to 60 Hz, and the drive frequency of the first liquid-crystal panel 101 may be set to 180 Hz.

<13.7.2 Effects>

In the sixth reference example, both the first liquid-crystal panel 101 and the second liquid-crystal panel 102 are color-filterless liquid-crystal panels. However, because normal driving is generally performed by using a color-filter liquid-crystal panel, there is a concern that cost is increased due to the adoption of two color-filterless liquid-crystal panels. In this respect, according to the present reference example, only one color-filterless liquid-crystal panel is adopted. Therefore, the increase in cost can be suppressed. From the above, it is possible to realize a dual display that achieves a similar effect to that of the sixth reference example while suppressing the increase in cost.

<13.7.3 Modification>

Figure 52:
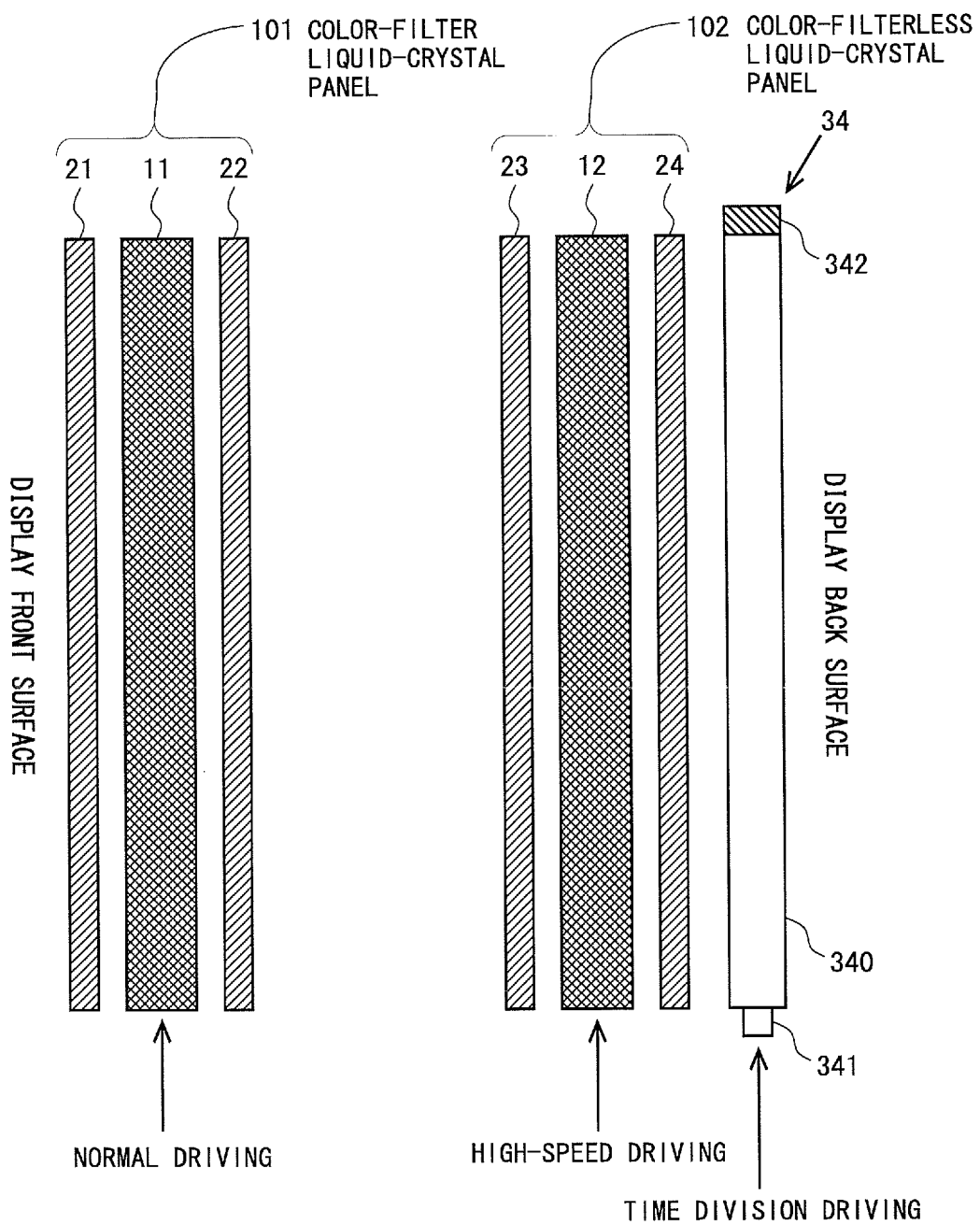
FIG. 52 is a diagram showing a configuration of an image display device according to a modification of the seventh reference example.
Figure 53:
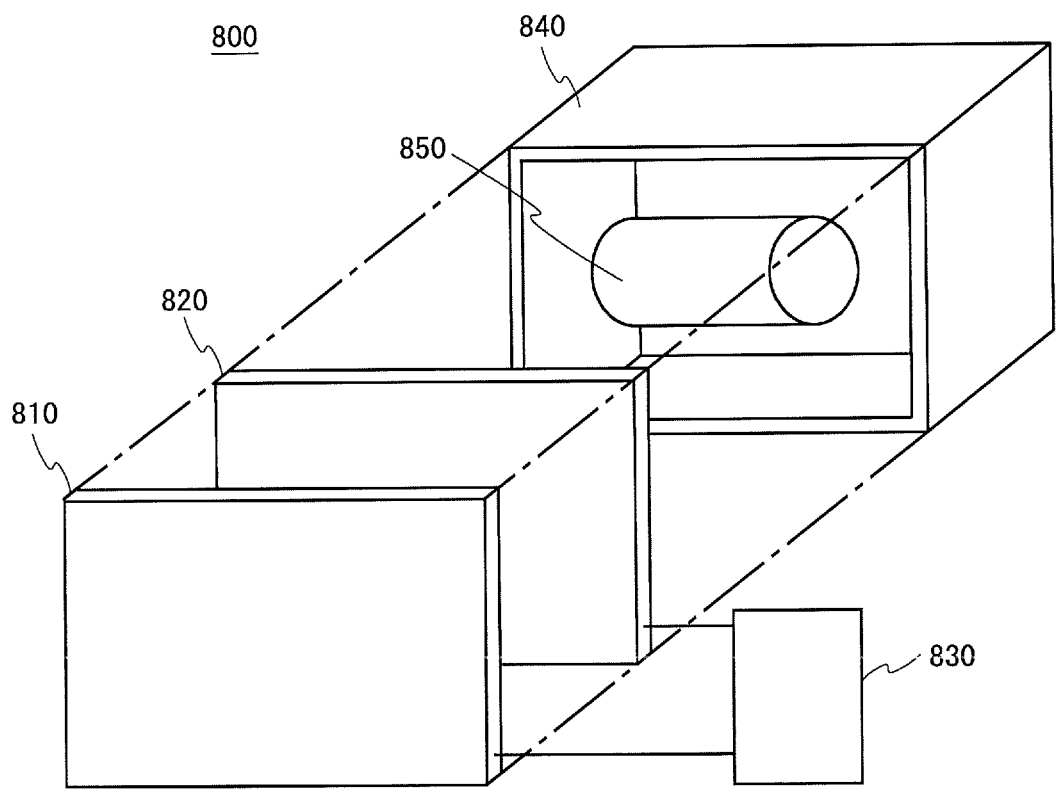
FIG. 53 is a diagram showing a configuration of a liquid crystal display device having the function of the transparent display disclosed in Japanese Patent Application Laid-Open No. 2010-91609.

FIG. 52 is a diagram showing a configuration of an image display device according to a modification of the seventh reference example. In the present modification, the first liquid-crystal panel 101 configured by the first panel body emission-side polarizing plate 21, the first panel body 11, and the first panel body incidence-side polarizing plate 22 is a color-filter liquid-crystal panel, and the second liquid-crystal panel 102 configured by the second panel body emission-side polarizing plate 23, the second panel body 12, and the second panel body incidence-side polarizing plate 24 is a color-filterless liquid-crystal panel. That is, the first liquid-crystal panel 101 is normally driven, and the second liquid-crystal panel 102 is driven in a field sequential manner. In the present modification, when the drive frequency of the first liquid-crystal panel 101 is set sufficiently lower than the drive frequency of the second liquid-crystal panel 102, image display is performed normally by the first liquid-crystal panel 101, even when the three-color LEDs are driven in a time division manner. Also in the present modification, only one color-filterless liquid-crystal panel is adopted in a similar manner to that of the seventh reference example. Accordingly, it is possible to realize a dual display that achieves a similar effect to that of the sixth reference example while suppressing the increase in cost.

<13.7.4 Others>

The configuration of the seventh reference example (see FIG. 51) and the configuration of the modification (see FIG. 52) are based on the configuration of the first reference example (see FIG. 39). However, based on the configuration of any of the second to fifth reference examples, field sequential driving can be performed by adopting a color-filterless liquid-crystal panel for the first liquid-crystal panel 101, and normal driving can be performed by adopting a color-filter liquid-crystal panel for the second liquid-crystal panel 102. Further, based on the configuration of any of the second to fifth reference examples, normal driving can be performed by adopting a color-filter liquid-crystal panel for the first liquid-crystal panel 101, and field sequential driving can be performed by adopting a color-filterless liquid-crystal panel for the second liquid-crystal panel 102.

<13.8 Eighth Reference Example>

<13.8.1 Overview>

In the first reference example, image display is performed by the first liquid-crystal panel 101 by using the light that has passed through the second panel body 12 (display by the second liquid-crystal panel 102) as backlight. Therefore, the first liquid-crystal panel 101 can only display colors based on colors that are included in the display image on the second liquid-crystal panel 102. Therefore, when display of black or display of a color near a single color is performed by the second liquid-crystal panel 102, the degree of freedom of display by the first liquid-crystal panel 101 becomes extremely low. More specifically, when display of a single color of red (R=255, G=0, B=0) is performed by the second liquid-crystal panel 102, for example, even when display of cyan (R=0, G=255, B=255) is to be performed by the first liquid-crystal panel 101, black (R=0, G=0, B=0) is displayed by the first liquid-crystal panel 101 because light components of green and blue are not given from the second liquid-crystal panel 102 to the first liquid-crystal panel 101. FIG. 36 is a diagram schematically showing this phenomenon.

Therefore, in the present reference example, display quality of the first liquid-crystal panel 101 are enhanced by whitening the display image on the second liquid-crystal panel 102. In this case, the "whitening" refers to displaying a color whiter than the original color.

<13.8.2 Configuration>

FIG. 37 is a block diagram for describing a configuration for whitening a display image on the second liquid-crystal panel 102. As a configuration element for driving the second liquid-crystal panel 102, a display control circuit 71 and a panel drive circuit 72 are provided in the image display device. The display control circuit 71 outputs, based on the input image signal DAT, a digital video signal DV and a control signal SC for controlling the operation of the panel drive circuit 72. In the present reference example, a display color correction section is realized by the display control circuit 71. The panel drive circuit 72 outputs a driving signal SD based on the digital video signal DV and the control signal SC that are output from the display control circuit 71. The second liquid-crystal panel 102 performs image display based on the driving signal SD. The panel drive circuit 72 is configured by a gate driver and a source driver, for example.

Usually, the display control circuit 71 outputs the digital video signal DV so that a color shown by the input image signal DAT is displayed by the second liquid-crystal panel 102. On the other hand, in the present reference example, when the color shown by the input image signal DAT contains a color of a small component, the display control circuit 71 outputs the digital video signal DV so that a color whiter than the color shown by the input image signal DAT is displayed by the second liquid-crystal panel 102. In order to realize this, for example, in an image display device that performs gradation display of 255 gradations for each color of RGB, a rule such as "for a color with a gradation value of less than 100, the gradation value is changed to 100" is established in advance. Accordingly, when a color shown by the input image signal DAT given to the display control circuit 71 is a single color of red (R=255, G=0, B=0), for example, the digital video signal DV that shows a color (R=255, G=100, B=100) having an enhanced green component and an enhanced blue component is output from the display control circuit 71. As a result, the light given from the second liquid-crystal panel 102 to the first liquid-crystal panel 101 contains not only the red component but also the green component and the blue component. Accordingly, when cyan (R=0, G=255, B=255) is to be displayed by the first liquid-crystal panel 101, a color (R=0, G=100, B=100) having an enhanced green component and an enhanced blue component as compared with the example shown in FIG. 36 is displayed. FIG. 38 is a diagram schematically showing this phenomenon.

Further, a configuration for whitening the display image on the second liquid-crystal panel 102 can be applied to any of the first to seventh reference examples.

<13.8.3 Effects>

According to the present reference example, whitening is performed to the display image on the second liquid-crystal panel 102. Therefore, even when display of black or a color near a single color, for example, is to be performed by the second liquid-crystal panel 102, display of a color containing components of at least a prescribed size or more for all colors of RGB is actually performed by the second liquid-crystal panel 102. Accordingly, the light given from the second liquid-crystal panel 102 to the first liquid-crystal panel 101 contains components of at least a prescribed size or more for all colors of RGB. Accordingly, the degree of freedom of display by the first liquid-crystal panel 101 is improved. As a result, display quality of the first liquid-crystal panel 101 can be enhanced.

<14. Notes>

As a dual display having a configuration not including the back-surface irradiation light source 31, image display devices of various configurations as described below are considered.

(Note 1)

An image display device including a first display panel disposed at a front-surface side and a second display panel disposed at a back-surface side, the image display device including:

a first panel body as a body of the first display panel;

a frontmost polarizing plate disposed at a front-surface side with respect to the first panel body;

a second panel body as a body of the second display panel;

a rearmost polarizing plate disposed at a back-surface side with respect to the second panel body;

at least one inter-panel polarizing plate disposed between the first panel body and the second panel body; and a first light source disposed at a back-surface side with respect to the rearmost polarizing plate.

According to such a configuration, a light source (the first light source) is provided at a further back surface of the second display panel that is disposed at the back surface of the first display panel. The light emitted from the first light source passes through the second panel body and the first panel body, depending on the states of respective display elements (for example, liquid crystal) in the second panel body and the first panel body. Accordingly, the viewer is enabled to view display images on both the first display panel and the second display panel. In this case, by providing some space between the first display panel and the second display panel, it is possible to display an image with a sense of depth and three-dimensional appearance. From the above, it is possible to realize a dual display having high expressive power by using one light source (the first light source)

(Note 2)

The image display device according to Note 1, wherein a polarization direction of light incident to the second display panel from a back-surface side and emitted from a front-surface side of the second display panel and a polarization direction of light incident to the first panel body when desired image display is performed by the first display panel coincide with each other, and only one inter-panel polarizing plate is provided between the first panel body and the second panel body as the at least one inter-panel polarizing plate.

According to such a configuration, only one polarizing plate is provided between the first panel body and the second panel body. Accordingly, a light component absorbed or reflected by the polarizing plate is reduced, and the light emitted from the light source is more effectively utilized than in the conventional art. Further, because the number of required polarizing plates is smaller than that in the conventional art, the effect of reducing the manufacturing cost can be obtained.

(Note 3)

The image display device according to Note 1, further including a second light source provided in a region between the first panel body and the second panel body and configured to emit light from an installation position toward at least a front-surface side, wherein one of the at least one inter-panel polarizing plate is provided near a back surface of the first panel body, and the second light source is provided at a back-surface side with respect to the inter-panel polarizing plate provided near the back surface of the first panel body.

According to such a configuration, the second light source that emits light toward the front-surface side is provided at the back surface of the first display panel. Therefore, even when display of black or display of a color near a single color is performed by the second display panel, light components of each color are given to the first display panel. In this way, because the light component of each color is given to the first display panel regardless of the state of display by the second display panel, the degree of freedom of display by the first display panel can be enhanced. Further, by independently controlling the light amount of the first light source and the light amount of the second light source, it is possible to individually adjust brightness of the first display panel and brightness of the second display panel.

(Note 4)

The image display device according to Note 1, wherein the first light source includes a plurality of single-color light sources, and the first display panel and the second display panel are display panels without a color filter, and are driven by a field sequential driving system configured to bring the plurality of single-color light sources sequentially into an on state.

According to such a configuration, a color filter is not provided in the first display panel and the second display panel. Therefore, utilization efficiency of light is improved and a high aperture ratio is obtained, and concerning the space between the first display panel and the second display panel, the viewer is enabled to visually recognize a more transmitted state. Accordingly, the display image by the second display panel disposed at the back-surface side becomes easily visible for the viewer. Further, it is possible to achieve high brightness because the utilization efficiency of light is improved. Furthermore, a color reproduction range can be improved by sequentially turning on a plurality of single-color light sources.

(Note 5)

The image display device according to Note 1, wherein the first light source includes single-color light sources of K colors (where K is an integer equal to or larger than three), one of the first display panel and the second display panel is a display panel without a color filter, and is driven by a field sequential driving system configured to bring the single-color light sources of K colors sequentially into an on state, and the other of the first display panel and the second display panel is a display panel having a color filter, and is driven at a drive frequency of one-Kth or less of a drive frequency of the first display panel.

According to such a configuration, only one color-filterless display panel is used. Because a color-filterless display panel is expensive, increase in cost can be suppressed as compared with a configuration using two color-filterless display panels. From the above, it is possible to achieve a similar effect to that of the configuration described in Note 4 while suppressing the increase in cost.

(Note 6)

The image display device according to Note 1, further including two $\lambda/4$ wave plates disposed with a predetermined interval in a region between the first display panel and the second display panel.

According to such a configuration, two $\lambda/4$ wave plates are provided between the first display panel and the second display panel. In this case, by disposing one of the $\lambda/4$ wave plates near the first display panel and by disposing the other of the $\lambda/4$ wave plates near the second display panel, influence to the display by the surface reflection generated in the space between the first display panel and the second display panel can be reduced. In this way, influence to the display by the surface reflection of light can be reduced while enhancing the utilization efficiency of light emitted from the back-surface irradiation light source.

(Note 7)

The image display device according to Note 6, wherein when a polarization direction of light incident to the second display panel from a back-surface side and emitted from a front-surface side of the second display panel is defined as a first direction, and a polarization direction of light incident to the first panel body when desired image display is performed by the first display panel is defined as a second direction, the first direction and the second direction form an angle of 90 degrees, and directions of slow axes of both of the two $\lambda/4$ wave plates form angles of 45 degrees with both of the first direction and the second direction.

According to such a configuration, when the emission polarization direction of the second display panel and the incident polarization direction of the first display panel are orthogonal to each other, the polarization direction after the light emitted from the second display panel passes through the two $\lambda/4$ wave plates can be made to coincide with the incident polarization direction of the first display panel. Accordingly, even when the emission polarization direction of the second display panel is orthogonal to the incident polarization direction of the first display panel, the image display device that achieves a similar effect to that of the configuration described in Note 1 can be realized.

(Note 8)

The image display device according to Note 6, wherein when a polarization direction of light incident to the second display panel from a back-surface side and emitted from a front-surface side of the second display panel is defined as a first direction, and a polarization direction of light incident to the first panel body when desired image display is performed by the first display panel is defined as a second direction, the first direction and the second direction coincide with each other, a direction of a slow axis of one of the two λ/4 wave plates forms an angle of 45 degrees with both of the first direction and the second direction, and a direction of a slow axis of the other of the two λ/4 wave plates forms an angle of 45 degrees with both of the first direction and the second direction and forms an angle of 90 degrees with the direction of the slow axis of one of the two λ/4 wave plates.

According to such a configuration, a similar effect to that of the configuration described in Note 6 can be obtained.

(Note 9)

The image display device according to Note 1, further including a λ/2 wave plate provided in a region between the first display panel and the second display panel, and when a polarization direction of light incident to the second display panel from a back-surface side and emitted from a front-surface side of the second display panel is defined as a first direction, and a polarization direction of light incident to the first panel body when desired image display is performed by the first display panel is defined as a second direction, an angle formed by a direction of a slow axis of the λ/2 wave plate and the first direction and an angle formed by the direction of the slow axis of the λ/2 wave plate and the second direction coincide with each other.

According to such a configuration, even when the emission polarization direction of the second display panel and the incident polarization direction of the first display panel have any relationship, when respective polarization directions (the emission polarization direction and the incident polarization direction) are known in advance, the polarization direction after the light emitted from the second display panel passes through the λ/2 wave plate can be made to coincide with the incident polarization direction of the first display panel by installing the λ/2 wave plate in the proper orientation. Accordingly, even when the emission polarization direction of the second display panel and the incident polarization direction of the first display panel have any relationship, the image display device that achieves a similar effect to that of the configuration described in Note 1 can be realized.

(Note 10)

The image display device according to Note 1, further including a birefringent film provided in a region between the first display panel and the second display panel.

According to such a configuration, a birefringent film is provided between the second display panel and the first display panel. Therefore, the light given from the second display panel to the first display panel always contains a component that vibrates in the same direction as the incident polarization direction of the first display panel. Therefore, even when the emission polarization direction of the second display panel and the incident polarization direction of the first display panel have any relationship, it is possible to perform image display by the first display panel by using the light that has passed through the second display panel (display by the second display panel) as backlight. Further, even when the relationship between the emission polarization direction of the second display panel and the incident polarization direction of the first display panel is not determined at the time of design, it is possible to perform image display by the first display panel by using the light that has passed through the second display panel (display by the second display panel) as backlight. From the above, it is possible to realize the image display device that achieves a similar effect to that described in Note 1 without considering the relationship between the emission polarization direction of the second display panel and the incident polarization direction of the first display panel.

(Note 11)

The image display device according to Note 1, further including a display color correction section configured to correct a value of an input image signal that shows a display color in the second display panel, wherein the display color correction section is configured to correct a value of the input image signal so as to contain a component having at least a predetermined size for all primary colors.

According to such a configuration, so-called whitening (displaying a color whiter than the original color) is performed to the display image on the second display panel. Therefore, even when display of black or a color near a single color is to be performed by the second display panel, for example, display of a color containing components of at least a prescribed size or more for all primary colors is actually performed by the second display panel. Therefore, the light given from the second display panel to the first display panel contains components of at least a prescribed size or more for all primary colors. Accordingly, the degree of freedom of display by the first display panel is improved. As a result, display quality of the first display panel can be enhanced.

(Note 12)

The image display device according to Note 1, wherein a back surface space in which an object can be disposed is provided at a back-surface side with respect to the rearmost polarizing plate, and the back surface space is filled with light emitted from the first light source.

According to such a configuration, because an exhibition object, for example, can be installed at the back surface of the second display panel, expressive power can be enhanced.

DESCRIPTION OF REFERENCE NUMERALS

11: FIRST PANEL BODY
12: SECOND PANEL BODY
21: FIRST PANEL BODY EMISSION-SIDE POLARIZING PLATE
22: FIRST PANEL BODY INCIDENCE-SIDE POLARIZING PLATE
23: SECOND PANEL BODY EMISSION-SIDE POLARIZING PLATE
24: SECOND PANEL BODY INCIDENCE-SIDE POLARIZING PLATE
31: BACK-SURFACE IRRADIATION LIGHT SOURCE
32: BACKLIGHT SOURCE
41: FIRST λ/4 WAVE PLATE
42: SECOND λ/4 WAVE PLATE
45: λ/2 WAVE PLATE
48: BIREFRINGENT FILM
71: DISPLAY CONTROL CIRCUIT
72: PANEL DRIVE CIRCUIT
101: FIRST LIQUID-CRYSTAL PANEL
102: SECOND LIQUID-CRYSTAL PANEL
310: LIGHT GUIDE PLATE
311: LED
312: REFLECTION SHEET
315: SCATTERER

The invention claimed is:

1. An image display device including a first display panel disposed at a front-surface side and a second display panel disposed at a back-surface side, the image display device comprising:
a first panel body as a body of the first display panel;
a frontmost polarizing plate disposed at a front-surface side with respect to the first panel body;
a second panel body as a body of the second display panel;
a rearmost polarizing plate disposed at a back-surface side with respect to the second panel body;
at least one inter-panel polarizing plate disposed between the first panel body and the second panel body; and
a back-surface irradiation light source configured to emit light from an installation position toward the back-surface side,
wherein the back-surface irradiation light source is provided in one of regions between the frontmost polarizing plate and the rearmost polarizing plate,
at least one of the rearmost polarizing plate and the inter-panel polarizing plate is a reflection type polarizing plate configured to reflect a component vibrating in a direction perpendicular to a direction of a transmission axis out of light emitted from the back-surface irradiation light source,
the back-surface irradiation light source is provided in a region between the second panel body and the rearmost polarizing, plate, and
the rearmost polarizing plate is a reflection type polarizing plate.

2. The image display device according to claim 1, wherein
a polarization direction of light incident to the second display panel from a back-surface side and emitted from a front-surface side of the second display panel and a polarization direction of light incident to the first panel body when desired image display is performed by the first display panel coincide with each other, and
only one inter-panel polarizing plate is provided between the first panel body and the second panel body as the at least one inter-panel polarizing plate.

3. The image display device according to claim 1, wherein
the back-surface irradiation light source includes a plurality of single-color light sources, and
the first display panel and the second display panel are display panels without a color filter, and are driven by a field sequential driving system configured to bring the plurality of single-color light sources sequentially into an on state.

4. The image display device according to claim 1, wherein
the back-surface irradiation light source includes single-color light sources of K colors (where K is an integer equal to or larger than three),
one of the first display panel and the second display panel is a display panel without a color filter, and is driven by a field sequential driving system configured to bring the single-color light sources of K colors sequentially into an on state, and
the other of the first display panel and the second display panel is a display panel having a color filter, and is driven at a drive frequency of one-Kth or less of a drive frequency of the first display panel.

5. The image display device according to claim 1, further comprising two λ/4 wave plates disposed with a predetermined interval in a region between the first display panel and the second display panel.

6. The image display device according to claim 5, wherein
when a polarization direction of light incident to the second display panel from a back-surface side and emitted from a front-surface side of the second display panel is defined as a first direction, and a polarization direction of light incident to the first panel body when desired image display is performed by the first display panel is defined as a second direction,
the first direction and the second direction form an angle of 90 degrees, and
directions of slow axes of both of the two λ/4 wave plates form angles of 45 degrees with both of the first direction and the second direction.

7. The image display device according to claim 5, wherein
when a polarization direction of light incident to the second display panel from a back-surface side and emitted from a front-surface side of the second display panel is defined as a first direction, and a polarization direction of light incident to the first panel body when desired image display is performed by the first display panel is defined as a second direction,
the first direction and the second direction coincide with each other,
a direction of a slow axis of one of the two λ/4 wave plates forms an angle of 45 degrees with both of the first direction and the second direction, and
a direction of a slow axis of the other of the two λ/4 wave plates forms an angle of 45 degrees with both of the first direction and the second direction and forms an angle of 90 degrees with the direction of the slow axis of one of the two λ/4 wave plates.

8. The image display device according to claim 1, further comprising a λ/2 wave plate provided in a region between the first display panel and the second display panel, and
when a polarization direction of light incident to the second display panel from a back-surface side and emitted from a front-surface side of the second display panel is defined as a first direction, and a polarization direction of light incident to the first panel body when desired image display is performed by the first display panel is defined as a second direction, an angle formed by a direction of a slow axis of the λ/2 wave plate and the first direction and an angle formed by the direction of the slow axis of the λ/2 wave plate and the second direction coincide with each other.

9. The image display device according to claim 1, further comprising a birefringent film provided in a region between the first display panel and the second display panel.

10. The image display device according to claim 1, further comprising a display color correction section configured to correct a value of an input image signal that shows a display color in the second display panel,
wherein the display color correction section is configured to correct a value of the input image signal so as to contain a component having at least a predetermined size for all primary colors.

11. The image display device according to claim 1, wherein a space in which an object is disposed is provided at a back-surface side with respect to the rearmost polarizing plate.

12. The image display device according to claim 1, further comprising a backlight source provided in a region between the first panel body and the second panel body and configured to emit light from an installation position toward at least a front-surface side,
wherein one of the at least one inter-panel polarizing plate is provided near a back surface of the first panel body, and
the backlight source is provided at a back-surface side with respect to the inter-panel polarizing plate provided near the back surface of the first panel body.

13. An image display device including a first display panel disposed at a front-surface side and a second display panel disposed at a back-surface side,
the image display device comprising:
a first panel body as a body of the first display panel;
a frontmost polarizing plate disposed at a front-surface side with respect to the first panel body;
a second panel body as a body of the second display panel;
a rearmost polarizing plate disposed at a back-surface side with respect to the second panel body;
at least one inter-panel polarizing plate disposed between the first panel body and the second panel body; and
a back-surface irradiation light source configured to emit light from an installation position toward the back-surface side,
wherein the back-surface irradiation light source is provided in one of regions between the frontmost polarizing plate and the rearmost polarizing plate,
at least one of the rearmost polarizing plate and the inter-panel polarizing plate is a reflection type polarizing plate configured to reflect a component vibrating in a direction perpendicular to a direction of a transmission axis out of light emitted from the back-surface irradiation light source,
the back-surface irradiation light source is provided in a region between the first panel body and the inter-panel polarizing plate,
the rearmost polarizing plate is a reflection type polarizing plate, and
one of the at least one inter-panel polarizing plate is a reflection type polarizing plate.

14. The image display device according to claim 13, wherein
only one inter-panel polarizing plate is provided between the first panel body and the second panel body as the at least one inter-panel polarizing plate, and
the inter-panel polarizing plate is provided near a front surface of the second panel body.

15. The image display device according to claim 13, wherein the back-surface irradiation light source and one of the at least one inter-panel polarizing plate are provided near the back surface of the first panel body.

16. An image display device including a first display panel disposed at a front-surface side and a second display panel disposed at a back-surface side,
the image display device comprising:
a first panel body as a body of the first display panel;
a frontmost polarizing plate disposed at a front-surface side with respect to the first panel body;
a second panel body as a body of the second display panel;
a rearmost polarizing plate disposed at a back-surface side with respect to the second panel body;
at least one inter-panel polarizing plate disposed between the first panel body and the second panel body;
a back-surface irradiation light source configured to emit light from an installation position toward the back-surface side; and
a backlight source provided at a back-surface side with respect to the rearmost polarizing plate and configured to emit light from an installation position toward a front-surface side,
wherein the back-surface irradiation light source is provided in one of regions between the frontmost polarizing plate and the rearmost polarizing plate,
at least one of the rearmost polarizing plate and the inter-panel polarizing plate is a reflection type polarizing plate configured to reflect a component vibrating in a direction perpendicular to a direction of a transmission axis out of light emitted from the back-surface irradiation light source,
the back-surface irradiation light source is provided in a region between the first panel body and the inter-panel polarizing plate,
the inter-panel polarizing plate is a reflection type polarizing plate, and
the rearmost polarizing plate is an absorption type polarizing plate configured to absorb a component vibrating in a direction perpendicular to a polarization direction of a component passing through the inter-panel polarizing plate and the second panel body out of light emitted from the back-surface irradiation light source.

17. The image display device according to claim 16, wherein
both the back-surface irradiation light source and the backlight source include a plurality of single-color light sources, and
the first display panel and the second display panel are display panels without a color filter, and are driven by a field sequential driving system configured to bring the plurality of single-color light sources sequentially into an on state.

18. The image display device according to claim 16, wherein
both the back-surface irradiation light source and the backlight source include single-color light sources of K colors (where K is an integer equal to or larger than three),
one of the first display panel and the second display panel is a display panel without a color filter, and is driven by a field sequential driving system configured to bring the single-color light sources of K colors included in the back-surface irradiation light source sequentially into an on state, and
the other of the first display panel and the second display panel is a display panel having a color filter, and is driven at a drive frequency of one-Kth or less of a drive frequency of the first display panel.

* * * * *